United States Patent [19]
Shibayama

[11] Patent Number: 5,144,489
[45] Date of Patent: Sep. 1, 1992

[54] COMPACT WIDE-ANGLE ZOOM LENS

[75] Inventor: Atsushi Shibayama, Kawasaki, Japan

[73] Assignee: Nikon Corporation, Tokyo, Japan

[21] Appl. No.: 700,514

[22] Filed: May 15, 1991

[30] Foreign Application Priority Data

| May 18, 1990 | [JP] | Japan | 2-128352 |
| Jun. 28, 1990 | [JP] | Japan | 2-171174 |
| Aug. 17, 1990 | [JP] | Japan | 2-216650 |
| Sep. 27, 1990 | [JP] | Japan | 2-257929 |
| Dec. 27, 1990 | [JP] | Japan | 2-407623 |

[51] Int. Cl.$^5$ .............................................. G02B 15/14
[52] U.S. Cl. ...................................... 359/689; 359/692
[58] Field of Search ................. 359/676, 689, 692; 350/427, 432

[56]       References Cited
U.S. PATENT DOCUMENTS 4,911,539  3/1990  Tsunashima et al. ............... 359/676

FOREIGN PATENT DOCUMENTS 1-191114  1/1989  Japan .

Primary Examiner—Bruce Y. Arnold
Assistant Examiner—David R. Parsons
Attorney, Agent, or Firm—Shapiro and Shapiro

[57]       ABSTRACT

A compact wide angle zoom lens has a view angle as wide as 65°–72° and a magnification varied by changing an inter-group spacing. The zoom lens comprises a first lens group having a positive refractive power and a second lens group having a negative refractive power. The first lens group, sequentially from an object, includes a front group having a positive refractive power and a rear group having a positive refractive power. The front group includes a meniscus first lens component having a positive refractive power, a second lens component with its more intensive concave surface directed to the object, having a negative refractive power, a third lens component having a positive or negative refractive power, and a fourth lens component having a positive refractive power. The rear group includes a fifth lens component having a positive refractive power. The second lens group includes a meniscus sixth lens component having a positive refractive power, a meniscus seventh lens component having a negative refractive power, and a meniscus eighth lens component having a negative refractive power.

60 Claims, 10 Drawing Sheets

COMPACT WIDE-ANGLE ZOOM LENS

BACKGROUND OF THE INVENTION

1. Field of the Invention

The present invention relates generally to a wide-angle zoom lens based on a positive/negative two group structure, and more particularly, to a wide-angle zoom lens containing a wide view angle of approximately 65°–72° and suitable for use with a lens shutter type compact camera.

2. Related Background Art

Recently, lens specifications in the field of zoom lenses for compact cameras have been increasingly sophisticated. In some of them, there has been proposed a lens specification exhibiting more than a 2-fold zoom ratio. Proposed in, e.g., Japanese Patent Application Laid-open No. 1-191114 is a zoom lens showing a view angle of 60° at the maximum and a 2.2-fold zoom ratio.

On the other hand, in recent years a demand for much wider angles has increased in addition to higher zoom ratios in the zoom lens for the compact camera. Desired is a wide-angle zoom lens capable of photographing a far subject more largely at a still wide view angle.

However, the zoom lens disclosed in Japanese Patent Application Laid-open No. 1-191114 was, though capable of meeting the demand for larger photographing of the remote subject, incapable of sufficiently satisfying the demand for photographing at the much wider view angle.

SUMMARY OF THE INVENTION

Accordingly, it is an object of the present invention, which meets the demands given above, provide a high performance zoom lens containing a wide view angle of approximately 65°–72° and suitable for a compact camera.

To accomplish the foregoing object, in a zoom lens for varying a magnification by changing an inter-group spacing between a first lens group having a positive refraction power and a second lens group having a negative refraction power, the first lens group sequentially from an object includes a front group having the positive refraction power and a rear group having the positive refraction power. The front group includes: a first lens component assuming a meniscus configuration in which its convex surface is directed to the object and having the positive refraction power; a second lens component, in which its more intensive concave surface is directed to the object, having a negative refraction power; a third lens component having any one of the positive and negative refraction powers; and a fourth lens component having the positive refraction power. The rear group includes a fifth lens component having the positive refraction power.

The second lens group includes: a sixth lens component assuming a meniscus configuration in which its convex surface is directed to an image and having the positive refraction power; a seventh lens component assuming a meniscus configuration in which its convex surface is directed to image and having the negative refraction power; and an eighth lens component assuming the meniscus configuration in which its convex surface is directed to the image and having the negative refraction power. The first and second lens groups are constructed to satisfy the following conditions:

$$1.0 < f_1/Y < 1.19$$

$$0.9 < |f_2/Y| < 1.16, f_2 < 0$$

$$1.21 < \beta_{2W} < 1.40$$

where $f_1$: the focal length of the first lens group $G_1$,
$f_2$: the focal length of the second lens group $G_2$,
$Y$: the maximum image height on the image surface,
$\beta_{2W}$: the image forming magnification of the second lens group G2 at the wide-angle end.

For simultaneously attaining increasing of zoom ratio and widening of view angle in the zoom lens based on the above-described positive/negative two group structure, the first positive lens group and the second negative lens group are constructed of the tangible components described above. It is also required to properly allocate the refraction powers of the first and second lens groups.

According to the present invention constructed as described above, it is possible to obtain the compact wide angle zoom lens exhibiting an extremely good image forming performance in all the variable power areas while attaining widening of view angle and increasing of zoom ratio at the same moment.

Other objects, characteristics and effects of the present invention will become apparent during the following full discussion taken in conjunction with the accompanying drawings.

DETAILED DESCRIPTION OF THE PREFERRED EMBODIMENTS

Figure 1:
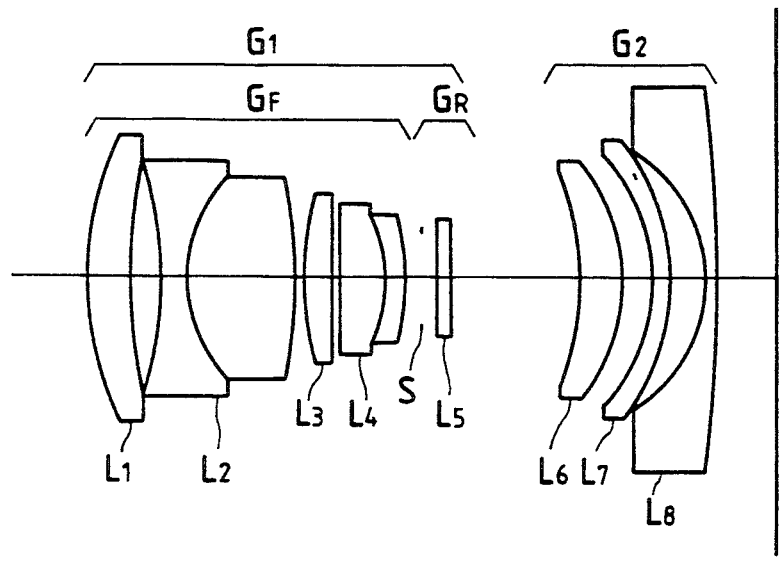
FIGS. 1 through 5 are block diagrams of lenses each coming under such a type (a) that second and fourth lens components in a first lens group are composed of junction lenses and each including a non-spherical lens in a second lens group, showing first to fifth embodiments of the present invention.
Figure 2:
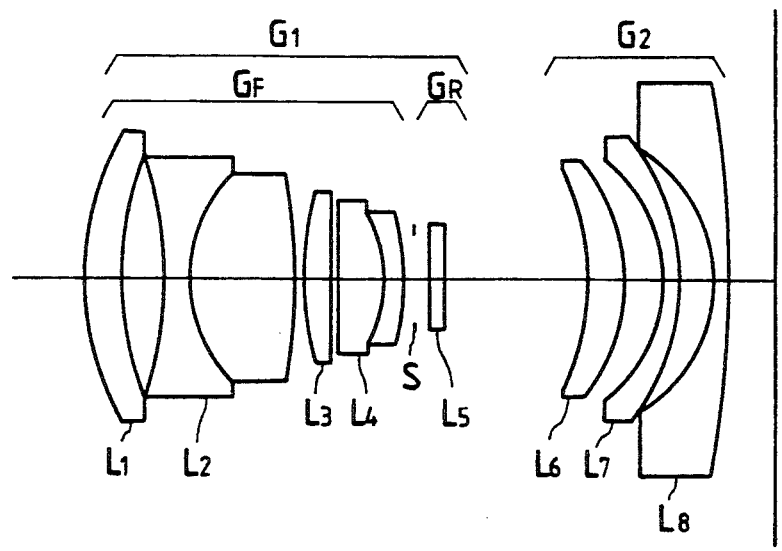
Figure 3:
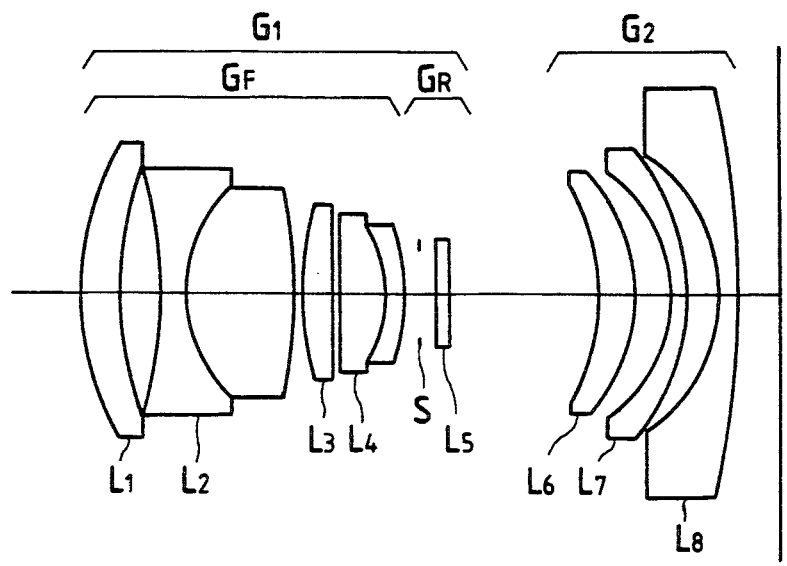
Figure 4:
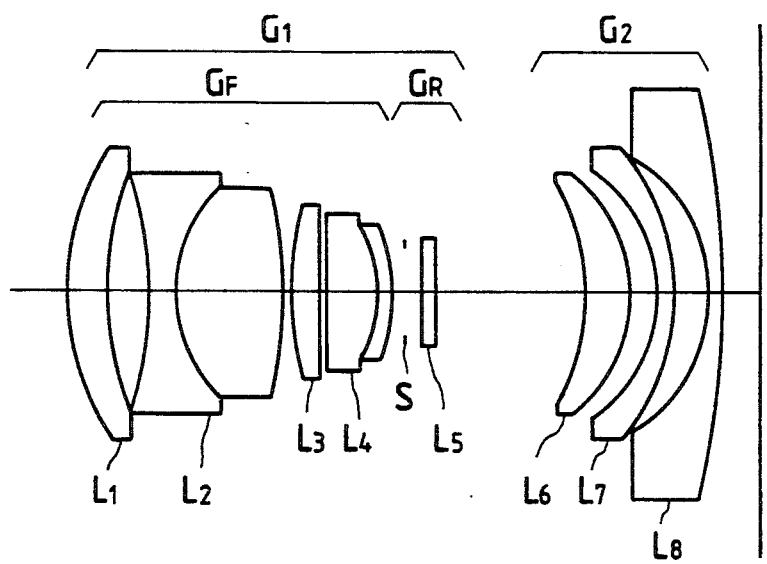
Figure 5:
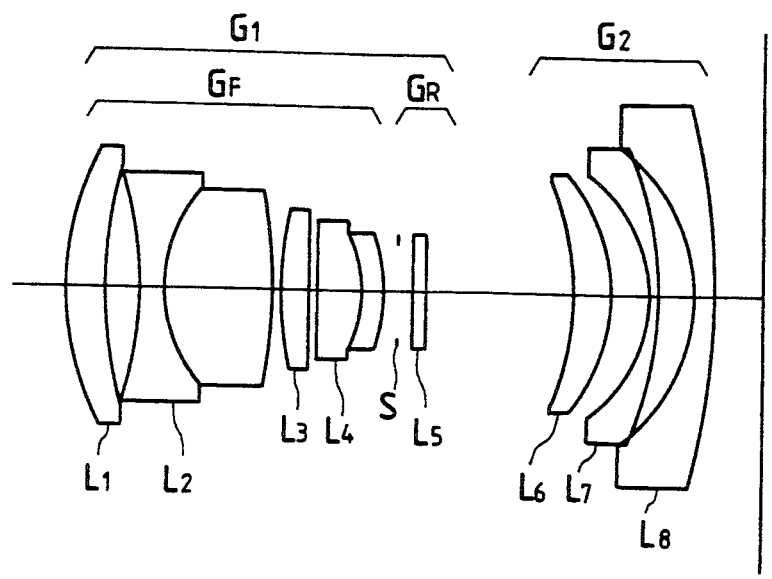
Figure 6:
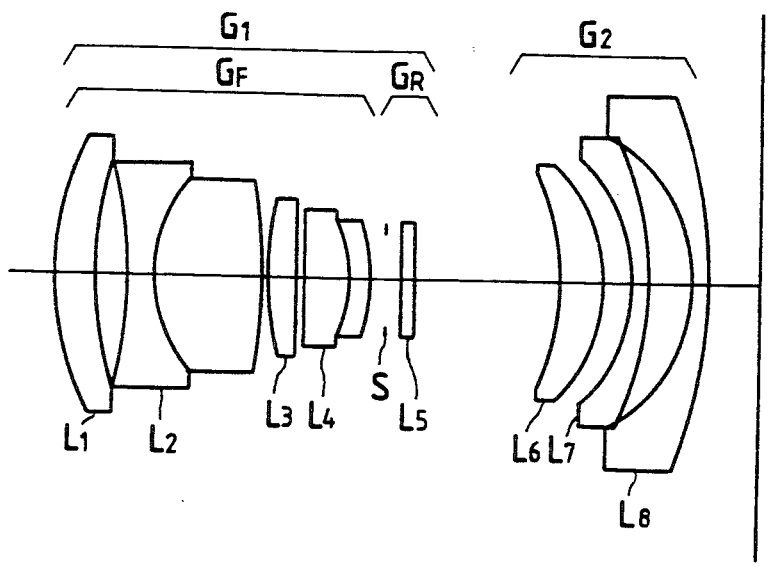
FIG. 6 is a block diagram of a lens unit coming under the same type (a) with FIGS. 1 through 5 and composed entirely of spherical lenses, showing a sixth embodiment of the invention.

Embodiments of the present invention will hereinafter be described in detail with reference to the accompanying drawings.

FIGS. 1 to 19 show first to nineteenth embodiments of this invention. A construction common to the respective embodiments is that a lens unit is composed of a first lens group $G_1$ having a positive refraction power and a second lens group $G_2$ having a negative refraction power, these lens groups being disposed sequentially from an object.

The first lens group $G_1$ consists of a front group $G_F$ and a rear group $G_R$. The front group $G_F$ is configured by a first lens component $L_1$ assuming a meniscus configuration in which its convex surface directed to an object and having a positive refraction power; a second lens component $L_2$ including a more concave surface directed to the object and having a negative refraction power; a third lens component $L_3$ having any one of positive and negative refraction powers; and a fourth lens component $L_4$ having the positive refraction power. The rear group $G_R$ is composed of a fifth lens component $L_5$ having the positive refraction power. The second lens group $G_2$ consists of: a sixth lens component $L_6$ assuming the meniscus configuration in which a convex surface thereof is directed to an image and having the positive refraction power; a seventh lens component $L_7$ assuming the meniscus configuration in which a convex surface thereof is directed to the image and having the negative refraction power; and an eighth lens component $L_8$ assuming the meniscus configuration in which a convex surface thereof is directed similarly to the image and having the negative refraction power.

In each embodiment, the two lens groups are move together relatively towards the object to diminish an air gap formed between the fifth lens component $L_5$ of the first lens group $G_1$ and the sixth lens component $L_6$ of the second lens group $G_2$. A magnification is varied from a wide-angle end to a telephoto end. On the other hand, focusing from an infinite object to a short-range object is effected by moving the front group $G_F$ of the first lens group $G_1$ to the object with respect to the rear group $G_R$.

Note that in each embodiment a diaphragm S is interposed between the front group $G_F$ and the rear group $G_R$ of the first lens group $G_1$.

In the above-described zoom lens based on the positive/negative two group structure, if increasing of magnification (increasing of zoom ratio) and widening of view angle are attained together at the same moment, it is required that refractive indices of the first and second lens groups $G_1$, $G_2$ be appropriately allocated. For this purpose, the respective embodiments are configured to satisfy the following conditions:

$$1.0 < f_1/Y < 1.19 \quad (1)$$

$$0.9 < |f_2/Y| < 1.16, f_2 < 0 \quad (2)$$

$$1.21 < \beta_{2w} < 1.40 \quad (3)$$

where $f_1$: the focal length of the first lens group $G_1$ $f_2$: the focal length of the second lens group $G_2$ Y: the maximum image height on the image surface $\beta_{2w}$: the image forming magnification of the second lens group $G_2$ at the wide-angle end.

Under the condition (1), the proper focal distance of the first lens group $G_1$ is prescribed.

According to this invention, the focal length at the wide-angle end can be reduced by an arrangement of decreasing the focal length of the first lens group $G_1$.

When exceeding an upper limit of the condition (1), it is difficult to obtain the wider view angle of the zoom lens. More specifically, if a synthetic focal length of the first and second lens groups $G_1$, $G_2$ is diminished, an inter-group spacing between the first and second lens groups $G_1$, $G_2$, is required to increase. Thus, a back focus is extremely reduced, and there arises a necessity for enlarging a diameter of the lens closest to the image. For this reason, it is quite difficult to make the entire camera compact. This is inappropriate as a zoom lens for a compact camera.

Whereas if in excess of a lower limit of the condition (1), this is appropriate for obtaining a large back focus by reducing the synthetic focal length at the wide-angle end. While on the other hand, the power with which the first lens group $G_1$ is burdened becomes excessive, thereby making it difficult to correct various aberrations such as a spherical aberration. It is therefore impossible to obtain a favorable image forming performance.

Now, in the zoom lens having, as in the present invention, the positive/negative two group structure, the inter-group spacing between the two lens groups is varied to change the magnification (zooming). In this case, the inter-group spacing between the two groups reaches the maximum at the wide-angle end, whereas the inter-group spacing therebetween is minimized at the telephoto end. In a state where some zoom ratio is obtained, if a difference between the intergroup-spacings between the first and second lens groups $G_1$, $G_2$ at the wide-angle and telephoto ends is small, the two lens groups can be relatively moved for varying the magnification enough not to cause mechanical interference between the two lens groups. A much higher zoom ratio is thus obtainable. At this time, a shorter focal length of the second lens group $G_2$ is more advantageous for changing the magnification at a high efficiency with a small amount of movement.

Prescribed according to this invention is a range of the optimum focal length when decreasing the focal length of the second lens group $G_2$ under the condition (2).

When exceeding the upper limit of the condition (2), the focal length of the second lens group $G_2$ becomes too long. The lens spacing between the first and second lens groups $G_1$, $G_2$ at the wide-angle end has to be set large to obtain a large zoom ratio. It follows that this brings about an increase in size of the lens system.

Whereas if in excess of the lower limit of the condition (2), this is favorable for obtaining a high zoom ratio. A negative refractive power in the second lens group $G_2$ becomes excessive, with the result that a skew aberration and a Petzval sum are corrected with difficulty.

The condition (3) intends to prescribe an optimum image forming magnification of the second lens group at the wide-angle end. The condition (3) also represents a relation in relative placement optimal to widening of view angle between the first and second lens groups $G_1$, $G_2$.

If in excess of the lower limit of the condition (3), the back focus at the wide-angle end becomes extremely short, while apertures of the lens components of the second lens group increase. This hinders the compact arrangement.

Whereas if in excess of the upper limit of the condition (3), the focal length of the first lens group $G_1$ has to be extremely shortened to attain widening of the view angle. Hence, it is difficult to correct a variety of aberrations such as the spherical aberration.

Based on the fundamental constructions of the respective lens groups to meet the conditions described above according to the present invention, the first lens group $G_1$ comprises: the front group $G_F$ configured by the first lens component $L_1$ assuming the meniscus configuration in which the convex surface is directed to the object and having the positive refraction power, the second lens component $L_2$ including the more concave surface directed to the object and having the negative refraction power, the third lens component $L_3$ having any one of the positive and negative refraction powers and the fourth lens component $L_4$ having the positive refraction power; and the rear group $G_R$ including the fifth lens component $L_5$ having the positive refraction power. The second lens group $G_2$ comprises: the sixth lens component $L_6$ assuming the meniscus configuration in which the convex surface is directed to the image and having the positive refraction power; the seventh lens component $L_7$ assuming the meniscus configuration in which the convex surface is directed to the image; and the eighth lens component $L_8$ assuming the meniscus configuration in which the convex surface is likewise directed to the image and having the negative refraction power.

Based on the tangible lens structure discussed above, the present invention makes it possible to finely correct not only the aberration in the case of widening of the view angle of the zoom lens but also the aberration in the case of increasing the zoom ratio.

Especially, the lens component $L_1$ of the positive meniscus in the first lens group $G_1$ has its convex surface directed to the object. Directed to the image are the convex surfaces of the lens component $L_6$ of the positive meniscus and the lens components $L_7$, $L_8$ of the negative meniscus in the second lens group $G_2$, the configuration being non-contrary to an out-of-axis beam of light.

Decreased with this arrangement is an incident angle (angle to the normal line on each lens surface) of the out-of-axis beam when traveling through each lens surface of these meniscus lenses. It is therefore feasible to effectively correct a comma aberration and the skew aberration at the wide-angle end.

In the wide-angle zoom lens of this invention, the first lens group $G_1$ is separated into the front group $G_F$ and the rear group $G_R$ to secure a good short-range focusing performance. On the occasion of focusing from the infinity to the short-range, only the front group $G_F$ is moved towards the object. With this arrangement, fluctuations in field curvature and an astigmatism which are apt to be caused excessively in the negative direction during focusing to the short range can be restrained small.

In this case, preferably the following condition is to be met:

$$3.5 < f_R/f_F < 10 \tag{4}$$

where
$f_F$: the focal length of the front group $G_F$,
$f_R$: the focal length of the rear group $G_R$.

The condition (4) prescribes the appropriate allocation of the refraction powers of the front and rear groups $G_F$, $G_R$ of the first lens group.

When exceeding the upper limit of the condition (4), the positive refraction power with which the rear group $G_R$ is burdened decreases. Reduced is an effect of restraining, down to the small level, the field curvature and the astigmatism which are apt to be caused excessively in the negative direction during focusing. The short-range performance remarkably declines.

Whereas if in excess of the lower limit of the condition (4), the astigmatism and the field curvature are excessively produced in the positive direction during focusing. Besides, the fluctuations in aberration thereof grow large.

To attain the favorable correction of a variety of aberrations in the wide-angle zoom lens of this invention, it is desirably that the following conditions be satisfied:

$$1.7 < f_{L1}/f_F < 3.8 \tag{5}$$

$$0.5 < |f_{L2}/f_F| < 1.3, f_{L2} < 0 \tag{6}$$

$$0.6 < f_{L4}/f_F < 1.9 \tag{7}$$

$$1.0 < |f_{L6}/f_2| < 2.3, f_{L6} > 0 \tag{8}$$

$$0.7 < f_{L7}/f_2 < 4.0 \tag{9}$$

$$0.8 < f_{L8}/f_2 < 2.5 \tag{10}$$

$$32 < \nu L1 < 70 \tag{11}$$

$$6 < \nu L8 - \nu L6 < 40 \tag{12}$$

$$11 < \nu L8 - \nu L7 < 45 \tag{13}$$

where
$f_{L1}$: the focal length of the first lens component $L_1$ of the first lens group,
$f_{L2}$: the focal length of the second lens component $L_2$ of the first lens group,
$f_{L4}$: the focal length of the fourth lens component $L_4$ of the first lens group,
$f_{L6}$: the focal length of the sixth lens component $L_6$ of the second lens group,
$f_{L7}$: the focal length of the seventh lens component $L_7$ of the second lens group,
$f_{L8}$: the focal length of the eighth lens component $L_8$ of the second lens group,
$f_F$: the focal length of the front group $G_F$ of the first lens group,
$f_2$: the focal length of the second lens group $G_2$,
$\nu L1$: the Abbe number of the first lens component $L_1$ of the first lens group,
$\nu L6$: the Abbe number of the sixth lens component $L_6$ of the second lens group,
$\nu L7$: the Abbe number of the seventh lens component $L_7$ of the second lens group,
$\nu L8$: the Abbe number of the eighth lens component $L_8$ of the second lens group.

Now, the respective conditions given above will be explained.

The condition (5) prescribes the optimum focal length of the first lens component $L_1$ of the first lens group to obtain a well-balanced correction of the comma aberration. In particular, this condition (5) intends to provide the well-balanced correction of an inward comma aberration caused on the object-side surface of the second lens component $L_2$ on the wide-angle side..

If over the upper limit of the condition (5), the refraction power of the first lens component $L_1$ of the first lens group decreases, and it follows that the inward comma aberration produced on the object-side surface of the second lens component $L_2m$ can not be corrected.

Whereas if over the lower limit of the condition (5), an outward comma aberration is outstandingly caused in the first lens component L of the first lens group. A main point of the first lens group as a whole moves towards the object with respect to the final surface of the first lens group $G_1$. An inter-group spacing (apex spacing) between the first and second lens groups $G_1$, $G_2$ is narrowed. For this reason, a magnification change to the telephoto side is restricted enough not to obtain a large zoom ratio.

The condition (6) prescribes the optimum focal length of the second lens component $L_2$ of the first lens group to finely correct the skew aberration.

In the zoom lens based on the positive/negative two group structure according to the present invention, the large positive skew aberration is caused in the second lens group $G_2$ at the wide-angle end. This tendency becomes remarkable especially in obtaining a wider view angle at the wide-angle end.

In order to correct this positive skew aberration, the refraction power of the second lens component $L_2$ having the negative refraction power in the first lens group is intensified, thereby generating the negative skew aberration. A well-balanced state with the positive skew aberration produced in the second lens group $G_2$ is developed in this manner.

When exceeding the upper limit of the condition (6), the negative refraction power of the second lens component $L_2$ of the first lens group is reduced. The positive skew aberration generated in the second lens group $G_2$ can not be offset by the negative skew aberration caused on the second lens component $L_2$.

Reversely if over the lower limit of the condition (6), the negative refraction power of the second lens component $L_2$ of the first lens group becomes excessive. This is not favorable because of causing deteriorations of various aberrations such as the comma aberration.

The condition (7) prescribes the optimum focal length of the fourth lens component $L_4$ of the first lens group to acquire a large zoom ratio by finely correcting the spherical aberration.

If over the upper limit of the condition (7), the positive refraction power of the fourth lens component $L_4$ of the first lens group diminishes. The main point of the first lens group as a whole moves towards the object with respect to the final surface of the first lens group $G_1$ which surface is closest to the image. The inter-group spacing (apex spacing) between the first and second lens groups $G_1$, $G_2$ is narrowed. In consequence of this, the variation in magnification to the telephoto side is restricted, with the result that the large zoom ratio can not be obtained.

Whereas if over the lower limit of the condition (7), the positive refraction power of the fourth lens component $L_4$ of the first lens group becomes excessive. The spherical aberration is corrected with difficulty, which in turn leads to an deterioration of the image forming performance.

The condition (8) prescribes the focal length of the sixth lens component $L_6$ of the second lens group to correct well the spherical aberration over the entire zoom range. Preferably, the spherical aberrations are corrected independently in the first and second lens groups $G_1$, $G_2$ in order to correct well the spherical aberrations over the entire zoom range. The second lens group $G_2$ has the positive/negative/negative structure. It is therefore desirable to effect the well-balanced correction of the positive spherical aberrations produced in the seventh lens component $L_7$ having the negative refraction power and in the eighth lens component $L_8$ by use of the negative spherical aberration caused on the sixth lens component $L_6$ having the positive refraction power. For this purpose, the condition (8) prescribes an appropriate ratio of the focal length of the sixth lens component $L_6$ with respect to the second lens group $G_2$ in order to appropriately generate the spherical aberration in the sixth lens component $L_6$ of the second lens group.

When exceeding the upper limit of the condition (8), the positive refraction power of the sixth lens component $L_6$ is reduced. The positive spherical aberration remains in the second lens group as a whole, which is unfavorable. Whereas if over the lower limit of the condition (8), the positive refraction power of the sixth lens component $L_6$ becomes excessive. There arises a necessity for individually intensifying the negative refraction power of the seventh and eighth lens components to secure the proper negative refraction power in the second lens group $G_2$. This unfavorably results in deteriorations of the spherical and comma aberrations.

The conditions (9) and (10) prescribe the ratios of the optimum focal lengths of the seventh lens component $L_7$ and the eighth lens component $L_8$ with respect to the second lens group $G_2$ to correct the skew aberration more finely.

When exceeding the upper limit of the condition (9), the negative refraction power of the seventh lens component $L_7$ is reduced. The negative refraction power shared with the eight lens component $L_8$ becomes excessive. As a result, the positive skew aberration caused on the eighth lens component $L_8$ at the wide-angle end becomes remarkable, which is unfavorable. Whereas if over the lower limit of the condition (9), the negative refraction power shared with the seventh lens component $L_7$ becomes excessive, with the result that the positive skew aberration at the wide-angle end becomes outstanding unfavorably.

Under the condition (10), the positive skew aberration at the wide-angle end increases even when exceeding the upper or lower limit of this condition, which is unfavorable.

The conditions (11), (12) and (13) are intended to properly correct chromatic aberrations.

The condition (11) prescribes the Abbe number of the first lens component $L_1$. Even if over any one of the upper and lower limits of the condition (11), it is difficult to attain the well-balanced corrections of an on-the-axis chromatic aberration and a magnification chromatic aberration.

The condition (12) prescribes a difference in the proper Abbe number between the sixth lens component $L_6$ and the eighth lens component $L_8$ of the second lens group. When exceeding the upper limit of the condition (12), the chromatic aberration within the second lens group becomes excessive in terms of correction. It follows that fluctuations in the magnification chromatic aberration and the on-the-axis chromatic aberration in the case of zooming are unfavorably large. If over the lower limit of the condition (12), the intra second lens group chromatic aberration is lack of correction. The fluctuations in the magnification chromatic aberration and the on-the-axis chromatic aberration in the case of zooming becomes unfavorably large.

The condition (13) prescribes a difference in the proper Abbe number between the seventh lens component $L_7$ and the eighth lens component $L_8$ of the second lens group. According to the zoom lens of this invention, of the seventh and eighth lens components $L_7$, $L_8$, the eighth lens component $L_8$ closer to the image surface than the former is relatively low-dispersed, whereby the magnification chromatic aberration which is easy to take place in the eighth lens component $L_8$ is retrained small. The fluctuations in the magnification chromatic aberration on the occasion of zooming are thus reduced.

If over the lower limit of the condition (13), the difference in the Abbe number between the seventh lens component $L_7$ and the eighth lens component $L_8$ is decreased. It is difficult to form the eighth lens component $L_8$ by using a glass material exhibiting sufficiently low dispersion. As a result, the fluctuations in the magnification chromatic aberration at the time of zooming unfavorably increase. Whereas if over the upper limit of the condition (13), the eighth lens component $L_8$ has to be made of a glass material exhibiting a low refractive index in terms of a restraint of the glass material. Caused are high-order bending of the magnification chromatic aberration and a rise in the positive skew aberration at the wide-angle end, which is unfavorable.

On the other hand, for obtaining the compactness as well as attaining widening of view angle and increasing of zoom ratio, the zoom lens of this invention is constructed to satisfy the conditions (1) to (3). In this zoom lens, to make the entire camera more compact, it is desirable to reduce a lens diameter of the image-side eighth lens component $L_8$ of the second lens group $G_2$. The following conditions (14) and (15) prescribe a lens configuration, optimal to reduce the lens diameter of the eighth lens component $L_8$, of the second lens group $G_2$.

$$-1.15 < \frac{rb + ra}{rb - ra} < -1.03 \quad (14)$$

$$1.15 < |rc/Y| < 1.30, rc < 0 \quad (15)$$

where
ra: the radius of curvature of the image-side surface of the seventh lens component $L_7$,
rb: the radius of curvature of the object-side surface of the eighth lens component $L_8$,
rc: the radius of curvature of the image-side surface of the eighth lens component $L_8$,
Y: the maximum image height on the image surface.

Figure 20:
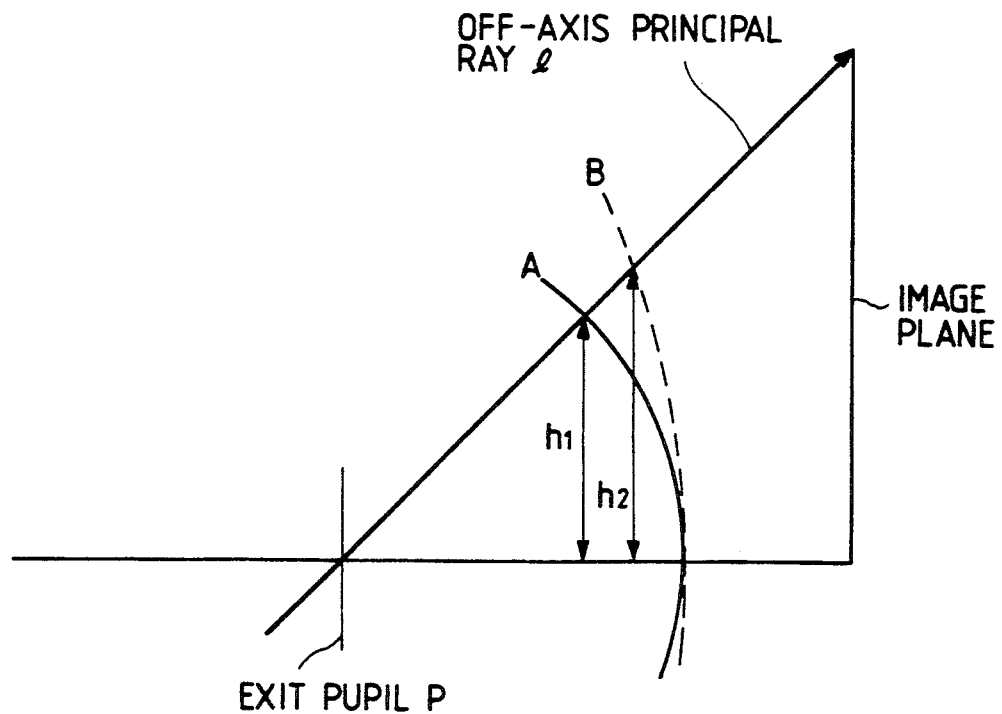
FIG. 20 is a diagram of assistance in explaining the principle for reducing a lens aperture of an eighth lens component in the zoom lens according to the present invention depicted in FIGS. 17 through 19.

In the zoom lens having the positive/negative two group structure according to the present invention, an exit pupil position at the wide-angle end is quite close to the image surface. Especially when, as in the present invention, attaining widening of view angle, that tendency is more remarkable. In the case of such a zoom lens, as illustrated in FIG. 20, a height of the out-of-axis beam traveling through the image-side surface of the eighth lens component $L_8$ becomes smaller at the wide-angle end, as the radius of curvature of the image-side surface of the eighth lens component $L_8$ is reduced. More specifically, referring to FIG. 20, when the radius of curvature of the lens surface on the side of the image surface is small as indicated by A in the Figure, a height h1 at which an out-of-axis main beam 1 passing through the center of an exit pupil P emerges from the lens surface is smaller than an emission height h2 when the radius of curvature is large as indicated by B in FIG. 20. For this reason, the aperture of the eighth lens component $L_8$ can be reduced by decreasing the radius of curvature of the image-side surface of the eighth lens component $L_8$. This is effective in miniaturizing the camera as a whole.

When exceeding the upper limit of the condition (15), the lens diameter of the eighth lens component $L_8$ increases. Whereas if out of the upper limit of the condition (15), although the lens diameter of the eighth lens component $L_8$ diminishes, an on-the-axis central thickness of the second lens group $G_2$ increases. Hence, unfavorably this is a factor for decreasing the back focus or the zoom ratio due to a mechanical interference with the first lens group $G_1$.

Prescribed under the conditions (14) and (15) is a configuration of a pneumatic lens between the eighth lens component $L_8$ and the seventh lens component $L_7$ for optimally correcting the aberration. If over the upper limit of the condition (14), there is increased an emergence angle (angle to the normal line) of the out-of-axis beam emerging from the seventh lens component $L_7$ at the wide-angle end with respect to the image-side surface of the seventh lens component $L_7$. The comma and skew aberrations take place conspicuously at the wide-angle end, which in turn makes the correction difficult. Whereas if out of the lower limit of the condition (14), the seven the and eighth lens components $L_7$, $L_8$ assume such an intensive meniscus configuration in which the concave surfaces are directed to the object. The positive spherical aberrations caused in the two lens components $L_7$, $L_8$ become excessive, which makes the correction difficult.

The following is an explanation of the arrangement common to the embodiments of the present invention which are shown in FIGS. 1 through 19. As discussed above, the first lens group $G_1$ is composed of: the front group $G_F$ consisting of the first lens component $L_1$ assuming a meniscus configuration in which the convex surface is directed to the object and having the positive refraction power, the second lens component $L_2$ including the more intensive concave surface directed to the object and having the negative refraction power, the third lens component $L_3$ having any one of the positive and negative refraction powers and the fourth lens component $L_5$ having the positive refraction power; and the rear group $G_R$ consisting of the fifth lens component $L_5$ having the positive refraction power. The second lens group $G_2$ is composed of the sixth lens component $L_6$ assuming the meniscus configuration in which the convex surface is directed to the image and having the positive refraction power, the seventh lens component $L_7$ assuming the meniscus configuration in which the convex surface is directed to the image and having the negative refraction power and the eighth lens component $L_8$ assuming the meniscus configuration in which the convex surface is similarly directed to the image and having the negative refraction power.

The first to eleventh embodiments are classified roughly into three types, i.e., a type (a), a type (b) and a type (c), depending on the differences in structure between the second, third and fourth lens components mainly of the first lens group. The twelfth to nineteenth embodiments are similar to any one of the types (a) and (c). The constructions thereof will hereinafter be described in detail.

To start with, the first to eleventh embodiments, shown in FIGS. 1 through 11, each containing a wide view angle of approximately 68°–72° according to the present invention are classified into a type (a), a type (b) and a type (c). The construction thereof will be described for every type. The first to sixth embodiments come under the type (a). The seventh embodiment belongs to the type (b). The eighth to eleventh embodiments come under the type (c).

Type (a): Embodiments 1–6

FIGS. 1 through 6 are block diagrams sequentially showing lenses of the first to sixth embodiments as the type (a).

In each of the first to sixth embodiments, the second lens component $L_2$ is constructed as a junction lens assuming the meniscus configuration in which the convex surfaces are directed to the image on the whole by joining a double-concave negative lens to a double-convex positive lens. The third lens component $L_3$ is constructed as a positive lens in which its convex surface exhibiting a more intensive curvature is directed to the object. The fourth lens component $L_4$ is constructed as a junction lens having the positive refraction power on the whole by joining a positive lens in which its convex surface exhibiting the more intensive curvature is directed to the image to a negative meniscus lens having its concave surface directed to the object. In this case, the construction is desirably made to meet the following conditions in terms of correcting well the spherical aberration.

$$0.2 < n_{L2n} - n_{L2p} \tag{16}$$

$$0.27 < n_{L4n} - n_{L4p} \tag{17}$$

where $n_{L2n}$: the refractive index of the negative lens of the second lens component $L_2$, $n_{L2p}$: the refractive index of the positive lens of the second lens component $L_2$, $n_{L4n}$: the refractive index of the negative lens of the fourth lens component $L_4$, $n_{L4p}$: the refractive index of the positive lens of the fourth lens component $L_4$.

The lens system of this type (a) is constructed desirably to satisfy the following conditions with the intention of effecting the well-balanced corrections of the on-the-axis chromatic aberration and the magnification chromatic aberration.

$$-3 < \nu_{L2n} - \nu_{L2p} < 7 \tag{18}$$

$$25 < \nu_{L4p} - \nu_{L4n} < 50 \tag{19}$$

where $\nu_{L2n}$: the Abbe number of the negative lens of the second lens component $L_2$, $\nu_{L2p}$: the Abbe number of the positive lens of the second lens component $L_2$, $\nu_{L4p}$: the Abbe number of the positive lens of the fourth lens component $L_4$, $\nu_{L4n}$: the Abbe number of the negative lens of the fourth lens component $L_4$.

Furthermore, in the lens system of this type (a), more preferably the following conditions are met to make the lens system compact and attain widening of view angle at the same time.

$$3 < q_{L2} < 15 \tag{20}$$

$$2 < q_{L7} < 9 \tag{21}$$

$$0.3 < D_{L2}/f_w < 0.4 \tag{22}$$

where $q_{L2}$: the shape factor of the second lens component $L_2$ of the first lens group, $q_{L7}$: the shape factor of the seventh lens component $L_7$ of the second lens group, $D_{L2}$: on-the-axis thickness of the second lens component $L_2$ of the first lens group, $f_w$: the focal length of the zoom lens at the wide-angle end.

When the shape factor $q_{Li}$ of the i-th lens component $L_i$ is defined such as:

$$qLi = \frac{rb + ra}{rb - ra} \tag{1}$$

where ra is the radius of curvature of the closest-to-object surface of the i-th lens component, and rb is the radius of curvature of the closest-to-image surface thereof.

The condition (20) is associated with the correction of the skew aberration at the wide-angle end. Based on the meniscus configuration in which the concave surface of the second lens component $L_2$ of the first lens group is directed to the object, the curvature of the object-side surface can be made more intensive. Hence, the negative skew aberration is produced more effectively on the object-side concave surface. The well-balanced correction of the positive skew aberration caused in the second lens group $G_2$ is thereby performed, thereby making widening of view angle possible.

The condition (21) is associated with the correction of the skew aberration at the wide-angle end together with the condition (20). The condition (21) is also intended to restrain the positive skew aberration caused in the second lens group $G_2$ down to the small level.

The negative lens component $L_7$ of the second lens group assumes the meniscus configuration in which the convex surface is directed to the image, thereby making it possible to decrease an emergence angle and an incident angle to the normal line of the lens surface when the main beam at the wide-angle end travels through the negative lens component $L_7$. As a result, it is feasible to restrain the occurrence of the positive skew and comma aberrations at the wide-angle end as small as possible.

The condition (22) is associated with transforming the first lens group $G_1$ into a compact one as well as with the correction of the skew aberration at the wide-angle end together with the conditions (20) and (21) described above.

The negative skew aberration is produced effectively on the object-side surface of the second lens component $L_2$ of the first lens group. For this purpose, a light path extending from the object-side surface of the second lens component $L_2$ to a diaphragm is preferably elongated. At this time, an air spacing between the second lens component $L_2$ and the third lens component $L_3$ is widened to obtain a predetermined light path. At this time, as compared with this case, the on-the-axis thickness of the entire first lens group can be made small in the case of obtaining the predetermined light path by increasing the on-the-axis thickness of the second lens component $L_2$ having a refraction power greater than the air. Consequently, the lens system can be made compact.

Type (b): Embodiment 7

Figure 7:
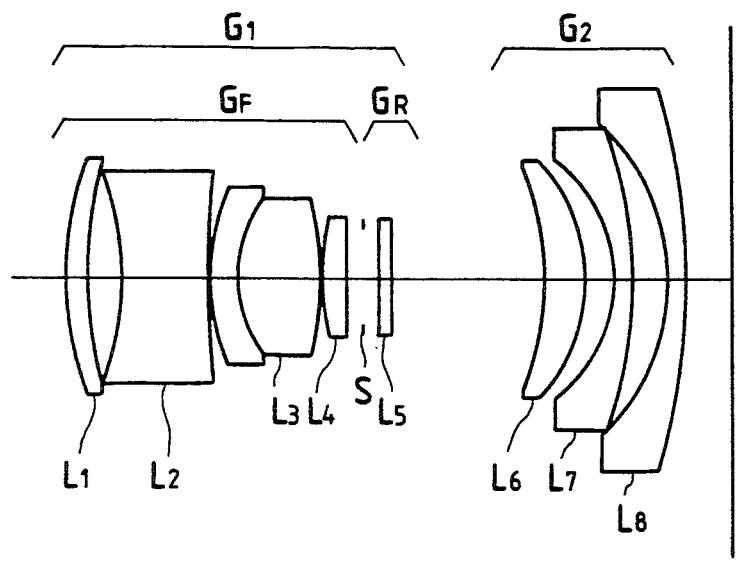
FIG. 7 is a block diagram of a lens unit coming under a type (b) and including a junction lens of which a third lens component of a first lens group is composed, showing a seventh embodiment of the invention.

FIG. 7 is a block diagram illustrating lenses in the seventh embodiment.

In the embodiment of this type (b), the second lens component $L_2$ is composed of the negative lens in which the concave surface exhibiting a more intensive curvature is directed to the object. The third lens component $L_3$ is constructed as a junction lens having the positive refraction power on the whole, this lens being obtained by joining a negative meniscus lens having its concave surface directed to the image to a double-convex positive lens. The fourth lens component $L_4$ is composed of a positive lens in which its convex surface showing a more intensive curvature is directed to the object. In this case, the construction is given preferably to meet the following conditions in terms of correcting the spherical aberration.

$$1.75 < n_{L2}$$

$$0.2 < n_{L3n} - n_{L3p}$$

where
- $n_{L2}$: the refractive index of the second lens component $L_2$,
- $n_{L3n}$: the refractive index of the negative lens of the third lens component $L_3$,
- $n_{L3p}$: the refractive index of the positive lens of the third lens component $L_3$.

Besides, the lens system of this type (b) is constructed to preferably satisfy the following conditions in terms of performing the well-balanced corrections of the on-the-axis chromatic aberration and the magnification chromatic aberration.

$$15 < \nu_{L3p} - \nu_{L3n} < 25 \quad (25)$$

$$60 < \nu_{L4} \quad (26)$$

where
- $\nu_{L3p}$: the Abbe number of the positive lens of the third lens component $L_3$,
- $\nu_{L3n}$: the Abbe number of the negative lens of the third lens component $L_3$,
- $\nu_{L4}$: the Abbe number of the fourth lens component $L_4$.

When making the lens system compact by favorably correcting the skew and comma aberrations at the wide-angle end in the lens system of this type (b), preferably the following conditions are to be met:

$$0.18 < D_{L2}/f_W < 0.4 \quad (27)$$

$$1.5 < q_{L7} < 3 \quad (28)$$

where

- $D_{L2}$: the on-the-axis thickness of the second lens component $L_2$ of the first lens group,
- $q_{L7}$: the shape factor of the seventh lens component $L_7$ of the second lens group,
- $f_W$: the focal length of the zoom lens at the wide-angle end.

The shape factor of the seventh lens component $L_7$ is defined by the formula (1) given above.

The condition (27) is concerned with transforming the first lens group $G_1$ into a compact one as well as with correcting the skew aberration at the wide-angle end. The negative skew aberration is effectively caused on the object-side surface of the second lens component $L_2$ of the first lens group. For this purpose, the light path extending from the object-side surface of the second lens component $L_2$ to the diaphragm is preferably elongated. At this time, as compared with this case, the on-the-axis thickness of the entire first lens group can be made small in the case of obtaining the predetermined light path by increasing the on-the-axis thickness of the second lens component $L_2$ having a refraction power greater than the air. Consequently, the lens system can be made compact.

The condition (28) is concerned with correcting the skew aberration at the wide-angle end and intended to restrain the positive skew aberration caused in the second lens group $G_2$ down to the small level.

The negative lens $L_7$ of the second lens group assumes the meniscus configuration in which the convex surface is directed to the image. Reduced are an emergence angle and an incident angle when the main beam at the wide-angle end penetrates the negative lens $L_7$. As a result, the occurrence of the skew and comma aberrations at the wide-angle end can be restrained as small as possible.

Type (c): Embodiments 8–11

FIGS. 8 through 11 are block diagrams sequentially illustrating lenses of the eighth to eleventh embodiments. In each of the eighth through eleventh embodiments, the second lens component $L_2$ is composed of the negative lens in which the concave surface exhibiting a more intensive curvature is directed to the object. The third lens component $L_3$ is constructed as a junction lens having the positive refraction power on the whole, this lens being obtained by joining a negative meniscus lens having its concave surface directed to the image to a double-convex positive lens. The fourth lens component $L_4$ is constructed as a junction lens having the positive refraction power on the whole, this lens being obtained by joining a double-covex positive lens to a negative meniscus lens having its concave surface directed to the object.

Note that the third lens component $L_3$ may be also composed of a lens component having a weak negative refraction power.

In this case, the construction is desirably made to meet the following conditions in terms of correcting well the spherical aberration.

$$1.75 < n_{L2} \quad (29)$$

$$0.08 < n_{L3n} - n_{L3p} \quad (30)$$

$$0.2 < n_{L4n} - n_{L4p} \quad (31)$$

where $n_{L2}$: the refractive index of the second lens component $L_2$, $n_{L3n}$: the refractive index of the negative lens of the third lens component $L_3$, $n_{L3p}$: the refractive index of the positive lens of the third lens component $L_3$, $n_{L4n}$: the refractive index of the negative lens of the fourth lens component $L_4$, $n_{L4p}$: the refractive index of the positive lens of the fourth lens component $L_4$.

The lens system of this type (c) is constructed desirably to satisfy the following conditions in terms of effecting well-balanced corrections of the on-the-axis chromatic and comma aberrations.

$$-2 < \nu_{L3p} - \nu_{L3n} < 8 \quad (32)$$

$$20 < \nu_{L4p} - \nu_{L4n} < 30 \quad (33)$$

where $\nu_{L3n}$: the Abbe number of the negative lens of the third lens component $L_3$, $\nu_{L3p}$: the Abbe number of the positive lens of the third lens component $L_3$, $\nu_{L4n}$: the Abbe number of the negative lens of the fourth lens component $L_4$, $\nu_{L4p}$: the Abbe number of the positive lens of the fourth lens component $L_4$.

In the lens system of this type (c), preferably the following conditions are satisfied to make widening of view angle compatible with increasing of zoom ratio.

$$-3 < q_{L3} < -0.5 \quad (34)$$

$$2 < q_{L7} < 3 \quad (35)$$

where $q_{L3}$: the configurational factor of the third lens component $L_3$ of the first lens group, $q_{L7}$: the configurational factor of the seventh lens component $L_7$ of the second lens group.

The configurational factors of the third and seventh lens components $L_3$, $L_7$ are defined by the formula (1) described above.

The condition (34) is associated with obtaining a higher zoom ratio. The image-side surface of the third lens component $L_3$ of the first lens group assumes such a configuration that the convex surface having a more intensive curvature is directed. The main point of the firs lens group $G_1$ can be positioned closer to the image, thereby securing sufficient inter-lens-group air spacings. Relative spacings between the respective lens groups can be varied largely when changing the magnification. A higher zoom ratio is thereby attainable.

The condition (35) is concerned with the correction of the skew aberration at the wide-angle end. The condition (35) is also intended to restrain the positive skew aberration produced in the second lens group $G_2$ down to the small level.

Note that in the first through eleventh embodiments, the above-mentioned conditions (1)-(13) preferably fall within a range of numeric values of the following conditions.

$$1.0 < f_1/Y < 1.11 \quad (101)$$

$$1.03 < |f_2/Y| < 1.16, f_2 < 0 \quad (102)$$

$$1.21 < \beta_{2W} < 1.32 \quad (103)$$

$$3.5 < f_R/f_F < 10 \quad (104)$$

$$1.7 < f_{L1}/f_F < 3.8 \quad (105)$$

$$0.6 < |f_{L2}/f_F| < 1.3, f_{L2} < 0 \quad (106)$$

$$0.6 < f_{L4}/f_F < 1.9 \quad (107)$$

$$1.4 < |f_{L6}/f_2| < 2.3, f_{L6} > 0 \quad (108)$$

$$0.9 < f_{L7}/f_2 < 4.0 \quad (109)$$

$$0.8 < f_{L8}/f_2 < 1.8 \quad (110)$$

$$32 < \nu_{L1} < 60 \quad (111)$$

$$6 < \nu_{L8} - \nu_{L6} < 18 \quad (112)$$

$$11 < \nu_{L8} - \nu_{L7} < 28 \quad (113)$$

Taken in each of the first through eleventh embodiments is the meniscus configuration wherein the convex surface of the negative lens $L_7$ of the second lens group is directed to the image. It is therefore feasible to reduce both the emergence angle and the incident angle when the main beam penetrates the negative lens $L_7$ at the wide-angle end. The occurrence of the positive skew and comma aberrations at the wide-angle end can be restrained as small as possible.

In accordance with the embodiments 1 through 5, 7 and 11, the image-side surface of the eighth lens component $L_8$ of the second lens group is configured as a non-spherical surface. In accordance with the embodiments 8 to 10, the image-side surface of the seventh lens component $L_7$ of the second lens group is also non-spherical.

As discussed above, the non-spherical lenses are employed in the second lens group, thereby performing good and effective corrections of the spherical and skew aberrations.

Figure 8:
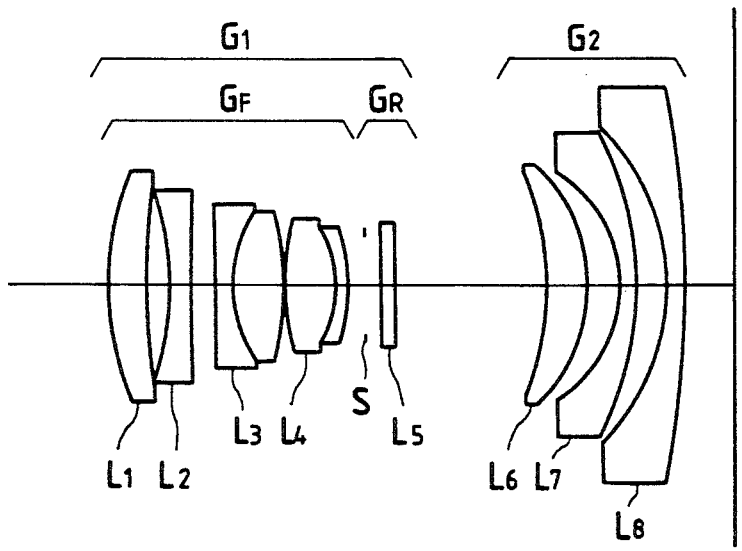
FIGS. 8 through 11 are block diagrams of lens units each coming under a type (c) and including junction lenses of which third and fourth lens components of the first lens group are composed, wherein a second lens group includes a non-spherical lens, showing eighth through eleventh embodiments of the invention.
Figure 9:
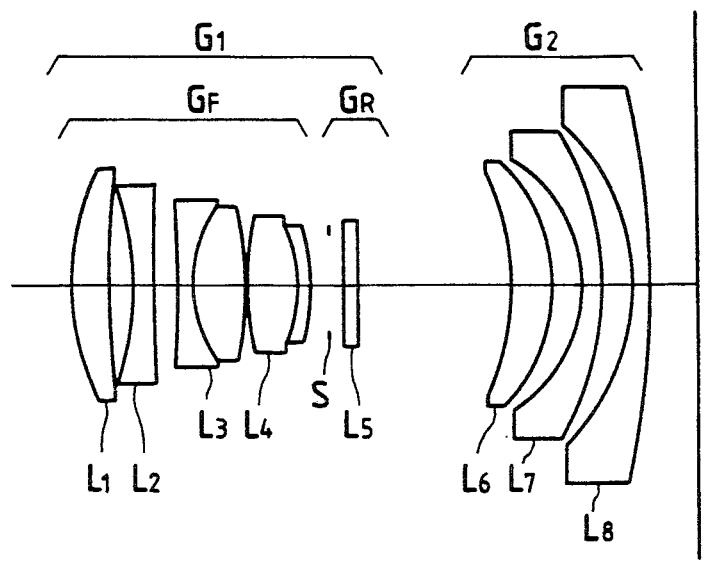
Figure 10:
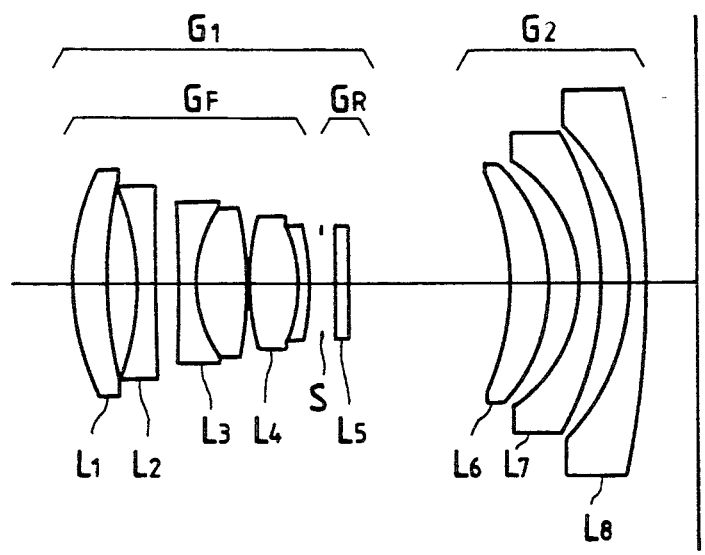
Figure 11:
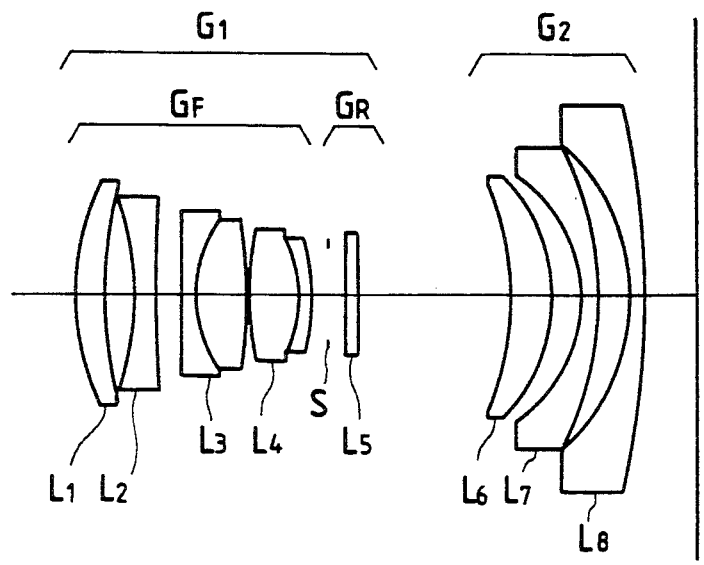

The non-spherical lens of the zoom lens, which is illustrated in each of the embodiments 8 to 10 of FIGS. 8 through 10, is constructed in the following manner. A thin plastic layer (refractive index: 1.49712) (apex thickness: 0.03) is formed on the surface of the spherical glass lens showed with the main refraction power, and this plastic surface is arranged as a non-spherical surface. As described above, the non-spherical surface formed of a composite material is easier in machining than a non-spherical glass lens and is further more advantageous because of small variations in configuration and in refraction power which are due to changes in temperature than a plastic lens.

The following Tables show various elements in the respective embodiments of this invention.

The numbers at the left end in the following Tables indicate the order from the object. In the Tables, r is the radius of curvature, d is the lens-surface spacing, $\gamma$ is the Abbe number, n is the refractive index in a d-line ($\lambda = 587,6$ nm), f is the focal length of the entire system, $F_{NO}$ is the F number, and $2\omega$ is the view angle. The non-spherical configuration is expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive. Note that E+n in the non-spherical coefficient and the cone constant indicates $10^n$, and E−n indicates $10^{-n}$.

From the values of various elements in the respective embodiments, it can be understood that the high zoom ratio equal to or higher than in the prior art is attained despite the fact that he view angles as wide as 72°–68° are obtained in the embodiments 1 through 6. Besides, in the embodiments 7 through 11, it can be also understood that the magnification increases enough to reach a zoom ratio of 2.6 in spite of widening the view angle to reach approximately 69° at the wide-angle end.

TABLE 1

(Embodiment 1)
$f = 28.8 \sim 49.0$, $F_{NO} = 4.1 \sim 7.0$, $2\omega = 72.4 \sim 48.0°$

| | r | d | v | n |
|---|---|---|---|---|
| 1 | 26.361 | 3.30 | 52.3 | 1.74810 |
| 2 | 42.652 | 2.60 | | |
| 3 | −31.414 | 2.00 | 43.3 | 1.84042 |
| 4 | 11.592 | 8.60 | 41.4 | 1.57501 |
| 5 | −39.382 | 0.60 | | |
| 6 | 25.636 | 2.40 | 52.3 | 1.74810 |
| 7 | ∞ | 0.50 | | |
| 8 | ∞ | 3.60 | 69.9 | 1.51860 |
| 9 | −12.813 | 1.70 | 23.0 | 1.86074 |
| 10 | −18.442 | 2.51 | | |
| 11 | ∞ | 1.20 | 52.3 | 1.74810 |
| 12 | −106.230 | (d12) | | |
| 13 | −22.651 | 3.30 | 43.3 | 1.84042 |
| 14 | −15.995 | 2.50 | | |
| 15 | −14.584 | 1.40 | 33.9 | 1.80384 |
| 16 | −18.925 | 2.80 | | |
| 17 | −12.278 | 1.30 | 60.1 | 1.62041 |
| 18 | −141.764 | (Bf) | | |
| f | 28.8000 | 35.0000 | 49.0001 | |
| d12 | 10.2529 | 6.7286 | 2.0511 | |
| Bf | 4.8254 | 11.5881 | 26.8590 | |

18th Surface (Non-Spherical Surface)
Cone constant
$k = 0.1000E + 01$,
Non-spherical coefficient
$c_2 = 0.0$
$c_4 = 0.1768E - 05$,
$c_6 = 0.2898E - 07$
$c_8 = -0.3755E - 09$,
$c_{10} = 0.7895E - 12$

TABLE 2

(Embodiment 2)
$f = 28.8 \sim 58.6$, $F_{NO} = 4.1 \sim 8.3$, $2\omega = 72.3 \sim 40.9°$

| | r | d | v | n |
|---|---|---|---|---|
| 1 | 22.706 | 3.30 | 52.3 | 1.74810 |
| 2 | 31.963 | 3.00 | | |
| 3 | −32.819 | 2.00 | 43.3 | 1.84042 |
| 4 | 11.367 | 8.60 | 41.4 | 1.57501 |
| 5 | −39.260 | 0.60 | | |
| 6 | 24.508 | 2.40 | 55.6 | 1.69680 |
| 7 | ∞ | 0.50 | | |
| 8 | ∞ | 3.60 | 60.3 | 1.51835 |
| 9 | −12.156 | 1.70 | 23.0 | 1.86074 |
| 10 | −17.739 | 2.13 | | |
| 11 | ∞ | 1.20 | 31.6 | 1.75692 |
| 12 | −104.455 | (d12) | | |
| 13 | −19.677 | 3.30 | 44.7 | 1.80218 |
| 14 | −14.016 | 2.50 | | |
| 15 | −12.984 | 1.40 | 33.9 | 1.80384 |
| 16 | −18.925 | 2.80 | | |
| 17 | −12.600 | 1.30 | 60.1 | 1.62041 |
| 18 | −87.211 | (Bf) | | |
| f | 28.8001 | 40.0003 | 58.6001 | |
| d12 | 11.6237 | 6.2244 | 1.8177 | |

TABLE 2-continued (Embodiment 2)
$f = 28.8 \sim 58.6$, $F_{NO} = 4.1 \sim 8.3$, $2\omega = 72.3 \sim 40.9°$

| | r | d | v | n |
|---|---|---|---|---|
| Bf | 3.7307 | 15.3472 | 34.6384 | |

18th Surface (Non-Spherical Surface)
Cone constant
$k = 0.1000E + 01$
Non-spherical coefficient
$c_2 = 0.0$
$c_4 = -0.3287E - 05$,
$c_6 = 0.8718E - 07$
$c_8 = -0.6130E - 09$,
$c_{10} = 0.1132E - 11$

TABLE 3

(Embodiment 3)
$f = 28.8 \sim 63.5$, $F_{NO} = 4.1 \sim 9.0$, $2\omega = 72.3 \sim 38.0°$

| | r | d | v | n |
|---|---|---|---|---|
| 1 | 21.953 | 3.30 | 52.3 | 1.74810 |
| 2 | 29.483 | 3.20 | | |
| 3 | −32.528 | 2.00 | 43.3 | 1.84042 |
| 4 | 11.289 | 8.60 | 41.4 | 1.57501 |
| 5 | −38.408 | 0.60 | | |
| 6 | 25.045 | 2.40 | 55.6 | 1.69680 |
| 7 | ∞ | 0.50 | | |
| 8 | ∞ | 3.60 | 59.0 | 1.51823 |
| 9 | −11.569 | 1.70 | 23.0 | 1.86074 |
| 10 | −16.990 | 2.44 | | |
| 11 | ∞ | 1.20 | 27.6 | 1.75520 |
| 12 | −104.218 | (d12) | | |
| 13 | −18.297 | 3.30 | 44.7 | 1.80218 |
| 14 | −13.294 | 2.50 | | |
| 15 | −12.299 | 1.40 | 33.9 | 1.80384 |
| 16 | −18.000 | 2.80 | | |
| 17 | −12.600 | 1.30 | 60.1 | 1.62041 |
| 18 | −88.747 | (Bf) | | |
| f | 28.8002 | 42.0004 | 63.5013 | |
| d12 | 11.9532 | 6.0443 | 1.6792 | |
| Bf | 3.4257 | 16.7743 | 38.5169 | |

18th Surface (Non-Spherical Surface)
Cone constant
$k = 0.1000E + 01$
Non-spherical coefficient
$c_2 = 0.0$
$c_4 = -0.7999E - 05$,
$c_6 = 0.1303E - 06$
$c_8 = -0.7531E - 09$,
$c_{10} = 0.1224E - 11$

TABLE 4

(Embodiment 4)
$f = 28.8 \sim 68.5$, $F_{NO} = 4.1 \sim 9.8$, $2\omega = 72.3 \sim 35.4°$

| | r | d | v | n |
|---|---|---|---|---|
| 1 | 21.509 | 3.30 | 57.5 | 1.67025 |
| 2 | 30.282 | 3.20 | | |
| 3 | −32.379 | 2.00 | 43.3 | 1.84042 |
| 4 | 11.335 | 8.60 | 41.4 | 1.57501 |
| 5 | −38.801 | 0.60 | | |
| 6 | 24.911 | 2.40 | 55.6 | 1.69680 |
| 7 | ∞ | 0.50 | | |
| 8 | ∞ | 4.00 | 56.4 | 1.50137 |
| 9 | −11.120 | 1.30 | 23.0 | 1.86074 |
| 10 | −16.119 | 2.40 | | |
| 11 | ∞ | 1.20 | 23.0 | 1.86074 |
| 12 | −118.782 | (d12) | | |
| 13 | −17.401 | 3.30 | 44.7 | 1.80218 |
| 14 | −12.731 | 2.50 | | |
| 15 | −11.868 | 1.40 | 33.9 | 1.80384 |
| 16 | −18.000 | 2.80 | | |
| 17 | −12.600 | 1.30 | 60.1 | 1.62041 |
| 18 | −77.705 | (Bf) | | |
| f | 28.8002 | 44.0006 | 68.5013 | |
| d12 | 12.2254 | 5.8415 | 1.5153 | |

TABLE 4-continued (Embodiment 4)
$f = 28.8 \sim 68.5$, $F_{NO} = 4.1 \sim 9.8$, $2\omega = 72.3 \sim 35.4°$

| | r | d | v | n |
|---|---|---|---|---|
| Bf | 3.1590 | 18.2675 | 42.6200 | |

18th Surface (Non-Spherical Surface)
Cone constant
$k = 0.1000E + 01$
Non-spherical coefficient
$c_2 = 0.0$
$c_4 = -0.8892E - 05$,
$c_6 = 0.1322E - 06$
$c_8 = -0.7632E - 09$,
$c_{10} = 0.1216E - 11$

TABLE 5

(Embodiment 5)
$f = 30.8 \sim 78.5$, $F_{NO} = 4.1 \sim 10.5$, $2\omega = 68.6 \sim 31.0°$

| | r | d | v | n |
|---|---|---|---|---|
| 1 | 22.700 | 3.30 | 54.0 | 1.61720 |
| 2 | 41.685 | 2.60 | | |
| 3 | −31.923 | 2.00 | 43.3 | 1.84042 |
| 4 | 12.161 | 8.60 | 40.7 | 1.58144 |
| 5 | −41.581 | 0.60 | | |
| 6 | 27.721 | 2.40 | 50.8 | 1.65844 |
| 7 | ∞ | 0.50 | | |
| 8 | ∞ | 3.60 | 53.5 | 1.54739 |
| 9 | −11.053 | 1.70 | 23.0 | 1.86074 |
| 10 | −17.203 | 2.46 | | |
| 11 | ∞ | 1.20 | 31.6 | 1.75692 |
| 12 | −99.156 | (d12) | | |
| 13 | −20.200 | 3.30 | 44.7 | 1.80218 |
| 14 | −13.351 | 2.50 | | |
| 15 | −12.371 | 1.20 | 47.5 | 1.78797 |
| 16 | −26.547 | 3.10 | | |
| 17 | −13.814 | 1.30 | 60.1 | 1.62041 |
| 18 | −56.300 | (Bf) | | |
| f | 30.8006 | 50.0015 | 78.5039 | |
| d12 | 12.0097 | 5.2988 | 1.3903 | |
| Bf | 3.9843 | 22.0427 | 48.8491 | |

18th Surface (Non-Spherical Surface)
Cone constant
$k = 0.1000E + 01$
Non-spherical coefficient
$c_2 = 0.0$
$c_4 = -0.3123E - 05$,
$c_6 = 0.7469E - 07$
$c_8 = -0.5197E - 09$,
$c_{10} = 0.9731E - 12$

TABLE 6

(Embodiment 6)
$f = 30.8 \sim 68.5$, $F_{NO} = 4.1 \sim 9.1$, $2\omega = 68.3 \sim 35.4°$

| | r | d | v | n |
|---|---|---|---|---|
| 1 | 22.677 | 3.30 | 49.4 | 1.77279 |
| 2 | 32.535 | 2.60 | | |
| 3 | −34.947 | 2.00 | 43.3 | 1.84042 |
| 4 | 11.428 | 8.60 | 40.8 | 1.58144 |
| 5 | −54.425 | 0.60 | | |
| 6 | 29.087 | 2.40 | 49.4 | 1.77279 |
| 7 | ∞ | 0.50 | | |
| 8 | ∞ | 3.60 | 53.6 | 1.54739 |
| 9 | −10.707 | 1.70 | 23.0 | 1.86074 |
| 10 | −16.676 | 2.62 | | |
| 11 | ∞ | 1.20 | 35.2 | 1.74950 |
| 12 | −98.185 | (d12) | | |
| 13 | −19.316 | 3.30 | 45.4 | 1.79668 |
| 14 | −13.297 | 2.50 | | |
| 15 | −12.755 | 1.20 | 46.4 | 1.80411 |
| 16 | −26.000 | 3.60 | | |
| 17 | −13.000 | 1.30 | 60.3 | 1.62041 |
| 18 | −38.074 | (Bf) | | |
| f | 30.8005 | 45.0013 | 68.5036 | |
| d12 | 11.7446 | 5.8622 | 1.4850 | |
| Bf | 3.9190 | 18.1651 | 41.7423 | |

TABLE 7

(Embodiment 7)
$f = 30.8 \sim 78.5$, $F_{NO} = 4.1 \sim 10.4$, $2\omega = 68.6 \sim 31.0°$

| | r | d | v | n |
|---|---|---|---|---|
| 1 | 25.145 | 2.00 | 35.5 | 1.59507 |
| 2 | 40.876 | 2.70 | | |
| 3 | −22.461 | 6.50 | 43.3 | 1.84042 |
| 4 | 64.158 | 0.20 | | |
| 5 | 17.452 | 2.00 | 40.9 | 1.79631 |
| 6 | 9.525 | 6.80 | 59.7 | 1.53996 |
| 7 | −23.454 | 0.20 | | |
| 8 | 22.073 | 2.00 | 69.9 | 1.51860 |
| 9 | −284.716 | 2.64 | | |
| 10 | ∞ | 1.20 | 49.0 | 1.53172 |
| 11 | −69.655 | (d11) | | |
| 12 | −22.439 | 3.30 | 45.4 | 1.79668 |
| 13 | −13.502 | 2.50 | | |
| 14 | −11.699 | 1.20 | 47.5 | 1.78797 |
| 15 | −34.604 | 3.10 | | |
| 16 | −15.949 | 1.30 | 60.1 | 1.62041 |
| 17 | −50.276 | (Bf) | | |
| f | 30.8005 | 50.0015 | 78.5045 | |
| d11 | 12.1245 | 5.4136 | 1.5051 | |
| Bf | 3.7369 | 21.7953 | 48.6021 | |

17th Surface (Non-Spherical Surface)
Cone constant
$k = 0.1000E + 01$
Non-spherical coefficient
$c_2 = 0.0$
$c_4 = -0.1638E - 05$,
$c_6 = 0.7088E - 07$
$c_8 = -0.3773E - 09$,
$c_{10} = 0.4873E - 12$

TABLE 8

(Embodiment 8)
$f = 30.8 \sim 78.5$, $F_{NO} = 4.1 \sim 10.4$, $2\omega = 69.0 \sim 30.9°$

| | r | d | v | n |
|---|---|---|---|---|
| 1 | 22.551 | 3.00 | 54.0 | 1.61720 |
| 2 | 49.176 | 2.10 | | |
| 3 | −24.049 | 1.60 | 46.5 | 1.80411 |
| 4 | 121.580 | 2.00 | | |
| 5 | −132.357 | 1.10 | 47.5 | 1.78797 |
| 6 | 10.198 | 4.10 | 50.8 | 1.65844 |
| 7 | −32.482 | 0.20 | | |
| 8 | 20.505 | 4.00 | 54.6 | 1.51454 |
| 9 | −10.498 | 1.10 | 28.6 | 1.79504 |
| 10 | −15.980 | 2.72 | | |
| 11 | ∞ | 1.20 | 29.5 | 1.71736 |
| 12 | −98.996 | (d12) | | |
| 13 | −22.540 | 3.30 | 52.3 | 1.74810 |
| 14 | −13.009 | 2.50 | | |
| 15 | −10.996 | 1.50 | 46.5 | 1.80411 |
| 16 | −24.800 | 0.03 | 55.9 | 1.49712 |
| 17 | −29.117 | 2.60 | | |
| 18 | −17.000 | 1.30 | 60.1 | 1.62041 |
| 19 | −77.703 | (Bf) | | |
| f | 30.8057 | 50.0057 | 78.5012 | |
| d12 | 12.1357 | 5.4248 | 1.5163 | |
| Bf | 3.9725 | 22.0236 | 48.8141 | |

17th Surface (Non-Spherical Surface)
Cone constant
$k = 0.1000E + 01$
Non-spherical coefficient
$c_2 = 0.0$
$c_4 = -0.9600E - 05$,
$c_6 = 0.2188E - 06$
$c_8 = -0.2960E - 08$,
$c_{10} = 0.6426E - 11$

TABLE 9

(Embodiment 9)
$f = 30.8 \sim 78.5$, $F_{NO} = 4.1 \sim 10.4$, $2\omega = 68.9 \sim 30.9°$

| | r | d | v | n |
|---|---|---|---|---|
| 1 | 21.771 | 3.00 | 49.0 | 1.53172 |
| 2 | 80.103 | 1.90 | | |
| 3 | −24.939 | 1.60 | 45.4 | 1.79668 |
| 4 | 94.807 | 2.00 | | |
| 5 | −70.034 | 1.10 | 47.5 | 1.78797 |

TABLE 9-continued (Embodiment 9)
$f = 30.8 \sim 78.5$, $F_{NO} = 4.1 \sim 10.4$, $2\omega = 68.9 \sim 30.9°$

| | r | d | v | n |
|---|---|---|---|---|
| 6 | 10.420 | 4.10 | 50.8 | 1.65844 |
| 7 | −29.415 | 0.20 | | |
| 8 | 20.544 | 4.00 | 54.6 | 1.51454 |
| 9 | −10.402 | 1.10 | 28.6 | 1.79504 |
| 10 | −15.873 | 2.73 | | |
| 11 | ∞ | 1.20 | 32.2 | 1.67270 |
| 12 | −92.833 | (d12) | | |
| 13 | −22.852 | 3.30 | 45.4 | 1.79668 |
| 14 | −13.392 | 2.50 | | |
| 15 | −11.286 | 1.50 | 43.3 | 1.84042 |
| 16 | −24.800 | 0.03 | 55.9 | 1.49712 |
| 17 | −29.117 | 2.60 | | |
| 18 | −17.000 | 1.30 | 60.0 | 1.64000 |
| 19 | −75.985 | (Bf) | | |
| f | 30.8069 | 50.0090 | 78.5095 | |
| d12 | 12.1718 | 5.4609 | 1.5524 | |
| Bf | 4.0166 | 22.0691 | 48.8634 | |

17th Surface (Non-spherical Surface)
Cone constant
$k = 0.1000E + 01$
Non-spherical coefficient
$c_2 = 0.0$
$c_4 = -0.8055E - 05$,
$c_6 = 0.1774E - 06$
$c_8 = -0.2356E - 08$,
$c_{10} = 0.3921E - 11$

TABLE 10

(Embodiment 10)
$f = 30.8 \sim 78.5$, $F_{NO} = 4.1 \sim 10.4$, $2\omega = 69.0 \sim 30.9°$

| | r | d | v | n |
|---|---|---|---|---|
| 1 | 20.505 | 3.00 | 54.6 | 1.51454 |
| 2 | 46.724 | 2.10 | | |
| 3 | −23.630 | 1.60 | 46.5 | 1.80411 |
| 4 | 218.298 | 2.00 | | |
| 5 | −98.990 | 1.10 | 47.5 | 1.78797 |
| 6 | 10.130 | 4.10 | 50.8 | 1.65844 |
| 7 | −31.025 | 0.20 | | |
| 8 | 20.414 | 4.00 | 54.6 | 1.51454 |
| 9 | −10.751 | 1.10 | 28.6 | 1.79504 |
| 10 | −16.341 | 1.94 | | |
| 11 | ∞ | 1.20 | 32.2 | 1.67270 |
| 12 | −92.799 | (d12) | | |
| 13 | −22.417 | 3.30 | 45.4 | 1.79668 |
| 14 | −13.251 | 2.50 | | |
| 15 | −11.169 | 1.50 | 43.3 | 1.84042 |
| 16 | −25.812 | 0.03 | 55.9 | 1.49712 |
| 17 | −28.800 | 2.50 | | |
| 18 | −16.898 | 1.30 | 60.0 | 1.64000 |
| 19 | −65.760 | (Bf) | | |
| f | 30.8002 | 50.0000 | 78.5001 | |
| d12 | 12.8119 | 6.1311 | 2.2401 | |
| Bf | 4.0808 | 22.2483 | 49.2160 | |

17th Surface (Non-Spherical Surface)
Cone constant
$k = 0.1000E + 01$
Non-spherical coefficient
$c_2 = 0.0$
$c_4 = -0.8158E - 05$,
$c_6 = 0.1488E - 06$
$c_8 = -0.1631E - 08$,
$c_{10} = 0.5443E - 12$

TABLE 11

(Embodiment 11)
$f = 30.8 \sim 78.5$, $F_{NO} = 4.1 \sim 10.4$, $2\omega = 69.0 \sim 31.0°$

| | r | d | v | n |
|---|---|---|---|---|
| 1 | 19.531 | 2.30 | 55.6 | 1.69680 |
| 2 | 31.351 | 2.50 | | |
| 3 | −24.151 | 1.60 | 46.5 | 1.80411 |
| 4 | 69.660 | 2.00 | | |
| 5 | 180.336 | 1.10 | 47.5 | 1.78797 |
| 6 | 10.019 | 4.10 | 50.8 | 1.65844 |
| 7 | −38.949 | 0.20 | | |
| 8 | 21.184 | 4.00 | 54.6 | 1.51454 |

TABLE 11-continued (Embodiment 11)
$f = 30.8 \sim 78.5$, $F_{NO} = 4.1 \sim 10.4$, $2\omega = 69.0 \sim 31.0°$

| | r | d | v | n |
|---|---|---|---|---|
| 9 | −10.439 | 1.10 | 28.6 | 1.79504 |
| 10 | −15.939 | 2.65 | | |
| 11 | ∞ | 1.20 | 28.3 | 1.72825 |
| 12 | −95.401 | (d12) | | |
| 13 | −22.986 | 3.30 | 49.4 | 1.77279 |
| 14 | −13.394 | 2.50 | | |
| 15 | −11.549 | 1.20 | 43.3 | 1.84042 |
| 16 | −27.441 | 2.60 | | |
| 17 | −15.950 | 1.30 | 60.1 | 1.62041 |
| 18 | −68.571 | (Bf) | | |
| f | 30.8011 | 50.0032 | 78.5089 | |
| d12 | 12.1095 | 5.3986 | 1.4901 | |
| Bf | 4.2036 | 22.2628 | 49.0717 | |

Figure 12:
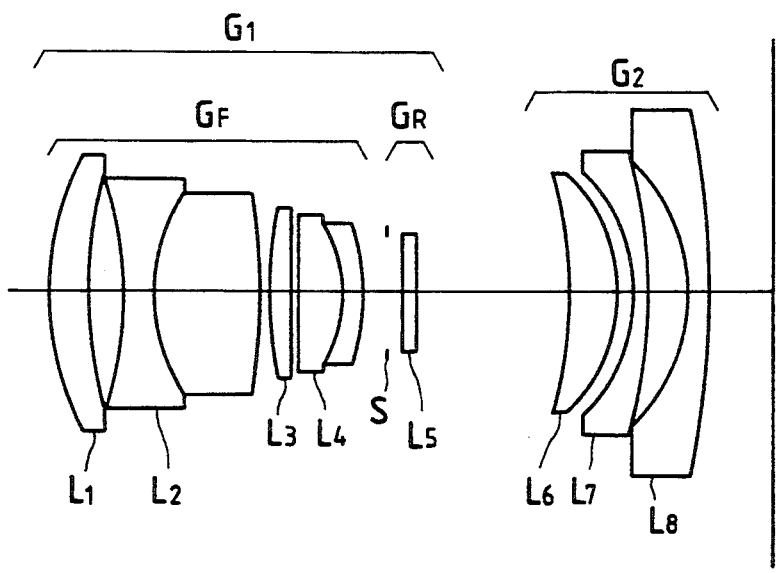
FIGS. 12 and 13 are block diagrams of lens units each coming under the same type (a) with FIG. 6 and constructed entirely of the spherical lenses, showing twelfth and thirteenth embodiments of the invention.
Figure 13:
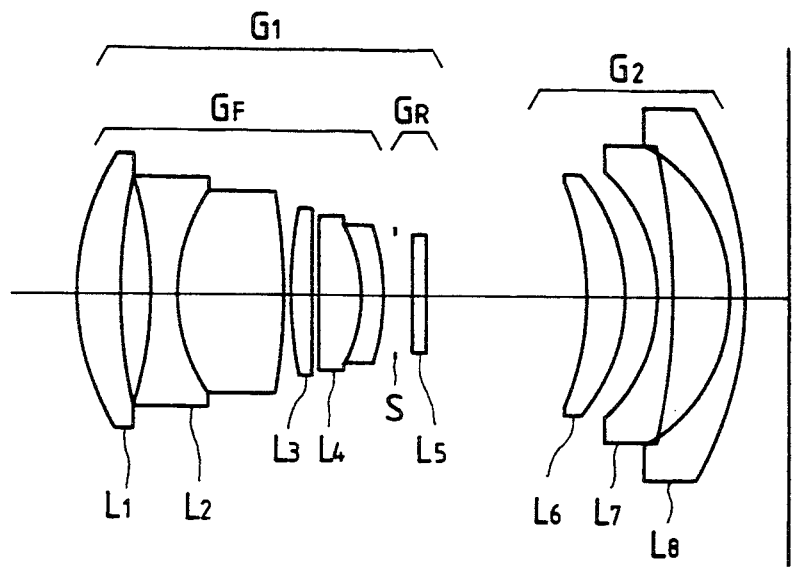

18th Surface (Non-Spherical Surface)
Cone constant
$k = 0.1000E + 01$
Non-spherical coefficient
$c_2 = 0.0$
$c_4 = -0.5153E - 05$,
$c_6 = 0.8831E - 07$
$c_8 = -0.5498E - 09$,
$c_{10} = 0.8733E - 12$ FIGS. 12 and 13 are lens block diagrams showing the eleventh and thirteenth embodiments. The twelfth and thirteenth embodiment come under the type (a) in which the second and fourth lens components $L_2$, $L_4$ are composed of junction lenses. Provided is a zoom lens having a view angle of approximately 65°–70° and approximately 2.5-fold zoom ratio. In both of these embodiments, as in the same way with the sixth embodiment, all the lens components are constructed by spherical lenses.

More specifically, in the twelfth and thirteenth embodiments, the second lens component $L_2$ consists of a junction lens assuming the meniscus configuration wherein the convex surfaces are all directed to the image on the whole, this junction lens being formed by joining the double-concave negative lens to the double convex positive lens. The third lens component $L_3$ is composed of the positive lens wherein its convex surface exhibiting a more intensive curvature is directed to the object. The fourth lens component $L_4$ consists of a junction lens having the positive refraction power on the whole, this junction lens being constructed by joining the positive lens in which its convex surface exhibiting a more intensive curvature is directed to the image to the negative meniscus lens having its concave surface directed to the object.

In accordance with the twelfth and thirteenth embodiments, the above-mentioned conditions (1)–(13) desirable fall within a range of numerical values of the following conditions (201)–(213).

$$1.14 < f_1/Y < 1.19 \tag{201}$$

$$1.0 < |f_2/Y| < 1.09, f_2 < 0 \tag{202}$$

$$1.21 < \beta_{2W} < 1.32 \tag{203}$$

$$3.5 < f_R/f_F < 10 \tag{204}$$

$$1.7 < f_{L1}/f_F < 3.8 \tag{205}$$

$$0.6 < |f_{L2}/f_F| < 1.3, f_{L2} < 0 \tag{206}$$

$$0.6 < f_{L4}/f_F < 1.9 \tag{207}$$

$$1.0 < |f_{L6}/f_2| < 2.0, f_{L6} > 0 \tag{208}$$

$0.7 < f_{L7}/f_2 < 1.5$ (209)

$0.8 < f_{L8}/f_2 < 2.5$ (210)

$40 < \nu_{L1} < 60$ (211)

$18 < \nu_{L8} - \nu_{L6} < 26$ (212)

$15 < \nu_{L8} - \nu_{L7} < 28$ (213)

Moreover, as in the sixth embodiment of the type (a), the twelfth and thirteenth embodiments are configured so that the foregoing conditions (16)–(22) fall within a range of numerical values of the following conditions (216)–(220), whereby the spherical aberration can be corrected well.

$0.2 < n_{L2n} - n_{L2p}$ (216)

$0.27 < n_{LAn} - n_{LAp}$ (217)

$-3 < \nu_{L2n} - \nu_{L2p} < 7$ (218)

$25 < \nu_{LAp} - \nu_{LAn} < 35$ (219)

$3 < q_{L2} < 6$ (220)

$1.1 < q_{L7} < 3$ (221)

$0.25 < D_{L2}/f_W < 0.4$ (222)

Note that in the twelfth and thirteenth embodiments, the light path extending from the object-side surface of the second lens component L₂ to the diaphragm S is preferably, as in the same way with sixth embodiment of the type (a), elongated to effectively produce the negative skew aberration on the object-side surface of the second lens component L₂ of the first lens group G₁. On this occasion, an air spacing between the second lens component l₂ and the third lens component L₃ is expanded to obtain a predetermined light path. As compared with this case, an on-the-axis thickness of the entire first lens group can be made small in a case where a predetermined light path is obtained by increasing the on-the-axis thickness of the second lens component L₂ having a refraction power greater than the air. Hence, the lens system can be made compact.

The following Tables 12 and 13 show various elements in the respective embodiments of this invention.

In the following Tables 12 and 13, the numbers at the left end indicate the order from the object. In these Tables, r is the radius of curvature, d is the lens-surface spacing, ν is the Abbe number, n is the refractive index in a d-line (λ=587.6 nm), f is the focal length of the entire system, $F_{NO}$ is the F number, and 2 is the view angle.

Note that in this embodiment, the lens system is composed of spherical lenses, but, as a matter of course, non-spherical lenses are properly employed.

TABLE 12

(Embodiment 12)
f = 32.8~83.0, $F_{NO}$ = 3.60~9.12, 2ω = 64.7~29.3°

| | r | d | ν | n |
|---|---|---|---|---|
| 1 | 24.667 | 3.30 | 50.8 | 1.65844 |
| 2 | 45.566 | 2.60 | | |
| 3 | −29.557 | 2.00 | 43.3 | 1.84042 |
| 4 | 14..000 | 8.60 | 40.7 | 1.58144 |
| 5 | −46.563 | 0.60 | | |
| 6 | 32.361 | 1.80 | 45.0 | 1.74400 |
| 7 | ∞ | 0.50 | | |
| 8 | ∞ | 3.60 | 53.5 | 1.54739 |
| 9 | −10.957 | 1.70 | 23.0 | 1.86074 |

TABLE 12-continued (Embodiment 12)
f = 32.8~83.0, $F_{NO}$ = 3.60~9.12, 2ω = 64.7~29.3°

| | r | d | ν | n |
|---|---|---|---|---|
| 10 | −17.338 | 3.24 | | |
| 11 | ∞ | 1.20 | 23.0 | 1.86074 |
| 12 | −112.757 | (d12) | | |
| 13 | −34.637 | 3.90 | 47.1 | 1.67003 |
| 14 | −13.537 | 1.50 | | |
| 15 | −12.910 | 1.20 | 44.7 | 1.80218 |
| 16 | −37.000 | 3.50 | | |
| 17 | −14.000 | 1.30 | 67.9 | 1.59319 |
| 18 | −73.452 | (B.f) | | |
| f | 32.8015 | 50.0033 | 83.0080 | |
| d12 | 12.3786 | 6.2070 | 1.5278 | |
| B.f | 4.9876 | 20.8571 | 51.3055 | |

TABLE 13

(Embodiment 13)
f = 32.8~83.0, $F_{NO}$ = 3.60~9.12, 2ω = 65.0~29.4°

| | r | d | ν | n |
|---|---|---|---|---|
| 1 | 21.988 | 3.30 | 54.0 | 1.61720 |
| 2 | 41.048 | 2.60 | | |
| 3 | −31.447 | 2.00 | 43.3 | 1.84042 |
| 4 | 14.000 | 8.60 | 40.7 | 1.58144 |
| 5 | −51.410 | 0.60 | | |
| 6 | 31.859 | 1.80 | 45.0 | 1.74400 |
| 7 | ∞ | 0.50 | | |
| 8 | ∞ | 3.60 | 53.5 | 1.54739 |
| 9 | −10.723 | 1.70 | 23.0 | 1.86074 |
| 10 | −17.246 | 2.30 | | |
| 11 | ∞ | 1.20 | 23.0 | 1.86074 |
| 12 | −112.757 | (d12) | | |
| 13 | −24.842 | 3.30 | 45.4 | 1.79668 |
| 14 | −14.883 | 2.50 | | |
| 15 | −13.611 | 1.20 | 46.5 | 1.80411 |
| 16 | −54.617 | 4.60 | | |
| 17 | −14.000 | 1.30 | 67.9 | 1.59319 |
| 18 | −29.539 | (B.f) | | |
| f | 32.8017 | 50.0038 | 83.0090 | |
| d12 | 12.7273 | 6.5557 | 1.8765 | |
| B.f | 3.1636 | 19.0333 | 49.4822 | |

Figure 14:
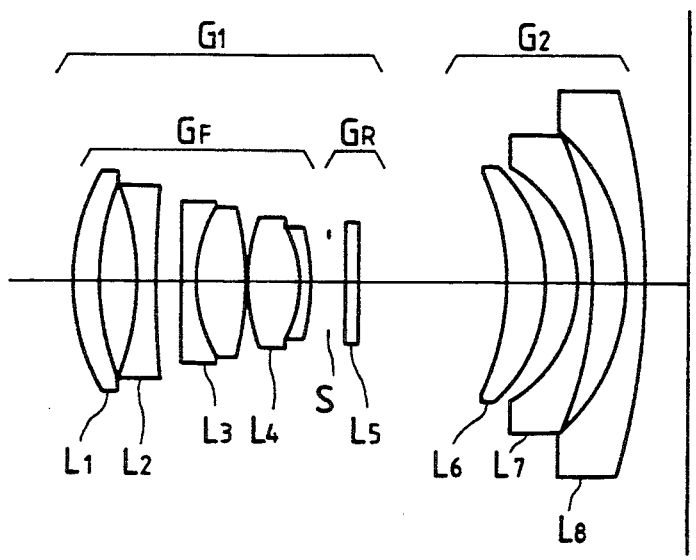
FIGS. 14 to 16 are block diagrams of lens units each, as in the same way with FIGS. 8 to 11, including junction lenses of which the third and fourth lens components are composed, wherein the second lens group includes the non-spherical lens, showing the fourteenth to sixteenth embodiments of the invention.
Figure 15:
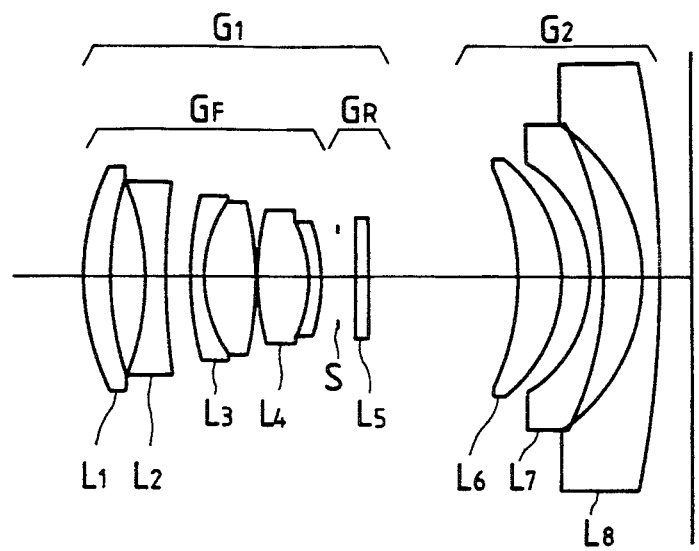
Figure 16:
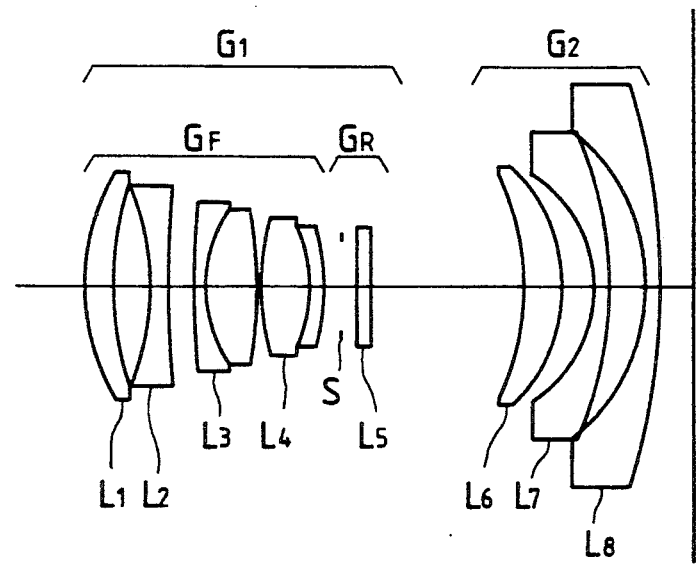

The fourteenth though sixteenth embodiments are similar to the type (c) in which, as illustrated in FIGS. 14 through 16, the third lens component L₃ and the fourth lens component L₄ are composed of junction lenses. Provided is a zoom lens having a view angle as wide as approximately 70°–72° and a more than 2.5-fold zoom ratio. In each of the embodiments, as in the same way with the eleventh embodiment, the image-side surface of the eighth lens component L₈ is formed as a non-spherical surface.

To be more specific, in each of the fourteenth through sixteenth embodiments, the third lens component L₃ is constructed by a double convex junction lens having a weak positive refraction power on the whole by joining the negative lens having its concave surface directed to the image to the double convex positive lens. The fourth lens component L₄ is composed of a double convex junction lens having a positive refraction power on the whole by joining the double convex positive lens to the negative meniscus lens having its concave surface directed to the object. Note that the third lens component L₃ may be constructed as a junction lens having a weak negative refraction power.

In the fourteenth through sixteenth embodiments, the above-mentioned conditions (1)–(13) desirably fall within a range of numerical values of the following conditions (301)–(313).

$1.0 < f_1/Y < 1.1$ (301)

$0.9 < |f_2/Y| < 1.01, f_2 < 0$      (302)

$1.21 < \beta_{2W} < 1.32$      (303)

$3.5 < f_R/f_F < 10$      (304)

$1.7 < f_{L1}/f_F < 3.8$      (305)

$0.5 < |f_{L2}/f_F| < 1.3, f_{L2} < 0$      (306)

$0.6 < f_{L4}/f_F < 1.2$      (307)

$1.4 < |f_{L6}/f_2| < 2.0, f_{L6} < 0$      (308)

$0.8 < f_{L7}/f_2 < 1.5$      (309)

$0.8 < f_{L8}/f_2 < 2.2$      (310)

$32 < \nu_{L1} < 60$      (311)

$6 < \nu_{L8} - \nu_{L6} < 40$      (312)

$11 < \nu_{L8} - \nu_{L7} < 45$      (313)

Besides, in accordance with the fourteenth to sixteenth embodiments, as in the same manner with the eleventh embodiment of the type (c), the third and fourth lens components $L_3$, $L_4$ are, as in the same way with the eleventh embodiment discussed above, composed of the junction lenses. The foregoing conditions (29)–(31) fall within a range of numerical values of the following conditions (329)–(331), whereby the spherical aberration can be corrected well.

$1.75 < n_{L2}$      (329)

$0.2 < n_{L3n} - n_{L3p}$      (330)

$0.2 < n_{L4n} - n_{L4p}$      (331)

Besides, for performing the well-balanced corrections of the on-the-axis chromatic aberration and the magnification chromatic aberration, the foregoing conditions (32) and (33) desirably fall within a range of numerical values of the following conditions (332) and (333).

$6 < \nu_{L3p} - \nu_{L3n} < 15$      (332)

$10 < \nu_{L4p} - \nu_{L4n} < 25$      (333)

Under the conditions (330) and (332), the junction surface of the third lens component $L_3$ has a structure adaptive to produce the positive spherical aberration in order to effect the well-balanced correction of the negative spherical aberration which is apt to be caused on the first lens group. Particularly, as prescribed under the condition (332), a proper difference in the Abbe number $\nu$ between the two lenses constituting the junction surface is given. The spherical aberration of a g-line, which tends to be excessive toward the negative at the telephoto end, is thereby corrected well.

Note that a lower limit value of the condition (332) is set preferably to [9] for correcting the g-line spherical aberration more favorably.

In the lens system of the present invention, the above-mentioned condition (35) desirably falls within a range of numerical values of the following condition (335) to make widening of view angle compatible with increasing of zoom ratio.

$2 < q_{L7} < 3$      (335)

Note that in the fourteenth through sixteenth embodiments also, the seventh negative lens component $L_7$ of the second lens group $G_2$ is composed of the meniscus lens having its convex surface directed to the image. Reduced are the emergence angle and the incident angle when the main beam travels through the negative lens $L_7$ at the wide-angle end. It is therefore feasible to restrain the occurrence of the positive skew and comma aberrations at the wide-angle end as small as possible.

In accordance with the fourteenth to sixteenth embodiments, as in the same manner with the eleventh embodiment, the image-side surface of the eighth negative lens component $L_8$ of the second lens group $G_2$ is formed as a non-spherical surface. With this arrangement, the spherical aberration, the astigmatism and the skew aberration can be corrected well and effectively.

The following Tables 14 to 16 show various elements of the respective embodiments of this invention.

The numbers at the left end in the following Tables 14 to 16 indicate the order from the object. In the Tables, r is the radius of curvature, d is the lenssurface spacing, $\nu$ is the Abbe number, n is the refractive index in a d-line ($\lambda = 587.6$ nm), f is the focal length of the entire system, $F_{NO}$ is the F number, and $2\omega$ is the view angle. the non-spherical configuration is expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive. Note that E+n in the non-spherical coefficient and the cone constant indicates $10^n$, and E−n indicates $10^{-n}$.

TABLE 14

| (Embodiment 14) | | | |
|---|---|---|---|
| $f = 29.8 \sim 78.5$, | $F_{NO} = 4.1 \sim 10.8$, | $2\omega = 70.8° \sim 31.1°$ | |
| r | d | v | n |
| 1   18.312 | 2.30 | 51.1 | 1.73350 |
| 2   28.459 | 2.50 | | |
| 3   −24.299 | 1.60 | 46.5 | 1.80411 |
| 4   88.659 | 2.00 | | |
| 5   747.848 | 1.10 | 47.5 | 1.78797 |
| 6   11.874 | 4.10 | 59.0 | 1.51823 |
| 7   −24.512 | 0.20 | | |
| 8   18.381 | 4.00 | 59.0 | 1.51823 |
| 9   −10.738 | 1.10 | 40.9 | 1.79631 |
| 10   −16.243 | 2.66 | | |
| 11   ∞ | 1.20 | 57.0 | 1.62280 |
| 12   −81.587 | (d12) | | |
| 13   −21.409 | 3.30 | 47.5 | 1.78797 |
| 14   −12.944 | 2.50 | | |
| 15   −10.998 | 1.20 | 45.4 | 1.79668 |
| 16   −29.477 | 2.90 | | |
| 17   −15.950 | 1.30 | 60.1 | 1.62041 |
| 18   −60.131 | (B.f) | | |
| f   29.8002 | 50.0008 | 78.5017 | |
| d12   11.9272 | 5.1605 | 1.5363 | |

TABLE 14-continued (Embodiment 14)
$f = 29.8 \sim 78.5, \quad F_{NO} = 4.1 \sim 10.8, \quad 2\omega = 70.8° \sim 31.1°$

| | r | d | υ | n |
|---|---|---|---|---|
| B.f | 3.5037 | 22.2117 | 48.6066 | |

18th Surface (Non-Spherical Surface)
Cone constant
$k = 0.1000E + 01$
Non-spherical coefficient
$c_2 = 0.0$
$c_4 = -0.5098E - 05$
$c_6 = 0.1095E - 06$
$c_8 = -0.6103E - 09$
$c_{10} = 0.8906E - 12$

TABLE 15

(Embodiment 15)
$f = 28.8 \sim 78.5, \quad F_{NO} = 4.1 \sim 11.2, \quad 2\omega = 72.2° \sim 30.9°$

| | r | d | υ | n |
|---|---|---|---|---|
| 1 | 19.971 | 2.30 | 37.9 | 1.72342 |
| 2 | 27.854 | 2.70 | | |
| 3 | −22.230 | 1.60 | 43.3 | 1.84042 |
| 4 | 51.474 | 2.00 | | |
| 5 | 25.157 | 1.10 | 46.5 | 1.80411 |
| 6 | 11.054 | 4.10 | 59.0 | 1.51823 |
| 7 | −31.668 | 0.20 | | |
| 8 | 21.715 | 4.00 | 59.0 | 1.51823 |
| 9 | −10.792 | 1.10 | 40.9 | 1.79631 |
| 10 | −16.642 | 2.69 | | |
| 11 | ∞ | 1.20 | 45.9 | 1.54814 |
| 12 | −71.806 | (d12) | | |
| 13 | −20.681 | 3.30 | 47.5 | 1.78797 |
| 14 | −12.645 | 2.50 | | |
| 15 | −10.815 | 1.20 | 39.8 | 1.86994 |
| 16 | −25.890 | 2.90 | | |
| 17 | −15.000 | 1.30 | 82.6 | 1.49782 |
| 18 | −114.790 | (B.f) | | |
| f | 28.8005 | 47.0010 | 78.5027 | |
| d12 | 11.9991 | 5.6215 | 1.5718 | |
| B.f | 2.8165 | 19.4171 | 48.1498 | |

18th Surface (Non-Spherical Surface)
Cone constant
$k = 0.1000E + 01$
Non-spherical coefficient
$c_2 = 0.0$
$c_4 = -0.4350E - 05$
$c_6 = 0.1138E - 06$
$c_8 = -0.6877E - 09$
$c_{10} = 0.1053E - 11$

TABLE 16

(Embodiment 16)
$f = 28.8 \sim 78.5, \quad F_{NO} = 4.1 \sim 11.2, \quad 2\omega = 72.3° \sim 31.0°$

| | r | d | υ | n |
|---|---|---|---|---|
| 1 | 17.833 | 2.30 | 42.0 | 1.66755 |
| 2 | 27.414 | 2.70 | | |
| 3 | −23.215 | 1.60 | 43.3 | 1.84042 |
| 4 | 70.344 | 2.00 | | |
| 5 | 58.313 | 1.10 | 46.5 | 1.80411 |
| 6 | 11.470 | 4.10 | 59.0 | 1.51823 |
| 7 | −26.200 | 0.20 | | |
| 8 | 19.191 | 4.00 | 59.0 | 1.51823 |
| 9 | −11.504 | 1.10 | 40.9 | 1.79631 |
| 10 | −16.793 | 2.71 | | |
| 11 | ∞ | 1.20 | 57.0 | 1.62280 |
| 12 | −81.587 | (d12) | | |
| 13 | −20.365 | 3.30 | 47.5 | 1.78797 |
| 14 | −12.525 | 2.50 | | |
| 15 | −10.690 | 1.20 | 45.4 | 1.79668 |
| 16 | −29.477 | 2.90 | | |
| 17 | −15.950 | 1.30 | 60.1 | 1.62041 |
| 18 | −58.651 | (B.f) | | |
| f | 28.8003 | 47.0003 | 78.5007 | |
| d12 | 12.0787 | 5.7011 | 1.6514 | |

TABLE 16-continued (Embodiment 16)
$f = 28.8 \sim 78.5, \quad F_{NO} = 4.1 \sim 11.2, \quad 2\omega = 72.3° \sim 31.0°$

| | r | d | υ | n |
|---|---|---|---|---|
| B.f | 2.7568 | 19.3571 | 48.0888 | |

Figure 17:
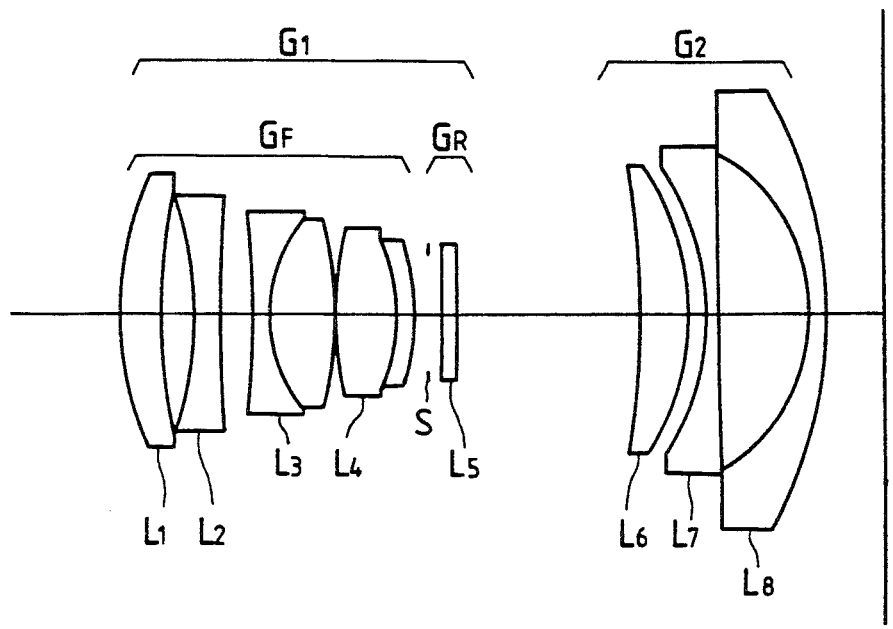
FIGS. 17 to 19 are block diagrams of lens units each, as in the same way with FIGS. 8 through 11, including the junction lenses of which the third and fourth lens components are composed and all consisting of the spherical lenses, showing the seventeenth through nineteenth embodiments of the invention.
Figure 18:
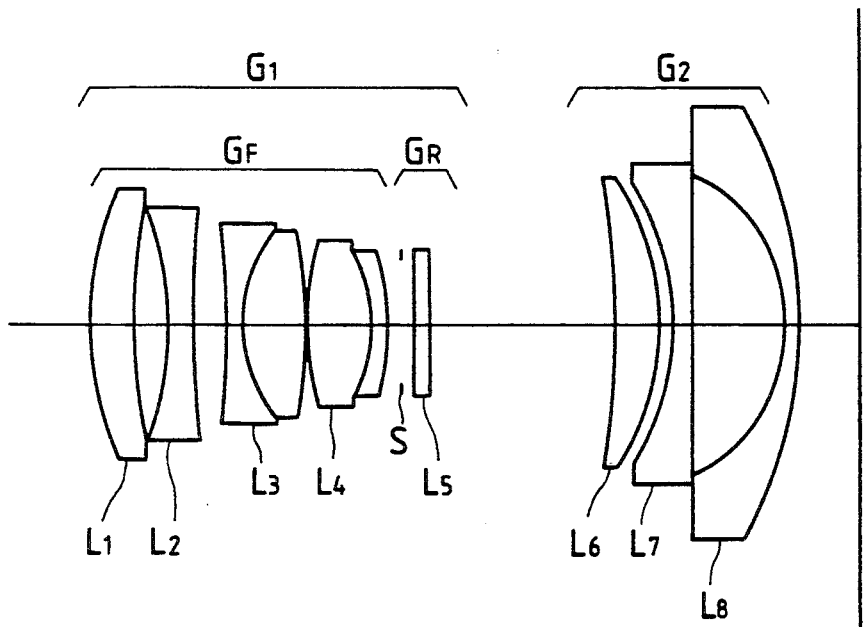
Figure 19:
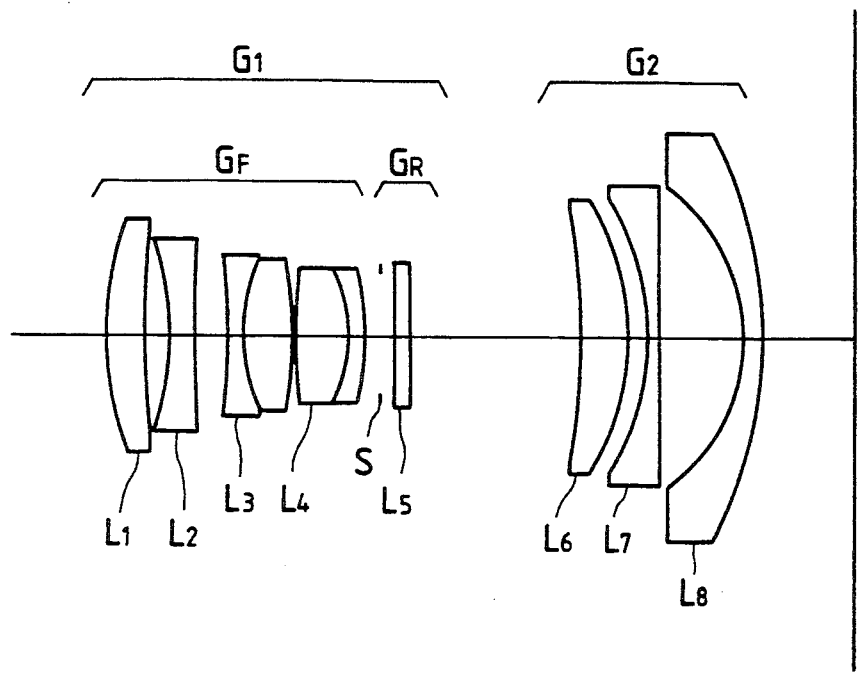

18th Surface (Non-Spherical Surface)
Cone constant
$k = 0.1000E + 01$
Non-spherical coefficient
$c_2 = 0.0$
$c_4 = -0.4884E - 05$
$c_6 = 0.1036E - 06$
$c_8 = -0.5858E - 09$
$c_{10} = 0.8374E - 11$ FIGS. 17 through 19 illustrate the seventeenth to nineteenth embodiments, each similar to the type (c), of this invention, wherein the principle shown in FIG. 20 is applied to a zoom lens all the lens components of which are composed of spherical lenses.

To be specific, in each of the seventeenth through nineteenth embodiments, the first lens unit is, as depicted in FIGS. 17 to 19, constructed of the first lens group $G_1$ having the positive refraction power and the second lens group $G_2$ having the negative refraction power. The first lens group $G_1$ is composed of the front group $G_F$ and the rear group $G_R$. The front group $G_F$ includes: the first lens component $L_1$ assuming the meniscus configuration in which the convex surface thereof is directed to the object and having the positive refraction power; the second lens component $L_2$ having its more intensive concave surface directed to the object and the negative refraction power; the third lens component $L_3$ having the positive refraction power; and the fourth lens component $L_4$ having the positive refraction power. The rear group $G_R$ consists of the fifth lens component having the positive refraction power.

On the other hand, the second lens group $G_2$ consists of: the sixth lens component $L_6$ assuming the meniscus configuration in which the convex surface thereof is directed to the image and having the positive refraction power; the seventh lens component $L_7$ assuming the meniscus configuration in which the convex surface thereof is directed to the image and having the negative refraction power; and the eighth lens component $L_8$ assuming the meniscus configuration in which the convex surface thereof is directed similarly to the image and having the negative refraction power.

Furthermore, the third lens component $L_3$ of the first lens group $G_1$ is constructed as a double-convex junction lens having the weak positive refraction power on the whole, this junction lens being formed by joining the negative lens including its concave surface directed to the image to the double-convex positive surface. The fourth lens component $L_4$ is constructed as a double-convex junction lens having the positive refraction power on the whole, this junction lens being formed by joining the double convex positive lens to the negative meniscus lens including its concave surface directed to the object. It is to be noted that the third lens component $L_3$ may be constructed as a junction lens having a weak negative refraction power.

For the purpose of further reducing the lens diameter of the eighth lens component $L_8$, the seventh and eighth lens components $L_7$, $L_8$ are configured particularly to meet the above-described conditions (14) and (15).

Besides, in the seventeenth to nineteenth embodiments also, it is desirable that the foregoing conditions (1) to (13) fall within a range of numerical values of the following conditions (401)–(413).

$$1.0 < f_1/Y < 1.12 \quad (401)$$

$$0.9 < |f_2/Y| < 1.16, f_2 < 0 \quad (402)$$

$$1.21 < \beta_{2W} < 1.40 \quad (403)$$

$$3.5 < f_R/f_F < 10 \quad (404)$$

$$2.0 < f_{L1}/f_F < 3.0 \quad (405)$$

$$0.6 < |f_{L2}/f_F| < 1.2, f_{L2} < 0 \quad (406)$$

$$0.6 < f_{L4}/f_F < 1.2 \quad (407)$$

$$1.0 < |f_{L6}/f_2| < 1.5, f_{L6} > 0 \quad (408)$$

$$0.7 < f_{L7}/f_2 < 1.2 \quad (409)$$

$$1.2 < f_{L8}/f_2 < 1.8 \quad (410)$$

$$40 < \nu_{L1} \quad (411)$$

$$18 < \nu_{L8} - \nu_{L6} < 30 \quad (412)$$

$$11 < \nu_{L8} - \nu_{L7} < 28 \quad (413)$$

Note that the upper limit of the condition (411) is limited naturally by the existing glass material.

Moreover, the seventeenth through nineteenth embodiments are also, as in the respective embodiments of the type (c), constructed so that the foregoing conditions (29)–(35) fall within a range of numerical values of the following conditions (429)–(435). The spherical aberration can be thereby corrected well. It is therefore possible to make widening of view angle of the lens system compatible with increasing of zoom ratio.

$$1.75 < n_{L2} \quad (429)$$

$$0.05 < n_{L3n} - n_{L3p} \quad (430)$$

$$0.2 < n_{L4n} - n_{L4p} \quad (431)$$

$$-2 < \nu_{L3p} - \nu_{L3n} < 13 \quad (432)$$

$$15 < \nu_{L4p} - \nu_{L4n} < 30 \quad (433)$$

$$-3 < q_{L3} < -0.5 \quad (434)$$

$$1 < q_{L7} < 3 \quad (435)$$

Note that in the seventeenth through nineteenth embodiments also, the seventh negative lens component L7 of the second lens group G2 involves the use of a meniscus lens having its convex surface directed to the image. Reduced are the emergence angle and the incident angle when the main beam at the wide-angle end penetrates the negative lens L7. The occurrence of the positive skew and comma aberrations at the wide-angle end can be thereby restrained small.

The Tables 17, 18 and 19 show various elements of the seventh, eighteenth and nineteenth embodiments of this invention. Throughout the Tables, the numbers at the left end indicate the order from the object. Sequentially, the symbols, r, d, $\nu$, and n are the radius of curvature, the lens-surface spacing, the Abbe number and the refractive index in the d-line ($\lambda$ = 587.6 nm). The symbol $2\omega$ is the view angle, f is the focal length of the entire system, and $F_{NO}$ is the F number. In each embodiment, the non-spherical surfaces are not employed. The lenses are based entirely on the spherical surfaces, thereby providing a simple construction.

Tables 20 and 21 show conditional correspondence numerical values of the first through nineteenth embodiments of this invention, where the maximum image height Y in the Tables 20 and 21 is 21.6.

TABLE 17

(Embodiment 17)
f = 30.8~78.5, $F_{NO}$ = 4.1~10.4, $2\omega$ = 69.1~31.0°

|  | r | d | $\nu$ | n |
|---|---|---|---|---|
| 1 | 21.607 | 3.00 | 69.9 | 1.51860 |
| 2 | 53.566 | 2.10 | | |
| 3 | −21.390 | 1.60 | 47.5 | 1.78797 |
| 4 | 119.647 | 2.00 | | |
| 5 | −71.239 | 1.10 | 49.4 | 1.77279 |
| 6 | 9.865 | 4.10 | 48.1 | 1.71700 |
| 7 | −29.068 | 0.20 | | |
| 8 | 23.924 | 4.00 | 53.5 | 1.54739 |
| 9 | −10.680 | 1.10 | 28.6 | 1.79504 |
| 10 | −17.795 | 1.86 | | |
| 11 | −99.983 | 1.10 | 58.5 | 1.61272 |
| 12 | −45.987 | (d12) | | |
| 13 | −57.766 | 3.30 | 35.2 | 1.74950 |
| 14 | −16.773 | 1.00 | | |
| 15 | −17.725 | 1.00 | 39.8 | 1.86994 |
| 16 | −278.298 | 6.10 | | |
| 17 | −11.499 | 1.20 | 60.1 | 1.62041 |
| 18 | −26.533 | (B.f) | | |
| F | 30.8000 | 49.9997 | 78.5003 | |
| d12 | 11.9284 | 5.2487 | 1.3583 | |
| B.f | 3.6560 | 21.7830 | 48.6912 | |

TABLE 18

(Embodiment 18)
f = 30.8~78.5, $F_{NO}$ = 4.1~10.4, $2\omega$ = 69.0~31.0°

|  | r | d | $\nu$ | n |
|---|---|---|---|---|
| 1 | 21.856 | 3.00 | 69.9 | 1.51860 |
| 2 | 56.752 | 2.10 | | |
| 3 | −21.710 | 1.60 | 47.5 | 1.78797 |
| 4 | 131.049 | 2.00 | | |
| 5 | −57.967 | 1.10 | 49.4 | 1.77279 |
| 6 | 9.708 | 4.10 | 48.1 | 1.71700 |
| 7 | −28.234 | 0.20 | | |
| 8 | 23.603 | 4.00 | 53.5 | 1.54739 |
| 9 | −10.646 | 1.10 | 28.6 | 1.79504 |
| 10 | −17.746 | 1.86 | | |
| 11 | −99.987 | 1.10 | 58.5 | 1.61272 |
| 12 | −46.043 | (d12) | | |
| 13 | −67.661 | 3.30 | 35.2 | 1.74950 |
| 14 | −16.203 | 0.80 | | |
| 15 | −17.198 | 1.20 | 39.8 | 1.86994 |
| 16 | −386.612 | 6.10 | | |
| 17 | −11.367 | 1.20 | 60.1 | 1.62041 |
| 18 | −27.021 | (B.f) | | |
| F | 30.7992 | 50.0017 | 78.5023 | |
| d12 | 11.8781 | 5.2081 | 1.3241 | |
| B.f | 3.7924 | 21.9161 | 48.8154 | |

TABLE 19

(Embodiment 19)
f = 33.0~82.5, $F_{NO}$ = 4.5~11.2, $2\omega$ = 66.2~29.6°

|  | r | d | $\nu$ | n |
|---|---|---|---|---|
| 1 | 21.960 | 2.50 | 69.9 | 1.51860 |
| 2 | 56.121 | 1.80 | | |
| 3 | −19.191 | 1.60 | 47.5 | 1.78797 |
| 4 | 212.707 | 2.00 | | |
| 5 | −47.795 | 1.10 | 49.4 | 1.77279 |
| 6 | 12.353 | 3.20 | 48.1 | 1.71700 |
| 7 | −23.658 | 0.20 | | |
| 8 | 24.957 | 3.60 | 59.7 | 1.53996 |
| 9 | −9.916 | 1.10 | 33.9 | 1.80384 |
| 10 | −16.667 | 1.98 | | |
| 11 | −79.944 | 1.10 | 49.0 | 1.53172 |
| 12 | −38.463 | (d12) | | |

TABLE 19-continued (Embodiment 19)
$f = 33.0 \sim 82.5$, $F_{NO} = 4.5 \sim 11.2$, $2\omega = 66.2 \sim 29.6°$

| | r | d | v | n |
|---|---|---|---|---|
| 13 | −54.569 | 3.30 | 35.2 | 1.74950 |
| 14 | −16.852 | 1.20 | | |
| 15 | −17.724 | 1.00 | 39.8 | 1.86994 |
| 16 | −279.144 | 5.70 | | |
| 17 | −11.679 | 1.20 | 60.1 | 1.62041 |
| 18 | −26.800 | (B.f) | | |
| f | 32.9592 | 50.0023 | 82.4608 | |
| d12 | 11.1361 | 5.6081 | 1.4001 | |
| B.f | 5.8951 | 22.0404 | 52.7890 | |

TABLE 20

(Condition Correspondence Numerical Value Table)

| Embodiments | Condition 1<br>101, 201<br>301, 401<br>$\frac{f_1}{Y}$ | Condition 2<br>102, 202<br>302, 402<br>$\left\|\frac{f_2}{Y}\right\|$ | Condition 3<br>103, 203<br>303, 403<br>$\beta_{2w}$ | Condition 4<br>104, 204<br>304, 404<br>$\frac{f_R}{f_F}$ | Condition 5<br>105, 205<br>305, 405<br>$\frac{f_{L1}}{f_F}$ | Condition 6<br>106, 206<br>306, 406<br>$\left\|\frac{f_{L2}}{f_F}\right\|$ |
|---|---|---|---|---|---|---|
| 1 | 1.061 | 1.157 | 1.275 | 5.240 | 3.133 | 1.180 |
| 2 | 1.071 | 1.111 | 1.244 | 5.000 | 3.295 | 1.185 |
| 3 | 1.071 | 1.083 | 1.244 | 5.000 | 3.505 | 1.187 |
| 4 | 1.071 | 1.065 | 1.244 | 5.000 | 3.487 | 1.179 |
| 5 | 1.107 | 1.042 | 1.288 | 4.517 | 2.611 | 1.142 |
| 6 | 1.107 | 1.111 | 1.288 | 4.517 | 2.914 | 1.027 |
| 7 | 1.107 | 1.042 | 1.288 | 4.518 | 3.614 | 0.660 |
| 8 | 1.108 | 1.042 | 1.288 | 4.808 | 2.254 | 0.866 |
| 9 | 1.108 | 1.042 | 1.288 | 4.808 | 1.925 | 0.859 |
| 10 | 1.102 | 1.043 | 1.294 | 4.810 | 2.384 | 0.922 |
| 11 | 1.107 | 1.042 | 1.288 | 4.510 | 2.374 | 0.763 |
| 12 | 1.169 | 1.079 | 1.298 | 4.226 | 2.479 | 1.027 |
| 13 | 1.169 | 1.079 | 1.298 | 4.226 | 2.321 | 1.030 |
| 14 | 1.075 | 0.995 | 1.283 | 4.679 | 2.282 | 0.842 |
| 15 | 1.056 | 0.963 | 1.263 | 4.781 | 3.171 | 0.668 |
| 16 | 1.056 | 0.963 | 1.263 | 4.781 | 2.545 | 0.752 |
| 17 | 1.103 | 1.041 | 1.293 | 4.803 | 2.357 | 0.798 |
| 18 | 1.102 | 1.040 | 1.294 | 4.819 | 2.322 | 0.820 |
| 19 | 1.100 | 1.042 | 1.387 | 4.816 | 2.366 | 0.776 |

| Embodiments | Condition 7<br>107, 207<br>307, 407<br>$\frac{f_{L4}}{f_F}$ | Condition 8<br>108, 208<br>308, 408<br>$\left\|\frac{f_{L6}}{f_2}\right\|$ | Condition 9<br>109, 209<br>309, 409<br>$\frac{f_{L7}}{f_2}$ | Condition 10<br>110, 210<br>310, 410<br>$\frac{f_{L8}}{f_2}$ | Condition 11<br>111, 211<br>311, 411<br>$\nu_{L1}$ | Condition 12<br>112, 212<br>312, 412<br>$\nu_{L8} - \nu_{L6}$ | Condition 13<br>113, 213<br>313, 413<br>$\nu_{L8} - \nu_{L7}$ |
|---|---|---|---|---|---|---|---|
| 1 | 1.748 | 2.113 | 3.695 | 0.870 | 52.3 | 16.8 | 26.2 |
| 2 | 1.677 | 2.010 | 2.395 | 0.996 | 52.3 | 15.4 | 26.2 |
| 3 | 1.616 | 2.003 | 2.318 | 1.018 | 52.3 | 15.4 | 26.2 |
| 4 | 1.626 | 1.956 | 2.098 | 1.062 | 57.5 | 15.4 | 26.2 |
| 5 | 1.501 | 1.796 | 1.357 | 1.327 | 54.0 | 15.4 | 12.6 |
| 6 | 1.453 | 1.795 | 1.352 | 1.353 | 49.4 | 14.9 | 13.9 |
| 7 | 1.365 | 1.625 | 1.020 | 1.698 | 35.5 | 14.7 | 12.6 |
| 8 | 0.748 | 1.592 | 1.062 | 1.572 | 54.0 | 7.8 | 13.6 |
| 9 | 0.747 | 1.563 | 1.067 | 1.534 | 49.0 | 14.6 | 16.7 |
| 10 | 0.754 | 1.558 | 1.038 | 1.595 | 54.6 | 14.6 | 16.7 |
| 11 | 0.752 | 1.605 | 1.092 | 1.503 | 55.6 | 10.7 | 16.8 |
| 12 | 1.444 | 1.325 | 1.085 | 1.262 | 50.8 | 20.8 | 23.2 |
| 13 | 1.465 | 1.744 | 0.980 | 1.987 | 54.0 | 22.5 | 21.4 |
| 14 | 0.722 | 1.649 | 1.055 | 1.646 | 51.1 | 12.6 | 14.7 |
| 15 | 0.819 | 1.681 | 1.066 | 1.674 | 37.9 | 35.1 | 42.8 |
| 16 | 0.753 | 1.674 | 1.042 | 1.718 | 42.0 | 12.6 | 14.7 |
| 17 | 0.809 | 1.355 | 0.969 | 1.500 | 69.9 | 24.9 | 20.3 |
| 18 | 0.803 | 1.231 | 0.922 | 1.450 | 69.9 | 24.9 | 20.3 |
| 19 | 0.825 | 1.393 | 0.969 | 1.529 | 69.9 | 24.9 | 20.3 |

TABLE 21

(Conditional Correspondence Numerical Value Table: continued)

| Embodiments | Condition 14<br>$\frac{rb + ra}{rb - ra}$ | Condition 15<br>$\|rc/Y\|$ | Condition 16<br>216<br>$n_{L2n} - n_{L2p}$ | Condition 17, 31<br>217, 331<br>431<br>$n_{L4n} - n_{L4p}$ | Condition 18<br>218<br>$\nu_{L2n} - \nu_{L2p}$ | Condition 19, 33<br>219, 333<br>433<br>$\nu_{L4p} - \nu_{L4n}$ | Condition 20<br>220<br>$q_{L2}$ |
|---|---|---|---|---|---|---|---|
| 1 | — | — | 0.26541 | 0.34214 | 1.9 | 46.9 | 8.885 |
| 2 | — | — | 0.26541 | 0.34239 | 1.9 | 37.3 | 11.191 |
| 3 | — | — | 0.26541 | 0.34251 | 1.9 | 36.0 | 12.064 |
| 4 | — | — | 0.26541 | 0.35937 | 1.9 | 33.4 | 11.084 |

TABLE 21-continued (Conditional Correspondence Numerical Value Table: continued)

| | | | | | | | |
|---|---|---|---|---|---|---|---|
| 5 | — | — | 0.25898 | 0.31335 | 2.6 | 30.5 | 7.611 |
| 6 | — | — | 0.25898 | 0.31335 | 2.5 | 30.6 | 4.588 |
| 7 | — | — | — | — | — | — | — |
| 8 | — | — | — | 0.28050 | — | 26.0 | — |
| 9 | — | — | — | 0.28050 | — | 26.0 | — |
| 10 | — | — | — | 0.28050 | — | 26.0 | — |
| 11 | — | — | — | 0.28050 | — | 26.0 | — |
| 12 | — | — | 0.25898 | 0.31335 | 2.6 | 30.5 | 4.476 |
| 13 | — | — | 0.25898 | 0.31335 | 2.6 | 30.5 | 4.151 |
| 14 | — | — | — | 0.27808 | — | 18.1 | — |
| 15 | — | — | — | 0.27808 | — | 18.1 | — |
| 16 | — | — | — | 0.27808 | — | 18.1 | — |
| 17 | −1.086 | 1.228 | — | 0.24765 | — | 24.0 | — |
| 18 | −1.061 | 1.251 | — | 0.24765 | — | 24.9 | — |
| 19 | −1.087 | 1.241 | — | 0.26388 | — | 24.8 | — |

| Embodiments | Condition 21, 28, 35 221, 335 435 $q_{L7}$ | Condition 22, 27 222 $\frac{D_{L2}}{f_w}$ | Condition 23, 29 329 429 $n_{L2}$ | Condition 24, 30 330 430 $n_{L3n} - n_{L3p}$ | Condition 25, 32 332 432 $\nu_{L3p} - \nu_{L3n}$ | Condition 26 $\nu_{L4}$ | Condition 34 434 $q_{L3}$ |
|---|---|---|---|---|---|---|---|
| 1 | 7.719 | 0.368 | — | — | — | — | — |
| 2 | 5.371 | 0.368 | — | — | — | — | — |
| 3 | 5.315 | 0.368 | — | — | — | — | — |
| 4 | 4.871 | 0.368 | — | — | — | — | — |
| 5 | 2.745 | 0.344 | — | — | — | — | — |
| 6 | 2.926 | 0.344 | — | — | — | — | — |
| 7 | 2.022 | 0.211 | 1.84042 | 0.25635 | 18.8 | 69.9 | — |
| 8 | 2.214 | — | 1.80411 | 0.12953 | 3.3 | — | −1.650 |
| 9 | 2.266 | — | 1.79668 | 0.12953 | 3.3 | — | −2.448 |
| 10 | 2.267 | — | 1.80411 | 0.12953 | 3.3 | — | −1.913 |
| 11 | 2.453 | — | 1.80411 | 0.12953 | 3.3 | — | −0.644 |
| 12 | 2.072 | 0.323 | — | — | — | — | — |
| 13 | 1.664 | 0.323 | — | — | — | — | — |
| 14 | 2.190 | — | 1.80411 | 0.26974 | 11.5 | — | — |
| 15 | 2.435 | — | 1.80412 | 0.28588 | 12.5 | — | — |
| 16 | 2.138 | — | 1.80412 | 0.28588 | 12.5 | — | — |
| 17 | 1.136 | — | 1.78797 | 0.05579 | −1.3 | — | −2.379 |
| 18 | 1.093 | — | 1.78797 | 0.05579 | −1.3 | — | −2.899 |
| 19 | 1.136 | — | 1.78797 | 0.05579 | −1.3 | — | −2.960 |

From the various elements of the Tables 1 through 19, in accordance with the embodiments of the present invention, the following comprehension is induced. For instance, as in the first embodiment, the zoom ratio is 2.5, and the view angle at the wide-angle end is 68°. As in the thirteenth embodiment, the zoom ratio is 2.5, and the view angle at the wide-angle end is 65°. As in the fifteenth embodiment, the zoom ratio is 2.7, and the view angle at the wide-angle end is 72°. Attained are the compactness and widening of view angle as wide as approximately 65°-72°. At the same moment, the magnification is increased to such an extent that the zoom ratio reaches 1.7-2.7.

As discussed above, according to the present invention, widening of view angle is attained more effectively by the zoom lens with a high zoom ratio than by the conventional zoom lens for the compact camera. There is obtained the compact wide-angle zoom lens exhibiting an extremely good image forming performance in all the variable power areas.

Although the illustrative embodiments of the present invention have been describe din detail with reference to the accompanying drawings, it is to be understood that the present invention is not limited to those embodiments. Various changes or modifications may be effected therein by one skilled in the art without departing from the scope or spirit of the invention.

What is claimed is:

1. A wide angle zoom lens comprising: a first lens group having a positive refractive power and a second lens group having a negative refractive power, with the distance between the first and second lens groups being variable for varying the magnification of the wide angle zoom lens, said first lens group, sequentially from an object, including:

a front group composed of a first lens component assuming a meniscus configuration in which its convex surface is directed to said object and having a positive refractive power, a second lens component having a more intensive concave surface directed to said object and having a negative refractive power, a third lens component having either one of positive and negative refractive powers and a fourth lens component having a positive refractive power; and a rear group composed of a fifth lens component having a positive refractive power, said second lens group, sequentially from said object, including: a sixth lens component assuming a meniscus configuration in which its convex surface is directed to an image and having a positive refractive power, a seventh lens component assuming a meniscus configuration in which its convex surface is directed to said image and having a negative refractive power and an eighth lens component assuming a meniscus configuration in which its convex surface is directed to said image and having a negative refractive power, said wide angle zoom lens being constructed to satisfy the following conditions:

$$1.0 < f_1/Y < 1.19$$

$$0.9 < |f_2/Y| < 1.16, f_2 < 0$$

$$1.21 < \beta_{2W} < 1.40$$

where $f_1$ is the focal length of said first lens group, $f_2$ is the focal length of said second lens group, Y is the maximum image height on an image surface, and $\beta_{2W}$ is the image forming magnification of said second lens group at a wide-angle end.

2. The wide angle zoom lens according to claim 1, wherein said front group of said first lens group is so constructed as to be movable along said optical axis to vary a spacing between said front group and said rear group for focusing and is constructed to satisfy the following condition:

$$3.5 < f_R/f_F < 10$$

where $f_F$ is the focal length of said front group, and $f_R$ is the focal length of said rear group.

3. The wide angle zoom lens according to claim 1, wherein said front group of said first lens group and said second lens group are constructed to satisfy the following conditions:

$$1.7 < f_{L1}/f_F < 3.8$$

$$0.5 < |f_{L2}/f_F| < 1.3, F_{L2} < 0$$

$$0.6 < f_{L4}/f_F < 1.9$$

$$1.0 < |f_{L6}/f_2| < 2.3, f_{L6} > 0$$

$$0.7 < f_{L7}/f_2 < 4.0$$

$$0.8 < f_{L8}/f_2 < 2.5$$

$$32 < \nu L_1 < 70$$

$$6 < \nu_{L8} - \nu_{L6} < 40$$

$$11 < \nu_{L8} - \nu_{L7} < 45$$

where
- $f_{L1}$: the focal length of said first lens component of said first lens group,
- $f_{L2}$: the focal length of said second lens component of said first lens group,
- $f_{L4}$: the focal length of said fourth lens component of said first lens group,
- $f_{L6}$: the focal length of said sixth lens component of said second lens group,
- $f_{L7}$: the focal length of said seventh lens component of said second lens group,
- $f_{L8}$: the focal length of said eighth lens component of said second lens group,
- $f_F$: the focal length of said front group of said first lens group,
- $f_2$: the focal length of said second lens group,
- $\nu_{L1}$: the Abbe number of said first lens component of said first lens group,
- $\nu_{L6}$: the Abbe number of said sixth lens component of said second lens group,
- $\nu_{L7}$: the Abbe number of said seventh lens component of said second lens group,
- $\nu_{L8}$: the Abbe number of said eighth lens component of said second lens group.

4. The wide angle zoom lens according to claim 1, wherein said second lens component of said first lens group is composed of a double concave negative lens and a double convex positive lens joined to said negative lens and is constructed as a junction lens assuming a meniscus configuration in which its convex surface is directed to said image on the whole, said third lens component is constructed of a positive lens in which its convex surface exhibiting a more intensive curvature is directed to said object, said fourth lens component is composed of a positive lens in which its convex surface exhibiting a more intensive curvature is directed to said image and a negative meniscus lens joined to said positive lens and having its concave surface directed to said object and also has a positive refractive power on the whole, and said first lens group and said second lens group are constructed to satisfy the following conditions:

$$1.0 < f_1/Y < 1.11$$

$$1.03 < |f_2/Y| < 1.16, f_2 < 0$$

$$1.21 < \beta_{2W} < 1.32.$$

5. The wide angle zoom lens according to claim 4, wherein said front group of said first lens group is so constructed as to be movable along the optical axis to vary a spacing between said front group and said rear group for focusing and is also constructed to satisfy the following condition:

$$3.5 < f_R/f_F < 10$$

where $f_F$ is the focal length of said front group, and $f_R$ is the focal length of said rear group.

6. The wide angle zoom lens according to claim 4, wherein said first lens group and said second lens group are constructed to satisfy the following conditions:

$$1.7 < f_{L1}/f_F < 3.8$$

$$0.6 < |f_{L2}/f_F| < 1.3, f_{L2} < 0$$

$$0.6 < f_{L4}/f_F < 1.9$$

$$1.4 < |f_{L6}/f_2| < 2.3, f_{L6} < 0$$

$$0.9 < f_{L7}/f_2 < 4.0$$

$$0.8 < f_{L8}/f_2 < 1.8$$

$$32 < \nu L_1 < 60$$

$$6 < \nu_{L8} - \nu_{L6} < 18$$

$$11 < \nu_{L8} - \nu_{L7} < 28$$

where
- $f_{L1}$: the focal length of said first lens component of said first lens group,
- $f_{L2}$: the focal length of said second lens component of said first lens group,
- $f_{L4}$: the focal length of said fourth lens component of said first lens group,
- $f_{L6}$: the focal length of said sixth lens component of said second lens group,
- $f_{L7}$: the focal length of said seventh lens component of said second lens group, $f_{L8}$: the focal length of said eighth lens component of said second lens group, $f_2$: the focal length of said second lens group, $f_F$: the focal length of said front group of said first lens group, $\nu_{L1}$: the Abbe number of said first lens component of said first lens group, $\nu_{L6}$: the Abbe number of said sixth lens component of said second lens group, $\nu_{L7}$: the Abbe number of said seventh lens component of said second lens group, $\nu_{L8}$: the Abbe number of said eighth lens component of said second lens group.

7. The wide angle zoom lens according to claim 4, wherein said second lens component and said fourth lens component are constructed to satisfy the following conditions for correcting spherical aberration:

$$0.2 < n_{L2n} - n_{L2p}$$

$$0.27 < n_{L4n} - n_{L4p}$$

where $n_{L2n}$: the refractive index of said negative lens of said second lens component, $n_{L2p}$: the refractive index of said positive lens of said second lens component, $n_{L4n}$: the refractive index of said negative lens of said fourth lens component, $n_{L4p}$: the refractive index of said positive lens of said fourth lens component.

8. The wide angle zoom lens according to claim 4, wherein said second lens component and said fourth lens component are constructed to satisfy the following conditions for correcting chromatic aberration:

$$-3 < \nu_{L2n} - \nu_{L2p} < 7$$

$$25 < \nu_{L4p} - \nu_{L4n} < 50$$

where $\nu_{L2n}$: the Abbe number of said negative lens of said second lens component, $\nu_{L2p}$: the Abbe number of said positive lens of said second lens component, $\nu_{L4p}$: the Abbe number of said positive lens of said fourth lens component, $\nu_{L4n}$: the Abbe number of said negative lens of said fourth lens component.

9. The wide angle zoom lens according to claim 4, wherein said second lens component of said first lens group and said seventh lens component of said second lens group are constructed to satisfy the following conditions:

$$3 < q_{L2} < 15$$

$$2 < q_{L7} < 9$$

$$0.3 < D_{L2}/f_W$$

where $q_{L2}$, $q_{L7}$ are the shape factors, $D_{L2}$ is the on-the-axis thickness of said second lens component, and $f_W$ is the focal length of said zoom lens at the wide-angle end, and a shape factor $q_{Li}$ of the i-th lens component is defined as follows:

$$q_{Li} = (r_b + r_a)/(r_b - r_a)$$

where $r_a$ is the closest-to-object radius of curvature of said i-th lens component, and $r_b$ is the closest-to-image radius of curvature thereof.

10. The wide angle zoom lens according to claim 4, which is structured based on the following Table:

| f = 28.8~49.0, | $F_{NO}$ = 4.1~7.0, | 2ω = 72.4~48.0° | |
|---|---|---|---|
| r | d | ν | n |
| 1 | 26.361 | 3.30 | 52.3 | 1.74810 |
| 2 | 42.652 | 2.60 | | |
| 3 | −31.414 | 2.00 | 43.3 | 1.84042 |
| 4 | 11.592 | 8.60 | 41.4 | 1.57501 |
| 5 | −39.382 | 0.60 | | |
| 6 | 25.636 | 2.40 | 52.3 | 1.74810 |
| 7 | ∞ | 0.50 | | |
| 8 | ∞ | 3.60 | 69.9 | 1.51860 |
| 9 | −12.813 | 1.70 | 23.0 | 1.86074 |
| 10 | −18.442 | 2.51 | | |
| 11 | ∞ | 1.20 | 52.3 | 1.74810 |
| 12 | −106.230 | (d12) | | |
| 13 | −22.651 | 3.30 | 43.3 | 1.84042 |
| 14 | −15.995 | 2.50 | | |
| 15 | −14.584 | 1.40 | 33.9 | 1.80384 |
| 16 | −18.925 | 2.80 | | |
| 17 | −12.278 | 1.30 | 60.1 | 1.62041 |
| 18 | −141.764 | (Bf) | | |
| f | 28.8000 | 35.0000 | 49.0001 | |
| d12 | 10.2529 | 6.7286 | 2.0511 | |
| Bf | 4.8254 | 11.5881 | 26.8590 | |

18th Surface (Non-Spherical Surface)
Cone constant
k = 0.1000E + 01.
Non-spherical coefficient
$c_2$ = 0.0
$c_4$ = 0.1768E − 05,
$c_6$ = 0.2898E − 07
$c_8$ = −0.3755E − 09,
$c_{10}$ = 0.7895E − 12 wherein the numbers at the left end indicate the order from the object, r is the radius of curvature, d is the lens-surface spacing, ν is the Abbe number, n is the refractive index in a d-line (λ=587, 6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

11. The wide angle zoom lens according to claim 4, which is structured based on the following Table:

| f = 28.8~58.6, | $F_{NO}$ = 4.1~8.3, | 2ω = 72.3~40.9° | |
|---|---|---|---|
| r | d | ν | n |
| 1 | 22.706 | 3.30 | 52.3 | 1.74810 |
| 2 | 31.963 | 3.00 | | |
| 3 | −32.819 | 2.00 | 43.3 | 1.84042 |
| 4 | 11.367 | 8.60 | 41.4 | 1.57501 |
| 5 | −39.260 | 0.60 | | |
| 6 | 24.508 | 2.40 | 55.6 | 1.69680 |
| 7 | ∞ | 0.50 | | |
| 8 | ∞ | 3.60 | 60.3 | 1.51835 |
| 9 | −12.156 | 1.70 | 23.0 | 1.86074 |

-continued

| | $f = 28.8 \sim 58.6$, | $F_{NO} = 4.1 \sim 8.3$, | $2\omega = 72.3 \sim 40.9°$ | |
|---|---|---|---|---|
| | r | d | v | n |
| 10 | −17.739 | 2.13 | | |
| 11 | ∞ | 1.20 | 31.6 | 1.75692 |
| 12 | −104.455 | (d12) | | |
| 13 | −19.677 | 3.30 | 44.7 | 1.80218 |
| 14 | −14.016 | 2.50 | | |
| 15 | −12.984 | 1.40 | 33.9 | 1.80384 |
| 16 | −18.925 | 2.80 | | |
| 17 | −12.600 | 1.30 | 60.1 | 1.62041 |
| 18 | −87.211 | (Bf) | | |
| f | 28.8001 | 40.0003 | 58.6001 | |
| d12 | 11.6237 | 6.2244 | 1.8177 | |
| Bf | 3.7307 | 15.3472 | 34.6384 | |

18th Surface (Non-Spherical Surface)
Cone constant
$k = 0.1000E + 01$
Non-spherical coefficient
$c_2 = 0.0$
$c_4 = -0.3287E - 05$,
$c_6 = 0.8718E - 07$
$c_8 = -0.6130E - 09$,
$c_{10} = 0.1132E - 11$ wherein the numbers at the left end indicate the order from the object, r is the radius of curvature, d is the lens-surface spacing, $v$ is the Abbe number, n is the refractive index in a d-line ($\lambda = 587, 6$ nm), f is the focal length of the entire system, $F_{NO}$ is the F number, and $2\omega$ is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

12. The wide angle zoom lens according to claim 4, which is structured based on the following Table:

| | $f = 28.8 \sim 63.5$, | $F_{NO} = 4.1 \sim 9.0$, | $2\omega = 72.3 \sim 38.0°$ | |
|---|---|---|---|---|
| | r | d | v | n |
| 1 | 21.953 | 3.30 | 52.3 | 1.74810 |
| 2 | 29.483 | 3.20 | | |
| 3 | −32.528 | 2.00 | 43.3 | 1.84042 |
| 4 | 11.289 | 8.60 | 41.4 | 1.57501 |
| 5 | −38.408 | 0.60 | | |
| 6 | 25.045 | 2.40 | 55.6 | 1.69680 |
| 7 | ∞ | 0.50 | | |
| 8 | ∞ | 3.60 | 59.0 | 1.51823 |
| 9 | −11.569 | 1.70 | 23.0 | 1.86074 |
| 10 | −16.990 | 2.44 | | |
| 11 | ∞ | 1.20 | 27.6 | 1.75520 |
| 12 | −104.218 | (d12) | | |
| 13 | −18.297 | 3.30 | 44.7 | 1.80218 |
| 14 | −13.294 | 2.50 | | |
| 15 | −12.299 | 1.40 | 33.9 | 1.80384 |
| 16 | −18.000 | 2.80 | | |
| 17 | −12.600 | 1.30 | 60.1 | 1.62041 |
| 18 | −88.747 | (Bf) | | |
| f | 28.8002 | 42.0004 | 63.5013 | |
| d12 | 11.9532 | 6.0443 | 1.6792 | |
| Bf | 3.4257 | 16.7743 | 38.5169 | |

18th Surface (Non-Spherical Surface)
Cone constant
$k = 0.1000E + 01$
Non-spherical coefficient
$c_2 = 0.0$
$c_4 = -0.7999E - 05$,
$c_6 = 0.1303E - 06$
$c_8 = -0.7531E - 09$,
$c_{10} = 0.1224E - 11$ wherein the numbers at the left end indicate the order from the object, r is the radius of curvature, d is the lens-surface spacing, $v$ is the Abbe number, n is the refractive index in a d-line ($\lambda = 587,6$ nm), f is the focal length of the entire system, $F_{NO}$ is the F number, and $2\omega$ is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

13. The wide angle zoom lens according to claim 4, which is structured based on the following Table:

| | $f = 28.8 \sim 68.5$, | $F_{NO} = 4.1 \sim 9.8$, | $2\omega = 72.3 \sim 35.4°$ | |
|---|---|---|---|---|
| | r | d | v | n |
| 1 | 21.509 | 3.30 | 57.5 | 1.67025 |
| 2 | 30.282 | 3.20 | | |
| 3 | −32.379 | 2.00 | 43.3 | 1.84042 |
| 4 | 11.335 | 8.60 | 41.4 | 1.57501 |
| 5 | −38.801 | 0.60 | | |
| 6 | 24.911 | 2.40 | 55.6 | 1.69680 |
| 7 | ∞ | 0.50 | | |
| 8 | ∞ | 4.00 | 56.4 | 1.50137 |
| 9 | −11.120 | 1.30 | 23.0 | 1.86074 |
| 10 | −16.119 | 2.40 | | |
| 11 | ∞ | 1.20 | 23.0 | 1.86074 |
| 12 | −118.782 | (d12) | | |
| 13 | −17.401 | 3.30 | 44.7 | 1.80218 |
| 14 | −12.731 | 2.50 | | |
| 15 | −11.868 | 1.40 | 33.9 | 1.80384 |
| 16 | −18.000 | 2.80 | | |
| 17 | −12.600 | 1.30 | 60.1 | 1.62041 |
| 18 | −77.705 | (Bf) | | |
| f | 28.8002 | 44.0006 | 68.5013 | |
| d12 | 12.2254 | 5.8415 | 1.5153 | |
| Bf | 3.1590 | 18.2675 | 42.6200 | |

18th Surface (Non-Spherical Surface)
Cone constant
$k = 0.1000E + 01$
Non-spherical coefficient
$c_2 = 0.0$
$c_4 = -0.8892E - 05$,
$c_6 = 0.1322E - 06$
$c_8 = -0.7632E - 09$,
$c_{10} = 0.1216E - 11$ wherein the numbers at the left end indicate the order from the object, r is the radius of curvature, d is the lens-surface spacing, $\nu$ is the Abbe number, n is the refractive index in a d-line ($\lambda$=587,6 nm), f is the focal length of the entire system, $F_{NO}$ is the F number, and $2\omega$ is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

14. The wide angle zoom lens according to claim 4, which is structured based on the following Table:

| f = 30.8~78.5, $F_{NO}$ = 4.1~10.4, $2\omega$ = 68.6~31.0° | | | |
|---|---|---|---|
| r | d | $\nu$ | n |
| 1 | 22.700 | 3.30 | 54.0 | 1.61720 |
| 2 | 41.685 | 2.60 | | |
| 3 | −31.923 | 2.00 | 43.3 | 1.84042 |
| 4 | 12.161 | 8.60 | 40.7 | 1.58144 |
| 5 | −41.581 | 0.60 | | |
| 6 | 27.721 | 2.40 | 50.8 | 1.65844 |
| 7 | ∞ | 0.50 | | |
| 8 | ∞ | 3.60 | 53.5 | 1.54739 |
| 9 | −11.053 | 1.70 | 23.0 | 1.86074 |
| 10 | −17.203 | 2.46 | | |
| 11 | ∞ | 1.20 | 31.6 | 1.75692 |
| 12 | −99.156 | (d12) | | |
| 13 | −20.200 | 3.30 | 44.7 | 1.80218 |
| 14 | −13.351 | 2.50 | | |
| 15 | −12.371 | 1.20 | 47.5 | 1.78797 |
| 16 | −26.547 | 3.10 | | |
| 17 | −13.814 | 1.30 | 60.1 | 1.62041 |
| 18 | −56.300 | (Bf) | | |
| f | 30.8006 | 50.0015 | 78.5039 | |
| d12 | 12.0097 | 5.2988 | 1.3903 | |
| Bf | 3.9843 | 22.0427 | 48.8491 | |

18th Surface (Non-Spherical Surface)
Cone constant
k = 0.1000E + 01
Non-spherical coefficient
$c_2$ = 0.0
$c_4$ = −0.3123E − 05,
$c_6$ = 0.7469E − 07
$c_8$ = −0.5197E − 09,
$c_{10}$ = 0.9731E − 12 wherein the numbers at the left end indicate the order from the object, r is the radius of curvature, d is the lens-surface spacing, $\nu$ is the Abbe number, n is the refractive index in a d-line ($\lambda$=587,6 nm), f is the focal length of the entire system, $F_{NO}$ is the F number, and $2\omega$ is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

15. The wide angle zoom lens according to claim 4, which is structured based on the following Table:

| f = 30.8~68.5, $F_{NO}$ = 4.1~9.1, $2\omega$ = 68.3~35.4° | | | |
|---|---|---|---|
| r | d | $\nu$ | n |
| 1 | 22.677 | 3.30 | 49.4 | 1.77279 |
| 2 | 32.535 | 2.60 | | |
| 3 | −34.947 | 2.00 | 43.3 | 1.84042 |
| 4 | 11.428 | 8.60 | 40.8 | 1.58144 |
| 5 | −54.425 | 0.60 | | |
| 6 | 29.087 | 2.40 | 49.4 | 1.77279 |
| 7 | ∞ | 0.50 | | |
| 8 | ∞ | 3.60 | 53.6 | 1.54739 |
| 9 | −10.707 | 1.70 | 23.0 | 1.86074 |
| 10 | −16.676 | 2.62 | | |
| 11 | ∞ | 1.20 | 35.2 | 1.74950 |
| 12 | −98.185 | (d12) | | |
| 13 | −19.316 | 3.30 | 45.4 | 1.79668 |
| 14 | −13.297 | 2.50 | | |
| 15 | −12.755 | 1.20 | 46.4 | 1.80411 |
| 16 | −26.000 | 3.60 | | |
| 17 | −13.000 | 1.30 | 60.3 | 1.62041 |
| 18 | −38.074 | (Bf) | | |
| f | 30.8005 | 45.0013 | 68.5036 | |
| d12 | 11.7446 | 5.8622 | 1.4850 | |
| Bf | 3.9190 | 18.1651 | 41.7423 | | wherein the numbers at the left end indicate the order from the object, r is the radius of curvature, d is the lens-surface spacing, $\nu$ is the Abbe number, n is the refractive index in a d-line ($\lambda$=587,6 nm), f is the focal length of the entire system, $F_{NO}$ is the F number, and $2\omega$ is the view angle.

16. The wide angle zoom lens according to claim 1, wherein said second lens component of said first lens group is composed of a negative lens in which its concave surface exhibiting a more intensive curvature is directed to said object, said third lens component is constructed as a junction lens having a positive refractive power on the whole by joining a negative meniscus lens having its concave surface directed to said image to a double convex positive lens, said fourth lens component is composed of a positive lens in which its convex surface exhibiting a more intensive curvature is directed to said object, and said first lens group and said second lens group are constructed to satisfy the following conditions:

$1.0 < f_1/Y < 1.11$ $1.03 < |f_2/Y| < 1.16, f_2 < 0$ $1.21 < \beta_{2W} < 1.32$.

17. The wide angle zoom lens according to claim 16, wherein said front group of said first lens group is so constructed as to be movable along the optical axis to vary a spacing between said front group and said rear group for focusing and is also constructed to satisfy the following condition:

$3.5 < f_R/f_F < 10$ where $f_F$ is the focal length of said front group, and $f_R$ is the focal length of said rear group.

18. The wide angle zoom lens according to claim 16, wherein said first lens group and said second lens group are constructed to satisfy the following conditions:

$$1.7 < f_{L1}/f_F < 3.8$$

$$0.6 < |f_{L2}/f_F| < 1.3, f_{L2} < 0$$

$$0.6 < f_{L4}/f_F < 1.9$$

$$1.4 < |f_{L6}/f_2| < 2.3, f_{L6} > 0$$

$$0.9 < f_{L7}/f_2 < 4.0$$

$$0.8 < f_{L8}/f_2 < 1.8$$

$$32 < \nu_{L1} < 60$$

$$6 < \nu_{L8} - \nu_{L6} < 18$$

$$11 < \nu_{L8} - \nu_{L7} < 28$$

where $f_{L1}$: the focal length of said first lens component of said first lens group, $f_{L2}$: the focal length of said second lens component of said first lens group, $f_{L4}$: the focal length of said fourth lens component of said first lens group, $f_{L6}$: the focal length of said sixth lens component of said second lens group, $f_{L7}$: the focal length of said seventh lens component of said second lens group, $f_{L8}$: the focal length of said eighth lens component of said second lens group, $f_2$: the focal length of said second lens group, $f_F$: the focal length of said front group of said first lens group, $\nu_{L1}$: the Abbe number of said first lens component of said first lens group, $\nu_{L6}$: the Abbe number of said sixth lens component of said second lens group, $\nu_{L7}$: the Abbe number of said seventh lens component of said second lens group, $\nu_{L8}$: the Abbe number of said eighth lens component of said second lens group.

19. The wide angle zoom lens according to claim 16, wherein said second lens component and said third lens component are constructed to satisfy the following conditions for correcting spherical aberration:

$$1.75 < n_{L2n}$$

$$0.2 < n_{L3n} - n_{L3p}$$

where $n_{L2n}$: the refractive index of said second lens component, $n_{L3n}$: the refractive index of said negative lens of said third lens component, $n_{L3p}$: the refractive index of said positive lens of said third lens component.

20. The wide angle zoom lens according to claim 16, wherein said third lens component and said fourth lens component are constructed to satisfy the following conditions for correcting chromatic aberration:

$$15 < \nu_{L3p} - \nu_{L3n} < 25$$

$$60 < \nu_{L4}$$

where $\nu_{L3p}$: the Abbe number of said positive lens of said third lens component, $\nu_{L3n}$: the Abbe number of said negative lens of said third lens component, $\nu_{L4}$: the Abbe number of said fourth lens component.

21. The wide angle zoom lens according to claim 16, wherein said second lens component and said seventh lens component are constructed to satisfy the following conditions:

$$0.18 < D_{L2}/f_W < 0.4$$

$$1.5 < q_{L7} < 3$$

where $D_{L2}$ is the on-the-axis thickness of said second lens component of said first lens group, $f_W$ is the focal length of said zoom lens at the wide-angle end, and $q_{L7}$ is the shape factor of said seventh lens component of said second lens group, and said shape factor $q_{L7}$ of said seventh lens component is defined as follows:

$$q_{L7} = (r_b + r_a)/(r_b - r_a)$$

where $r_a$ is the closest-to-object radius of curvature of said seventh lens component, and $r_b$ is the closest-to-image radius of curvature thereof.

22. The wide angle zoom lens according to claim 16, which is structured based on the following Table:

| f = 30.8~78.5, | $F_{NO}$ = 4.1~10.4, | 2ω = 68.6~31.0° | |
|---|---|---|---|
| r | d | υ | n |
| 1   25.145 | 2.00 | 35.5 | 1.59507 |
| 2   40.876 | 2.70 | | |
| 3   −22.461 | 6.50 | 43.3 | 1.84042 |
| 4   64.158 | 0.20 | | |
| 5   17.452 | 2.00 | 40.9 | 1.79631 |
| 6   9.525 | 6.80 | 59.7 | 1.53996 |
| 7   −23.454 | 0.20 | | |
| 8   22.073 | 2.00 | 69.9 | 1.51860 |
| 9   −284.716 | 2.64 | | |
| 10   ∞ | 1.20 | 49.0 | 1.53172 |
| 11   −69.655 | (d11) | | |
| 12   −22.439 | 3.30 | 45.4 | 1.79668 |
| 13   −13.502 | 2.50 | | |
| 14   −11.699 | 1.20 | 47.5 | 1.78797 |
| 15   −34.604 | 3.10 | | |
| 16   −15.949 | 1.30 | 60.1 | 1.62041 |
| 17   −50.276 | (Bf) | | |
| f | 30.8005 | 50.0015 | 78.5045 |
| d11 | 12.1245 | 5.4136 | 1.5051 |
| Bf | 3.7369 | 21.7953 | 48.6021 |

17th Surface (Non-spherical Surface)
Cone constant
$k = 0.1000E + 01$
Non-spherical coefficient
$c_2 = 0.0$
$c_4 = -0.1638E - 05$,
$c_6 = 0.7088E - 07$
$c_8 = -0.3773E - 09$,
$c_{10} = 0.4873E - 12$ wherein the numbers at the left end indicate the order from the object, r is the radius of curvature, d is the lens-surface spacing, γ is the Abbe number, n is the refractive index in a d-line (λ=587,6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

23. The wide angle zoom lens according to claim 1, wherein said second lens component of said first lens group is composed of a negative lens in which its concave surface exhibiting a more intensive curvature is directed to said object, said third lens component is constructed as a junction lens having either one of weak positive and negative refractive powers on the whole by joining a negative lens having its concave surface directed to said image to a double convex positive lens, said fourth lens component is constructed as a junction lens having a positive refractive power on the whole by joining a double convex positive lens to a negative meniscus lens having its concave surface directed to said object, and said first lens group and said second lens group are constructed to satisfy the following conditions:

$1.0 < f_1/Y < 1.11$ $1.03 < |f_2/Y| < 1.16, f_2 < 0$ $1.21 < \beta_{2W} < 1.32$.

24. The wide angle zoom lens according to claim 23, wherein said front group of said first lens group is so constructed as to be movable along the optical axis to vary a spacing between said front group and said rear group for focusing and is also constructed to satisfy the following condition:

$3.5 < f_R/f_F < 10$ where $f_F$ is the focal length of said front group, and $f_R$ is the focal length of said rear group.

25. The wide angle zoom lens according to claim 23, wherein said first lens group and said second lens group are constructed to satisfy the following conditions:

$1.7 < f_{L1}/f_F < 3.8$ $0.6 < |f_{L2}/f_F| < 1.3, f_{L2} < 0$ $0.6 < f_{L4}/f_F < 1.9$ $1.4 < |f_{L6}/f_2| < 2.3, f_{L6} > 0$ $0.9 < f_{L7}/f_2 < 4.0$ $0.8 < f_{L8}/f_2 < 1.8$ $32 < \nu_{L1} < 60$ $6 < \nu_{L8} - \nu_{L6} < 18$ $11 < \nu_{L8} - \nu_{L7} < 28$ where
$f_{L1}$: the focal length of said first lens component of said first lens group,
$f_{L2}$: the focal length of said second lens component of said first lens group,
$f_{L4}$: the focal length of said fourth lens component of said first lens group,
$f_{L6}$: the focal length of said sixth lens component of said second lens group,
$f_{L7}$: the focal length of said seventh lens component of said second lens group,
$f_{L8}$: the focal length of said eighth lens component of said second lens group,
$f_2$: the focal length of said second lens group,
$f_F$: the focal length of said front group of said first lens group,
$\nu_{L1}$: the Abbe number of said first lens component of said first lens group,
$\nu_{L6}$: the Abbe number of said sixth lens component of said second lens group,
$\nu_{L7}$: the Abbe number of said seventh lens component of said second lens group,
$\nu_{L8}$: the Abbe number of said eighth lens component of said second lens group.

26. The wide angle zoom lens according to claim 23, wherein said second lens component, said third lens component and said fourth lens component are constructed to satisfy the following conditions for correcting spherical aberration:

$1.75 < n_{L2}$ $0.08 < n_{L3n} - n_{L3p}$ $0.2 < n_{L4n} - n_{L4p}$ where
$n_{L2}$: the refractive index of said second lens component,
$n_{L3n}$: the refractive index of said negative lens of said third lens component,
$n_{L3p}$: the refractive index of said positive lens of said third lens component,
$n_{L4n}$: the refractive index of said negative lens of said fourth lens component,
$n_{L4p}$: the refractive index of said positive lens of said fourth lens component.

27. The wide angle zoom lens according to claim 23, wherein said third lens component and said fourth lens component are constructed to satisfy the following condition for correcting chromatic aberration:

$-2 < \nu_{L3p} - \nu_{L3n} < 8$ $20 < \nu_{L4p} - \nu_{L4n} < 30$ where
$\nu_{L3p}$: the Abbe number of said positive lens of said third lens component,
$\nu_{L3n}$: the Abbe number of said negative lens of said third lens component,
$\nu_{L4p}$: the Abbe number of said positive lens of said fourth lens component,
$\nu_{L4n}$: the Abbe number of said negative lens of said fourth lens component.

28. The wide angle zoom lens according to claim 23, wherein said third lens component of said first lens group and said seventh lens component of said second lens group are constructed to satisfy the following conditions:

$$-3 < q_{L3} < -0.5$$

$$2 < q_{L7} < 3$$

where $q_{L3}$, $q_{L7}$ are the shape factors, and a shape factor $q_{Li}$ of the i-th lens component is defined as follows:

$$q_{Li} = (r_b + r_a)/(r_b - r_a)$$

where $r_a$ is the closest-to-object radius of curvature of said i-th lens component, and $r_b$ is the closest-to-image radius of curvature thereof.

29. The wide angle zoom lens according to claim 23, which is structured based on the following Table:

| | f = 30.8~78.5, | $F_{NO}$ = 4.1~10.4, | 2ω = 69.0~30.9° | |
|---|---|---|---|---|
| | r | d | v | n |
| 1 | 22.551 | 3.00 | 54.0 | 1.61720 |
| 2 | 49.176 | 2.10 | | |
| 3 | −24.049 | 1.60 | 46.5 | 1.80411 |
| 4 | 121.580 | 2.00 | | |
| 5 | −132.357 | 1.10 | 47.5 | 1.78797 |
| 6 | 10.198 | 4.10 | 50.8 | 1.65844 |
| 7 | −32.482 | 0.20 | | |
| 8 | 20.505 | 4.00 | 54.6 | 1.51454 |
| 9 | −10.498 | 1.10 | 28.6 | 1.79504 |
| 10 | −15.980 | 2.72 | | |
| 11 | ∞ | 1.20 | 29.5 | 1.71736 |
| 12 | −98.996 | (d12) | | |
| 13 | −22.540 | 3.30 | 52.3 | 1.74810 |
| 14 | −13.009 | 2.50 | | |
| 15 | −10.996 | 1.50 | 46.5 | 1.80411 |
| 16 | −24.800 | 0.03 | 55.9 | 1.49712 |
| 17 | −29.117 | 2.60 | | |
| 18 | −17.000 | 1.30 | 60.1 | 1.62041 |
| 19 | −77.703 | (Bf) | | |
| f | 30.8057 | 50.0057 | 78.5012 | |
| d12 | 12.1357 | 5.4248 | 1.5163 | |
| Bf | 3.9725 | 22.0236 | 48.8141 | |

17th Surface (Non-Spherical Surface)
Cone constant
k = 0.1000E + 01
Non-spherical coefficient
$c_2$ = 0.0
$c_4$ = −0.9600E − 05,
$c_6$ = 0.2188E − 06
$c_8$ = −0.2960E − 08,
$c_{10}$ = 0.6426E − 11 wherein the numbers at the left end indicate the order from the object, r is the radius of curvature, d is the lens-surface spacing, $v$ is the Abbe number, n is the refractive index in a d-line (λ=587,6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

30. The wide angle zoom lens according to claim 23, which is structured based on the following Table:

| | f = 30.8~78.5, | $F_{NO}$ = 4.1~10.4, | 2ω = 68.9~30.9° | |
|---|---|---|---|---|
| | r | d | v | n |
| 1 | 21.771 | 3.00 | 49.0 | 1.53172 |
| 2 | 80.103 | 1.90 | | |
| 3 | −24.939 | 1.60 | 45.4 | 1.79668 |
| 4 | 94.807 | 2.00 | | |
| 5 | −70.034 | 1.10 | 47.5 | 1.78797 |
| 6 | 10.420 | 4.10 | 50.8 | 1.65844 |
| 7 | −29.415 | 0.20 | | |
| 8 | 20.544 | 4.00 | 54.6 | 1.51454 |
| 9 | −10.402 | 1.10 | 28.6 | 1.79504 |
| 10 | −15.873 | 2.73 | | |
| 11 | ∞ | 1.20 | 32.2 | 1.67270 |
| 12 | −92.833 | (d12) | | |
| 13 | −22.852 | 3.30 | 45.4 | 1.79668 |
| 14 | −13.392 | 2.50 | | |
| 15 | −11.286 | 1.50 | 43.3 | 1.84042 |
| 16 | −24.800 | 0.03 | 55.9 | 1.49712 |
| 17 | −29.117 | 2.60 | | |
| 18 | −17.000 | 1.30 | 60.0 | 1.64000 |
| 19 | −75.985 | (Bf) | | |
| f | 30.8069 | 50.0090 | 78.5095 | |
| d12 | 12.1718 | 5.4609 | 1.5524 | |
| Bf | 4.0166 | 22.0691 | 48.8634 | |

17th Surface (Non-Spherical Surface)
Cone constant
k = 0.1000E + 01
Non-spherical coefficient
$c_2$ = 0.0
$c_4$ = −0.8055E − 05,
$c_6$ = 0.1774E − 06
$c_8$ = −0.2356E − 08,
$c_{10}$ = 0.3921E − 11 wherein the numbers at the left end indicate the order from the object, r is the radius of curvature, d is the lens-surface spacing, $v$ is the Abbe number, n is the refractive index in a d-line (λ=587.6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

31. The wide angle zoom lens according to claim 23, which is structured based on the following Table:

| | f = 30.8~78.5, | $F_{NO}$ = 4.1~10.4, | 2ω = 69.0~30.9° | |
|---|---|---|---|---|
| | r | d | v | n |
| 1 | 20.505 | 3.00 | 54.6 | 1.51454 |
| 2 | 46.724 | 2.10 | | |
| 3 | −23.630 | 1.60 | 46.5 | 1.80411 |
| 4 | 218.298 | 2.00 | | |
| 5 | −98.990 | 1.10 | 47.5 | 1.78797 |
| 6 | 10.130 | 4.10 | 50.8 | 1.65844 |
| 7 | −31.025 | 0.20 | | |
| 8 | 20.414 | 4.00 | 54.6 | 1.51454 |
| 9 | −10.751 | 1.10 | 28.6 | 1.79504 |

-continued

| | f = 30.8~78.5, | $F_{NO}$ = 4.1~10.4, | 2ω = 69.0~30.9° | |
|---|---|---|---|---|
| | r | d | ν | n |
| 10 | −16.341 | 1.94 | | |
| 11 | ∞ | 1.20 | 32.2 | 1.67270 |
| 12 | −92.799 | (d12) | | |
| 13 | −22.417 | 3.30 | 45.4 | 1.79668 |
| 14 | −13.251 | 2.50 | | |
| 15 | −11.169 | 1.50 | 43.3 | 1.84042 |
| 16 | −25.812 | 0.03 | 55.9 | 1.49712 |
| 17 | −28.800 | 2.50 | | |
| 18 | −16.898 | 1.30 | 60.0 | 1.64000 |
| 19 | −65.760 | (Bf) | | |
| f | 30.8002 | 50.0000 | 78.5001 | |
| d12 | 12.8119 | 6.1311 | 2.2401 | |
| Bf | 4.0808 | 22.2483 | 49.2160 | |

17th Surface (Non-spherical Surface)
Cone constant
$k = 0.1000E + 01$
Non-spherical coefficient
$c_2 = 0.0$
$c_4 = -0.8158E - 05$,
$c_6 = 0.1488E - 06$
$c_8 = -0.1631E - 08$,
$c_{10} = 0.5443E - 12$ wherein the numbers at the left end indicate the order from the object, r is the radius of curvature, d is the lens-surface spacing, ν is the Abbe number, n is the refractive index in a d-line (λ=587,6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2h^2 + c_4h^4 + c_6h^6 + c_8h^8 + c_{10}h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n is the non-spherical coefficient and the cone constant indicating $10^n$ and $10^{-n}$, respectively.

32. The wide angle zoom lens according to claim 23, which is structured based on the following Table:

| | f = 30.8~78.5, | $F_{NO}$ = 4.1~10.4, | 2ω = 69.0~31.0° | |
|---|---|---|---|---|
| | r | d | ν | n |
| 1 | 19.531 | 2.30 | 55.6 | 1.69680 |
| 2 | 31.351 | 2.50 | | |
| 3 | −24.151 | 1.60 | 46.5 | 1.80411 |
| 4 | 69.660 | 2.00 | | |
| 5 | 180.336 | 1.10 | 47.5 | 1.78797 |
| 6 | 10.019 | 4.10 | 50.8 | 1.65844 |
| 7 | −38.949 | 0.20 | | |
| 8 | 21.184 | 4.00 | 54.6 | 1.51454 |
| 9 | −10.439 | 1.10 | 28.6 | 1.79504 |
| 10 | −15.939 | 2.65 | | |
| 11 | ∞ | 1.20 | 28.3 | 1.72825 |
| 12 | −95.401 | (d12) | | |
| 13 | −22.986 | 3.30 | 49.4 | 1.77279 |
| 14 | −13.394 | 2.50 | | |
| 15 | −11.549 | 1.20 | 43.3 | 1.84042 |
| 16 | −27.441 | 2.60 | | |
| 17 | −15.950 | 1.30 | 60.1 | 1.62041 |
| 18 | −68.571 | (Bf) | | |
| f | 30.8011 | 50.0032 | 78.5089 | |
| d12 | 12.1095 | 5.3986 | 1.4901 | |
| Bf | 4.2036 | 22.2628 | 49.0717 | |

18th Surface (Non-Spherical Surface)
Cone constant
$k = 0.1000E + 01$
Non-spherical coefficient
$c_2 = 0.0$
$c_4 = -0.5153E - 05$,
$c_6 = 0.8831E - 07$
$c_8 = -0.5498E - 09$,
$c_{10} = 0.8733E - 12$ wherein the numbers at the left end indicate the order from the object, r is the radius of curvature, d is the lens-surface spacing, ν is the Abbe number, n is the refractive index in a d-line (λ=587,6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2h^2 + c_4h^4 + c_6h^6 + c_8h^8 + c_{10}h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

33. The wide angle zoom lens according to claim 1, wherein said second lens component of said first lens group is constructed as a junction lens assuming a meniscus configuration in which its convex surface is directed to said image, said junction lens being composed of a double concave negative lens and a double convex positive lens joined to said negative lens, said third lens component consists of a positive lens in which its convex surface exhibiting a more intensive curvature is directed to said object, and said fourth lens component is constructed as a junction lens having a positive refractive power on the whole, said junction lens being composed of a positive lens in which its convex surface exhibiting a more intensive curvature is directed to said image and a negative meniscus lens joined to said positive lens and having its concave surface directed to said object, and said first lens group and said second lens group are constructed to satisfy the following conditions:

$1.14 < f_1/Y < 1.19$ $1.0 < |f_2/Y| < 1.09, f_2 < 0$ $1.21 < \beta_{2W} < 1.32.$ 34. The wide angle zoom lens according to claim 33, wherein said front group of said first lens group is so constructed as to be movable along the optical axis to vary a spacing between said front group and said rear group for focusing and is also constructed to satisfy the following condition:

$3.5 < f_R/f_F < 10$ where $f_F$ is the focal length of said front group, and $f_R$ is the focal length of said rear group.

35. The wide angle zoom lens according to claim 33, wherein said first lens group and said second lens group are constructed to satisfy the following conditions:

$$1.7 < f_{L1}/f_F < 3.8$$

$$0.6 < |f_{L2}/f_F| < 1.3, f_{L2} < 0$$

$$0.6 < f_{L4}/f_F < 1.9$$

$$1.0 < |f_{L6}/f_2| < 2.0, f_{L6} < 0$$

$$0.7 < f_{L7}/f_2 < 1.5$$

$$0.8 < f_{L8}/f_2 < 2.5$$

$$40 < \nu_{L1} < 60$$

$$18 < \nu_{L8} - \nu_{L6} < 26$$

$$15 < \nu_{L8} - \nu_{L7} < 28$$

where
- $f_{L1}$: the focal length of said first lens component of said first lens group,
- $f_{L2}$: the focal length of said second lens component of said first lens group,
- $f_{L4}$: the focal length of said fourth lens component of said first lens group,
- $f_{L6}$: the focal length of said sixth lens component of said second lens group,
- $f_{L7}$: the focal length of said seventh lens component of said second lens group,
- $f_{L8}$: the focal length of said eighth lens component of said second lens group,
- $f_2$: the focal length of said second lens group,
- $f_F$: the focal length of said front group of said first lens group,
- $\nu_{L1}$: the Abbe number of said first lens component of said first lens group,
- $\nu_{L6}$: the Abbe number of said sixth lens component of said second lens group,
- $\nu_{L7}$: the Abbe number of said seventh lens component of said second lens group,
- $\nu_{L8}$: the Abbe number of said eighth lens component of said second lens group.

36. The wide angle zoom lens according to claim 33, wherein said second lens component and said fourth lens component are constructed to satisfy the following conditions for correcting spherical aberration:

$$2.0 < n_{L2n} - n_{L2p}$$

$$0.27 < n_{L4n} - n_{L4p}$$

and further satisfy the following conditions:

$$-3 < \nu_{L2n} - \nu_{L2p} < 7$$

$$25 < \nu_{L4p} - \nu_{L4n} < 35$$

where
- $n_{L2n}$: the refractive index of said negative lens of said second lens component,
- $n_{L2p}$: the refractive index of said positive lens of said second lens component,
- $n_{L4n}$: the refractive index of said negative lens of said fourth lens component,
- $n_{L4p}$: the refractive index of said positive lens of said fourth lens component,
- $\nu_{L2n}$: the Abbe number of said negative lens of said second lens component,
- $\nu_{L2p}$: the Abbe number of said positive lens of said second lens component,
- $\nu_{L4p}$: the Abbe number of said positive lens of said fourth lens component,
- $\nu_{L4n}$: the Abbe number of said negative lens of said fourth lens component.

37. The wide angle zoom lens according to claim 33, wherein said second lens component of said first lens group and said seventh lens component of said second lens group are constructed to satisfy the following conditions:

$$3 < q_{L2} < 6$$

$$1.1 < q_{L7} < 3$$

$$0.25 < D_{L2}/f_W < 0.4$$

where $q_{L2}$, $q_{L7}$ are the shape factors, $D_{L2}$ is the on-the-axis thickness of said second lens component, and $f_W$ is the focal length of said zoom lens at the wide-angle end, and a shape factor $q_{Li}$ of the i-th lens component $q_{Li}$ is defined as follows:

$$q_{Li} = (r_b + r_a)/(r_b - r_a)$$

where $r_a$ is the closest-to-object radius of curvature of said i-th lens component, and $r_b$ is the closest-to-image radius of curvature thereof.

38. The wide angle zoom lens according to claim 33, which is structured based on the following Table:

| f = 32.8~83.0, | $F_{NO}$ = 3.60~9.12, | 2ω = 64.7~29.3° | |
|---|---|---|---|
| | r | d | ν | n |
| 1 | 24.667 | 3.30 | 50.8 | 1.65844 |
| 2 | 45.566 | 2.60 | | |
| 3 | −29.557 | 2.00 | 43.3 | 1.84042 |
| 4 | 14.000 | 8.60 | 40.7 | 1.58144 |
| 5 | −46.563 | 0.60 | | |
| 6 | 32.361 | 1.80 | 45.0 | 1.74400 |
| 7 | ∞ | 0.50 | | |
| 8 | ∞ | 3.60 | 53.5 | 1.54739 |
| 9 | −10.957 | 1.70 | 23.0 | 1.86074 |
| 10 | −17.338 | 3.24 | | |
| 11 | ∞ | 1.20 | 23.0 | 1.86074 |
| 12 | −112.757 | (d12) | | |
| 13 | −34.637 | 3.90 | 47.1 | 1.67003 |
| 14 | −13.537 | 1.50 | | |
| 15 | −12.910 | 1.20 | 44.7 | 1.80218 |
| 16 | −37.000 | 3.50 | | |
| 17 | −14.000 | 1.30 | 67.9 | 1.59319 |
| 18 | −73.452 | (B.f) | | |
| f | 32.8015 | 50.0033 | 83.0080 | |
| d12 | 12.3786 | 6.2070 | 1.5278 | |
| B.f | 4.9876 | 20.8571 | 51.3055 | | wherein the numbers at the left end indicate the order from the object, r is the radius of curvature, d is the lens-surface spacing, ν is the Abbe number, n is the refractive index in a d-line (λ=587,6 nm), f is the focal length of the entire system, $F_{NO}$ is the F number, and 2ω is the view angle.

39. The wide angle zoom lens according to claim 33, which is structured based on the following Table:

| f = 32.8~83.0, $F_{NO}$ = 3.60~9.12, $2\omega$ = 65.0~29.4° | | | | |
|---|---|---|---|---|
| | r | d | $\nu$ | n |
| 1 | 21.988 | 3.30 | 54.0 | 1.61720 |
| 2 | 41.048 | 2.60 | | |
| 3 | −31.447 | 2.00 | 43.3 | 1.84042 |
| 4 | 14.000 | 8.60 | 40.7 | 1.58144 |
| 5 | −51.410 | 0.60 | | |
| 6 | 31.859 | 1.80 | 45.0 | 1.74400 |
| 7 | ∞ | 0.50 | | |
| 8 | ∞ | 3.60 | 53.5 | 1.54739 |
| 9 | −10.723 | 1.70 | 23.0 | 1.86074 |
| 10 | −17.246 | 2.30 | | |
| 11 | ∞ | 1.20 | 23.0 | 1.86074 |
| 12 | −112.757 | (d12) | | |
| 13 | −24.842 | 3.30 | 45.4 | 1.79668 |
| 14 | −14.883 | 2.50 | | |
| 15 | −13.611 | 1.20 | 46.5 | 1.80411 |
| 16 | −54.617 | 4.60 | | |
| 17 | −14.000 | 1.30 | 67.9 | 1.59319 |
| 18 | −29.539 | (B.f) | | |
| f | 32.8017 | 50.0038 | | 83.0090 |
| d12 | 12.7273 | 6.5557 | | 1.8765 |
| B.f | 3.1636 | 19.0333 | | 49.4822 | wherein the numbers at the left end indicate the order from the object, r is the radius of curvature, d is the lens-surface spacing, $\nu$ is the Abbe number, n is the refractive index in a d-line ($\lambda = 587,6$ nm), f is the focal length of the entire system, $F_{NO}$ is the F number, and $2\omega$ is the view angle.

40. The wide angle zoom lens according to claim 1, wherein said second lens component of said first lens group is composed of a negative lens in which its concave surface exhibiting a more intensive curvature is directed to said object, said third lens component is constructed as a junction lens having either one of weak positive and negative refractive powers on the whole by joining a negative lens having its concave surface directed to said image to a double convex positive lens, said fourth lens component is constructed as a junction lens having a positive refractive power on the whole by joining a double convex positive lens to a negative meniscus lens having its concave surface directed to said object, and said first lens group and said second lens group are constructed to satisfy the following conditions:

$1.0 < f_1/Y < 1.1$ $0.9 < |f_2/Y| < 1.01, f_2 < 0$ $1.21 < \beta_{2W} < 1.32$.

41. The wide angle zoom lens according to claim 40, wherein said front group of said first lens group is so constructed as to be movable along the optical axis to vary a spacing between said front group and said rear group for focusing and is also constructed to satisfy the following condition:

$3.5 < f_R/f_F < 10$ where $f_F$ is the focal length of said front group, and $f_R$ is the focal length of said rear group.

42. The wide angle zoom lens according to claim 40, wherein said front group of said first lens group and said second lens group are constructed to satisfy the following conditions:

$1.7 < f_{L1}/f_F < 3.8$ $0.5 < |f_{L2}/f_F| < 1.3, f_{L2} < 0$ $0.6 < f_{L4}/f_F < 1.2$ $1.4 < |f_{L6}/f_2| < 2.0, f_{L6} > 0$ $0.8 < f_{L7}/f_2 < 1.5$ $0.8 < f_{L8}/f_2 < 2.2$ $32 < \nu_{L1} < 60$ $6 < \nu_{L8} - \nu_{L6} < 40$ $11 < \nu_{L8} - \nu_{L7} < 45$ where
$f_{L1}$: the focal length of said first lens component of said first lens group,
$f_{L2}$: the focal length of said second lens component of said first lens group,
$f_{L4}$: the focal length of said fourth lens component of said first lens group,
$f_{L6}$: the focal length of said sixth lens component of said second lens group,
$f_{L7}$: the focal length of said seventh lens component of said second lens group,
$f_{L8}$: the focal length of said eighth lens component of said second lens group,
$f_F$: the focal length of said front group of said first lens group,
$f_2$: the focal length of said second lens group,
$\nu_{L1}$: the Abbe number of said first lens component of said first lens group,
$\nu_{L6}$: the Abbe number of said sixth lens component of said second lens group,
$\nu_{L7}$: the Abbe number of said seventh lens component of said second lens group,
$\nu_{L8}$: the Abbe number of said eighth lens component of said second lens group.

43. The wide angle zoom lens according to claim 40, wherein said second lens component, said third lens component and said fourth lens component are constructed to satisfy the following conditions for correcting spherical aberration:

$1.75 < n_{L2}$ $0.2 < n_{L3n} - n_{L3p}$ $0.2 < n_{L4n} - n_{L4p}$ where
$n_{L2}$: the refractive index of said second lens component,
$n_{L3n}$: the refractive index of said negative lens of said third lens component,
$n_{L3p}$: the refractive index of said positive lens of said third lens component,
$n_{L4n}$: the refractive index of said negative lens of said fourth lens component,
$n_{L4p}$: the refractive index of said positive lens of said fourth lens component.

44. The wide angle zoom lens according to claim 40, wherein said third lens component and said fourth lens component are constructed to satisfy the following condition for correcting chromatic aberration:

$6 < \nu_{L3p} - \nu_{L3n} < 15$ $10 < \nu_{L4p} - \nu_{L4n} < 25$ where $\nu_{L3p}$: the Abbe number of said positive lens of said third lens component, $\nu_{L3n}$: the Abbe number of said negative lens of said third lens component, $\nu_{L4p}$: the Abbe number of said positive lens of said fourth lens component, $\nu_{L4n}$: the Abbe number of said negative lens of said fourth lens component.

45. The wide angle zoom lens according to claim 40, wherein said seventh lens component of said second lens group is constructed to satisfy the following condition:

$2 < q_{L7} < 3$ where $q_{L7}$ is the shape factor of said seventh lens component thereof, and a shape factor $q_{L7}$ of said seventh lens component is defined as follows:

$q_{L7} = (r_b + r_a)/(r_b - r_a)$ where $r_a$ is the closest-to-object radius of curvature of said seventh lens component, and $r_b$ is the closest-to-image radius of curvature thereof.

46. The wide angle zoom lens according to claim 45, which is structured based on the following Table:

| f = 30.8~78.5, $F_{NO}$ = 4.1~10.4, 2ω = 69.1~31.0° | | | |
|---|---|---|---|
| | r | d | ν | n |
| 1 | 21.607 | 3.00 | 69.9 | 1.51860 |
| 2 | 53.566 | 2.10 | | |
| 3 | −21.390 | 1.60 | 47.5 | 1.78797 |
| 4 | 119.647 | 2.00 | | |
| 5 | −71.239 | 1.10 | 49.4 | 1.77279 |
| 6 | 9.865 | 4.10 | 48.1 | 1.71700 |
| 7 | −29.068 | 0.20 | | |
| 8 | 23.924 | 4.00 | 53.5 | 1.54739 |
| 9 | −10.680 | 1.10 | 28.6 | 1.79504 |
| 10 | −17.795 | 1.86 | | |
| 11 | −99.983 | 1.10 | 58.5 | 1.61272 |
| 12 | −45.987 | (d12) | | |
| 13 | −57.766 | 3.30 | 35.2 | 1.74950 |
| 14 | −16.773 | 1.00 | | |
| 15 | −17.725 | 1.00 | 39.8 | 1.86994 |
| 16 | −278.298 | 6.10 | | |
| 17 | −11.499 | 1.20 | 60.1 | 1.62041 |
| 18 | −26.533 | (B.f) | | |
| F | 30.8000 | 49.9997 | 78.5003 | |
| d12 | 11.9284 | 5.2487 | 1.3583 | |
| B.f | 3.6560 | 21.7830 | 48.6912 | | wherein the numbers at the left end indicate the order from the object, the symbols r, d, ν, n sequentially indicate the radius of curvature, the lens-surface spacing, the Abbe number and the refractive index in d-line (λ = 587.6 nm), 2ω is the view angle, f is the focal length of the entire system, and $F_{NO}$ is the F number.

47. The wide angle zoom lens according to claim 40, which is structured based on the following Table:

| f = 29.8~78.5, $F_{NO}$ = 4.1~10.8, 2ω = 70.8°~31.1° | | | |
|---|---|---|---|
| | r | d | ν | n |
| 1 | 18.312 | 2.30 | 51.1 | 1.73350 |
| 2 | 28.459 | 2.50 | | |
| 3 | −24.299 | 1.60 | 46.5 | 1.80411 |
| 4 | 88.659 | 2.00 | | |
| 5 | 747.848 | 1.10 | 47.5 | 1.78797 |
| 6 | 11.874 | 4.10 | 59.0 | 1.51823 |
| 7 | −24.512 | 0.20 | | |
| 8 | 18.381 | 4.00 | 59.0 | 1.51823 |
| 9 | −10.738 | 1.10 | 40.9 | 1.79631 |
| 10 | −16.243 | 2.66 | | |
| 11 | ∞ | 1.20 | 57.0 | 1.62280 |
| 12 | −81.587 | (d12) | | |
| 13 | −21.409 | 3.30 | 47.5 | 1.78797 |
| 14 | −12.944 | 2.50 | | |
| 15 | −10.998 | 1.20 | 45.4 | 1.79668 |
| 16 | −29.477 | 2.90 | | |
| 17 | −15.950 | 1.30 | 60.1 | 1.62041 |
| 18 | −60.131 | (B.f) | | |
| f | 29.8002 | 50.0008 | 78.5017 | |
| d12 | 11.9272 | 5.1605 | 1.5363 | |
| B.f | 3.5037 | 22.2117 | 48.6066 | |

| 18th Surface (Non-Spherical Surface) |
|---|
| Cone constant |
| k = 0.1000E + 01 |
| Non-spherical coefficient |
| c2 = 0.0 |
| c4 = −0.5098E − 05 |
| c6 = 0.1095E − 06 |
| c8 = 0.6103E − 09 |
| c10 = 0.8906E − 12 | wherein the numbers at the left end indicate the order from the object, r is the radius of curvature, d is the lens-surface spacing, ν is the Abbe number, n is the refractive index in a d-line (λ = 587.6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2 h^2 + c_4 h^4 + c_6 h^6 + c_8 h^8 + c_{10} h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

48. The wide angle zoom lens according to claim 40, which is structured based on the following Table:

| f = 28.8~78.5, $F_{NO}$ = 4.1~11.2, 2ω 72.2°~30.9° | | | |
|---|---|---|---|
| | r | d | ν | n |
| 1 | 19.971 | 2.30 | 37.9 | 1.72342 |
| 2 | 27.854 | 2.70 | | |
| 3 | −22.230 | 1.60 | 43.3 | 1.84042 |
| 4 | 51.474 | 2.00 | | |
| 5 | 25.157 | 1.10 | 46.5 | 1.80411 |
| 6 | 11.054 | 4.10 | 59.0 | 1.51823 |
| 7 | −31.668 | 0.20 | | |
| 8 | 21.715 | 4.00 | 59.0 | 1.51823 |
| 9 | −10.792 | 1.10 | 40.9 | 1.79631 |
| 10 | −16.642 | 2.69 | | |
| 11 | ∞ | 1.20 | 45.9 | 1.54814 |
| 12 | −71.806 | (d12) | | |
| 13 | −20.681 | 3.30 | 47.5 | 1.78797 |
| 14 | −12.645 | 2.50 | | |
| 15 | −10.815 | 1.20 | 39.8 | 1.86994 |

-continued

| | f = 28.8~78.5, $F_{NO}$ = 4.1~11.2, 2ω 72.2°~30.9° | | | |
|---|---|---|---|---|
| 16 | −25.890 | 2.90 | | |
| 17 | −15.000 | 1.30 | 82.6 | 1.49782 |
| 18 | −114.790 | (B.f) | | |
| f | 28.8005 | 47.0010 | 78.5027 | |
| d12 | 11.9991 | 5.6215 | 1.5718 | |
| B.f | 2.8165 | 19.4171 | 48.1498 | |

18th Surface (Non-Spherical Surface)

Cone constant
k = 0.1000E + 01

Non-spherical coefficient
c2 = 0.0
c4 = −0.4350E − 05
c6 = 0.1138E − 06
c8 = −0.6877E − 09
c10 = 0.1053E − 11 wherein the numbers at the left end indicate the order from the object, r is the radius of curvature, d is the lens-surface spacing, ν is the Abbe number, n is the refractive index in a d-line (λ=587,6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2h^2 + c_4h^4 + c_6h^6 + c_8h^8 + c_{10}h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

49. The wide angle zoom lens according to claim 40, which is structured based on the following Table:

| | f = 28.8~78.5, $F_{NO}$ =4.1~11.2, 2ω = 72.3°~31.0° | | | |
|---|---|---|---|---|
| | r | d | ν | n |
| 1 | 17.833 | 2.30 | 42.0 | 1.66755 |
| 2 | 27.414 | 2.70 | | |
| 3 | −23.215 | 1.60 | 43.3 | 1.84042 |
| 4 | 70.344 | 2.00 | | |
| 5 | 58.313 | 1.10 | 46.5 | 1.80411 |
| 6 | 11.470 | 4.10 | 59.0 | 1.51823 |
| 7 | −26.200 | 0.20 | | |
| 8 | 19.191 | 4.00 | 59.0 | 1.51823 |
| 9 | −11.504 | 1.10 | 40.9 | 1.79631 |
| 10 | −16.793 | 2.71 | | |
| 11 | ∞ | 1.20 | 57.0 | 1.62280 |
| 12 | −81.587 | (d12) | | |
| 13 | −20.365 | 3.30 | 47.5 | 1.78797 |
| 14 | −12.525 | 2.50 | | |
| 15 | −10.690 | 1.20 | 45.4 | 1.79668 |
| 16 | −29.477 | 2.90 | | |
| 17 | −15.950 | 1.30 | 60.1 | 1.62041 |
| 18 | −58.651 | (B.f) | | |
| f | 28.8003 | 47.0003 | 78.5007 | |
| d12 | 12.0787 | 5.7011 | 1.6514 | |
| B.f | 2.7568 | 19.3571 | 48.0888 | |

18th Surface (Non-Spherical Surface)

Cone constant
k = 0.1000E + 01

Non-spherical coefficient
c2 = 0.0

-continued

| f = 28.8~78.5, $F_{NO}$ =4.1~11.2, 2ω = 72.3°~31.0° |
|---|
| c4 = −0.4884E − 05 |
| c6 = 0.1036E − 06 |
| c8 = −0.5858E − 09 |
| c10 = 0.8375E − 12 | wherein the numbers at the left end indicate the order from the object, r is the radius of curvature, d is the lens-surface spacing, ν is the Abbe number, n is the refractive index in a d-line (ν=587,6 nm), f is the focal length of the entire system, $F_{NO}$ is the F number, and 2ω is the view angle, the non-spherical configuration being expressed by:

$$x = \frac{h^2/r}{1 + \sqrt{1 - k(h/r)^2}} + c_2h^2 + c_4h^4 + c_6h^6 + c_8h^8 + c_{10}h^{10}$$

where r is the paraxial curvature radius, h is the height from the optical axis, $c_2$, $c_4$, $c_6$, $c_8$ and $c_{10}$ are the non-spherical coefficients, and k is the cone constant on condition that the X-axis is taken in the optical axis, the H-axis is taken in the vertical direction, and the light traveling direction is positive, with E+n and E−n in the non-spherical coefficient and the cone constant indicating $10^n$ and $10^{-n}$, respectively.

50. A wide angle zoom lens comprising: a first lens group having a positive refractive power and a second lens group having a negative refractive power, with the distance between the first and second lens groups being variable for varying the magnification of the wide angle zoom lens, said first lens group, sequentially from an object, including: a front group composed of a first lens component assuming a meniscus configuration in which its convex surface is directed to said object and having a positive refractive power, a second lens component having a more intensive concave surface directed to said object and having a negative refractive power, a third lens component having either one of positive and negative refractive powers and a fourth lens component having a positive refractive power; and a rear group composed of a fifth lens component having a positive refractive power, said second lens group, sequentially from said object, including: a sixth lens component assuming a meniscus configuration in which its convex surface is directed to an image and having a positive refractive power, a seventh lens component assuming a meniscus configuration in which its convex surface is directed to said image and having a negative refractive power and an eighth lens component assuming a meniscus configuration in which its convex surface is directed to said image and having a negative refractive power, said first lens group and said second lens group being constructed to satisfy the following conditions:

$1.0 < f_1/Y < 1.19$ $0.9 < |f_2/Y| < 1.16, f_2 < 0$ $1.21 < \beta_{2W} < 1.40$ $$-1.15 < \frac{rb + ra}{rb - ra} < -1.03$$

$$1.15 < |rc/Y| < 1.30, rc < 0$$

where $f_1$: the focal length of said first lens group,
$f_2$: the focal length of said second lens group,
Y: the maximum image height on the image surface,
$\beta_{2W}$: the image forming magnification of said second lens group at the wide-angle end,
ra: the radius of curvature of the image-side surface of said seventh lens component of said second lens group,
rb: the radius of curvature of the object-side surface of said eighth lens component of said second lens group,
rc: the radius of curvature of the image-side surface of said eighth lens component of said second lens group.

51. The wide angle zoom lens according to claim 50, wherein said front group of said first lens group is so constructed as to be movable along said optical axis to vary a spacing between said front group and said rear group for focusing and is constructed to satisfy the following condition:

$$3.5 < f_R/f_F < 10$$

where $f_F$ is the focal length of said rear group, and $f_R$ is the focal length of said rear group.

52. The wide angle zoom lens according to claim 50, wherein said front group of said first lens group and said second lens group are constructed to satisfy the following conditions:

$$1.7 < f_{L1}/f_F < 3.8$$

$$0.5 < |f_{L2}/f_F| < 1.3, f_{L2} < 0$$

$$0.6 < f_{L4}/f_F < 1.9$$

$$1.0 < |f_{L6}/f_2| < 2.3, f_{L6} < 0$$

$$0.7 < f_{L7}/f_2 < 4.0$$

$$0.8 < f_{L8}/f_2 < 2.5$$

$$32 < \nu_{L1} < 70$$

$$6 < \nu_{L8} - \nu_{L6} < 40$$

$$11 < \nu_{L8} - \nu_{L7} < 45$$

where $f_{L1}$: the focal length of said first lens component of said first lens group,
$f_{L2}$: the focal length of said second lens component of said first lens group,
$f_{L4}$: the focal length of said fourth lens component of said first lens group,
$f_{L6}$: the focal length of said sixth lens component of said second lens group,
$f_{L7}$: the focal length of said seventh lens component of said second lens group,
$f_{L8}$: the focal length of said eighth lens component of said second lens group,
$f_F$: the focal length of said front group of said first lens group,
$f_2$: the focal length of said second lens group,
$\nu_{L1}$: the Abbe number of said first lens component of said first lens group,
$\nu_{L6}$: the Abbe number of said sixth lens component of said second lens group,
$\nu_{L7}$: the Abbe number of said seventh lens component of said second lens group,
$\nu_{L8}$: the Abbe number of said eighth lens component of said second lens group.

53. The wide angle zoom lens according to claim 50, wherein said second lens component of said first lens group is composed of a negative lens in which its concave surface exhibiting a more intensive curvature is directed to said object, said third lens component is constructed as a junction lens having either one of weak positive and negative refractive powers on the whole by joining a negative lens having its concave surface directed to said image to a double convex positive lens, said fourth lens component is constructed as a junction lens having a positive refractive power on the whole by joining a double convex positive lens to a negative meniscus lens having its concave surface directed to said object, and said first lens group and said second lens group are constructed to satisfy the following conditions:

$$1.0 < f_1/Y < 1.12$$

$$0.9 < |f_2/Y| < 1.16, f_2 < 0$$

$$1.21 < \beta_{2W} < 1.40.$$

54. The wide angle zoom lens according to claim 53, wherein said front group of said first lens group is so constructed as to be movable along the optical axis to vary a spacing between said front group and said rear group for focusing and is also constructed to satisfy the following condition:

$$3.5 < f_R/f_F < 10$$

where $f_F$ is the focal length of said front group, and $f_R$ is the focal length of said rear group.

55. The wide angle zoom lens according to claim 53, wherein said front group of said first lens group and said second lens group are constructed to satisfy the following conditions:

$$2.0 < f_{L1}/f_F < 3.0$$

$$0.6 < |f_{L2}/f_F| < 1.2, f_{L2} < 0$$

$$0.6 < f_{L4}/f_F < 1.2$$

$$1.0 < |f_{L6}/f_2| < 1.5, f_{L6} > 0$$

$$0.7 < f_{L7}/f_2 < 1.2$$

$$1.2 < f_{L8}/f_2 < 1.8$$

$$40 < \nu_{L1}$$

$$18 < \nu_{L8} - \nu_{L6} < 30$$

$$11 < \nu_{L8} - \nu_{L7} < 28$$

where $f_{L1}$: the focal length of said first lens component of said first lens group, $f_{L2}$: the focal length of said second lens component of said first lens group,
$f_{L4}$: the focal length of said fourth lens component of said first lens group,
$f_{L6}$: the focal length of said sixth lens component of said second lens group,
$f_{L7}$: the focal length of said seventh lens component of said second lens group,
$f_{L8}$: the focal length of said eighth lens component of said second lens group,
$f_F$: the focal length of said front group of said first lens group,
$f_2$: the focal length of said second lens group,
$\nu_{L1}$: the Abbe number of said first lens component of said first lens group,
$\nu_{L6}$: the Abbe number of said sixth lens component of said second lens group,
$\nu_{L7}$: the Abbe number of said seventh lens component of said second lens group,
$\nu_{L8}$: the Abbe number of said eighth lens component of said second lens group.

56. The wide angle zoom lens according to claim 53, wherein said second lens component, said third lens component and said fourth lens component are constructed to satisfy the following conditions for correcting spherical aberration:

$$1.75 < n_{L2}$$

$$0.05 < n_{L3n} - n_{L3p}$$

$$0.2 < n_{L4n} - n_{L4p}$$

where
$n_{L2}$: the refractive index of said second lens component,
$n_{L3n}$: the refractive index of said negative lens of said third lens component,
$n_{L3p}$: the refractive index of said positive lens of said third lens component,
$n_{L4n}$: the refractive index of said negative lens of said fourth lens component,
$n_{L4p}$: the refractive index of said positive lens of said fourth lens component.

57. The wide angle zoom lens according to claim 53, wherein said third lens component and said fourth lens component are constructed to satisfy the following conditions for correcting chromatic aberration:

$$-2 < \nu_{L3p} - \nu_{L3n} < 13$$

$$15 < \nu_{L4p} - \nu_{L4n} < 30$$

where
$\nu_{L3p}$: the Abbe number of said positive lens of said third lens component,
$\nu_{L3n}$: the Abbe number of said negative lens of said third lens component,
$\nu_{L4p}$: the Abbe number of said positive lens of said fourth lens component,
$\nu_{L4n}$: the Abbe number of said negative lens of said fourth lens component.

58. The wide angle zoom lens according to claim 53, wherein said third lens component of said first lens group and said seventh lens component of said second lens group are constructed to satisfy the following conditions:

$$-3 < q_{L3} < -0.5$$

$$1 < q_{L7} < 3$$

where
$q_{L3}$, $q_{L7}$ are the shape factors,
and a shape factor $q_{Li}$ of the i-th lens component is defined as follows:

$$q_{Li} = (r_b + r_a)/(r_b - r_a)$$

where $r_a$ is the closest-to-object radius of curvature of said i-th lens component, and $r_b$ is the closest-to-image radius of curvature thereof.

59. The wide angle zoom lens according to claim 50, which is structured based on the following Table:

| f = 30.8~78.5, $F_{NO}$ = 4.1~10.4, 2ω = 69.0~31.0° | | | |
|---|---|---|---|
| r | d | ν | n |
| 1 | 21.856 | 3.00 | 69.9 | 1.51860 |
| 2 | 56.752 | 2.10 | | |
| 3 | −21.710 | 1.60 | 47.5 | 1.78797 |
| 4 | 131.049 | 2.00 | | |
| 5 | −57.967 | 1.10 | 49.4 | 1.77279 |
| 6 | 9.708 | 4.10 | 48.1 | 1.71700 |
| 7 | −28.234 | 0.20 | | |
| 8 | 23.603 | 4.00 | 53.5 | 1.54739 |
| 9 | −10.646 | 1.10 | 28.6 | 1.79504 |
| 10 | −17.746 | 1.86 | | |
| 11 | −99.987 | 1.10 | 58.5 | 1.61272 |
| 12 | −46.043 | (d12) | | |
| 13 | −67.661 | 3.30 | 35.2 | 1.74950 |
| 14 | −16.203 | 0.80 | | |
| 15 | −17.198 | 1.20 | 39.8 | 1.86994 |
| 16 | −386.612 | 6.10 | | |
| 17 | −11.367 | 1.20 | 60.1 | 1.62041 |
| 18 | −27.021 | (B.f) | | |
| F | 30.7992 | 50.0017 | 78.5023 |
| d12 | 11.8781 | 5.2081 | 1.3241 |
| B.f | 3.7924 | 21.9161 | 48.8154 | wherein the numbers at the left end indicate the order from the object, the symbols r, d, ν, n sequentially indicate the radius of curvature, the lens-surface spacing, the Abbe number and the refractive index in d-line (λ=587.6 nm), 2ω is the view angle, f is the focal length of the entire system, and $F_{NO}$ is the F number.

60. The wide angle zoom lens according to claim 50, which is structured based on the following Table:

| f = 33.0~82.5, $F_{NO}$ = 4.5~11.2, 2ω = 66.2~29.6° | | | |
|---|---|---|---|
| r | d | ν | n |
| 1 | 21.960 | 2.50 | 69.9 | 1.51860 |
| 2 | 56.121 | 1.80 | | |
| 3 | −19.191 | 1.60 | 47.5 | 1.78797 |
| 4 | 212.707 | 2.00 | | |
| 5 | −47.795 | 1.10 | 49.4 | 1.77279 |
| 6 | 12.353 | 3.20 | 48.1 | 1.71700 |
| 7 | −23.658 | 0.20 | | |
| 8 | 24.957 | 3.60 | 59.7 | 1.53996 |
| 9 | −9.916 | 1.10 | 33.9 | 1.80384 |
| 10 | −16.667 | 1.98 | | |
| 11 | −79.944 | 1.10 | 49.0 | 1.53172 |
| 12 | −38.463 | (d12) | | |
| 13 | −54.569 | 3.30 | 35.2 | 1.74950 |
| 14 | −16.852 | 1.20 | | |
| 15 | −17.724 | 1.00 | 39.8 | 1.86994 |
| 16 | −279.144 | 5.70 | | |
| 17 | −11.679 | 1.20 | 60.1 | 1.62041 |
| 18 | −26.800 | (B.f) | | |
| f | 32.9592 | 50.0023 | 82.4608 |
| d12 | 11.1361 | 5.6081 | 1.4001 |

-continued

| | f = 33.0~82.5, $F_{NO}$ = 4.5~11.2, 2ω = 66.2~29.6° | | |
|---|---|---|---|
| B.f | 5.8951 | 22.0404 | 52.7890 | wherein the numbers t the left end indicate the order from the object, the symbols r, d, ν, n sequentially indicate the radius of curvature, the lens-surface spacing, the Abbe number and the refractive index in d-line (λ=587.6 nm), 2ω is the view angle, f is the focal length of the entire system, and $F_{NO}$ is the F number.

* * * * *